United States Patent
Yokoyama et al.

(10) Patent No.: US 8,202,591 B2
(45) Date of Patent: Jun. 19, 2012

(54) POLYESTER RESIN, MOLDED OBJECT THEREOF, AND PROCESSES FOR PRODUCING THESE

(75) Inventors: Hiroshi Yokoyama, Tokyo (JP); Hiroshige Okamoto, Tokyo (JP); Muneaki Aminaka, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 1104 days.

(21) Appl. No.: 11/791,842

(22) PCT Filed: Nov. 29, 2005

(86) PCT No.: PCT/JP2005/021893
§ 371 (c)(1),
(2), (4) Date: Jan. 18, 2008

(87) PCT Pub. No.: WO2006/059605
PCT Pub. Date: Jun. 8, 2006

(65) Prior Publication Data
US 2008/0260979 A1    Oct. 23, 2008

(30) Foreign Application Priority Data

| Nov. 30, 2004 | (JP) | 2004-345240 |
| Nov. 30, 2004 | (JP) | 2004-345242 |
| Apr. 6, 2005 | (JP) | 2005-109937 |
| Apr. 18, 2005 | (JP) | 2005-119627 |
| Aug. 16, 2005 | (JP) | 2005-235815 |
| Aug. 16, 2005 | (JP) | 2005-235816 |
| Aug. 16, 2005 | (JP) | 2005-235817 |

(51) Int. Cl.
*C08G 63/02* (2006.01)
*B29D 22/00* (2006.01)

(52) U.S. Cl. .......... 428/35.7; 528/271; 528/308
(58) Field of Classification Search ......... 428/35.7, 428/402; 528/271, 272, 308.1, 308
See application file for complete search history.

(56) References Cited

U.S. PATENT DOCUMENTS

| 3,110,547 A | 11/1963 | Emmert |
| 5,573,820 A | 11/1996 | Harazoe et al. |
| 6,265,526 B1 | 7/2001 | Komiya et al. |
| 6,346,070 B1 | 2/2002 | Ohmatsuzawa et al. |
| 6,392,005 B1 | 5/2002 | Jen |

(Continued)

FOREIGN PATENT DOCUMENTS
EP    1 671 999 A1    6/2006
(Continued)

OTHER PUBLICATIONS

Office Action issued Apr. 29, 2008 in corresponding Russian Patent Application No. 2007124603.

(Continued)

*Primary Examiner* — Rena Dye
*Assistant Examiner* — Yan Lan
(74) *Attorney, Agent, or Firm* — Staas & Halsey LLP

(57) ABSTRACT

A polyethylene terephthalate resin which is obtained by melt polymerization at a reduced pressure or in an inert gas atmosphere and has the following properties (A) to (F): (A) the intrinsic viscosity [η] is 0.4-2.5 Dl/g; (B) the content of carboxy groups present at polymer ends is 30 meq/kg or lower; (C) the acetaldehyde content is 10 ppm or lower; (D) a hexafluoroisopropanol solution of the resin, when analyzed by the transmission method, has a hue which has an L value of 99 or larger and a b value of 0.4 or smaller; (E) the Mw/Mn is 1.8-2.3; and (F) the cyclic trimer content is 5 wt. % or lower.

9 Claims, 8 Drawing Sheets

U.S. PATENT DOCUMENTS 6,500,915 B1　12/2002　Fujimori et al.

FOREIGN PATENT DOCUMENTS

| | | |
|---|---|---|
| JP | 48-8355 | 3/1973 |
| JP | 48-102894 | 12/1973 |
| JP | 53-17569 | 2/1978 |
| JP | 58-45228 | 3/1983 |
| JP | 58-96627 | 6/1983 |
| JP | 4-58806 | 9/1992 |
| JP | 8-217871 | 8/1996 |
| JP | 8-231699 | 9/1996 |
| JP | 9-77857 | 3/1997 |
| JP | 9-221540 | 8/1997 |
| JP | 2000-117819 | 4/2000 |
| JP | 2000-506199 | 5/2000 |
| JP | 2000-319365 | 11/2000 |
| JP | 2001-233948 | 8/2001 |
| JP | 2001-516389 | 9/2001 |
| JP | 2002-514239 | 5/2002 |
| JP | 2002-220443 | 8/2002 |
| JP | 3345250 | 8/2002 |
| JP | 2004-59735 | 2/2004 |
| JP | 2004-224895 | 8/2004 |
| JP | 2004-225008 | 8/2004 |
| JP | 2004-285332 | 10/2004 |
| WO | 99/65970 | 12/1999 |

OTHER PUBLICATIONS

Office Action issued in corresponding Taiwanese Patent Application No. 094142192 on Jun. 30, 2008.
Chinese Office Action issued on Jul. 10, 2009 in corresponding Chinese Patent Application 200580041143.6.
International Search Report of International Published Application No. PCT/JP2005/021893 (mailed Dec. 27, 2005).
European Search Report for 05811419.0-2102, mailed Nov. 17, 2011.

POLYESTER RESIN, MOLDED OBJECT THEREOF, AND PROCESSES FOR PRODUCING THESE

CROSS REFERENCE TO RELATED APPLICATION

This application is based on and claims priority to PCT Application No. PCT/JP2005/021893 filed Nov. 29, 2005, and Japanese Applications No(s) 2004-345240 filed Nov. 30, 2004, 2004-345242 filed Nov. 30, 2004, 2005-109937 filed Apr. 6, 2005, 2005-119627 filed Apr. 18, 2005, 2005-235815 filed Aug. 16, 2005, 2005-235816 filed Aug. 16, 2005 and 2005-235817 filed Aug. 16, 2006, the disclosure of which is hereby incorporated herein by reference.

TECHNICAL FIELD

The present invention relates to a polyester resin (particularly polyethylene terephthalate resin) having a polymerization degree ranging from a low polymerization degree to a high polymerization degree, having a reduced amount of carboxyl group on the polymer terminal and a reduced content of impurities such as acetaldehyde, generating a reduced amount of aldehyde during processing, having a favorable hue, having a narrow molecular weight distribution and having high quality and excellent moldability, a polyester resin pellets having a reduced amount of fine powder, having a good handling characteristic and giving a molded article having good quality, and a preform and a hollow body formed by molding the high-quality polyester resin described above.

BACKGROUND ART

Polyester resins represented by polyethylene terephthalate resins (hereinafter abbreviated as "PET resin" in some cases) has characteristics such as excellent heat resistance, weather resistance, mechanical properties, and transparency. Making use of such characteristics, polyester resins have widely been used not only for fiber or magnetic tapes, but also for preforms used to produce beverage containers, injection molded articles used for various purposes, or extrusion molded articles such as wrapping films or sheets. In particular, a hollow body produced by blow molding of a preform has excellent characteristics in terms of light weight, impact resistance, transparency, and the like. Accordingly, such hollow bodies have increasingly been used for containers for various types of beverages such as carbonated drinks, juice, tea, or mineral water, or containers for liquid condiments of foods such as soy sauce, sauce, salad oil, cosmetics, or liquid detergent. It is expected that the market will further expand in the future. It is required that such containers not affect the taste of the contents thereof, as well as having excellent strength, impact resistance, and transparency. Thus, it is required that polyester resins used for the aforementioned purposes be of high quality such that it has a high polymerization degree, is not colored, and contains a very small amount of impurities such as acetaldehyde. In addition, it is strongly desired that such polyester resins be able to be produced in an industrially stable manner and with good productivity at a low cost.

As a method of producing polyester resins used for the aforementioned purposes, a lower alcohol diester of PTA such as terephthalic acid (hereinafter abbreviated as "PTA") or dimethyl terephthalate (hereinafter abbreviated as "DMT") and alkylene glycol such as ethylene glycol (hereinafter abbreviated as "EG") are subjected to a transesterification or direct esterification in the absence or presence of a catalyst such as a metal carboxylate, so as to produce an intermediate such as bis-β-hydroxyethyl terephthalate (hereinafter abbreviated as "BHET") or its oligomer in advance. Thereafter, the above intermediate or oligomer, which is in a molten state, is heated under reduced pressure in the presence of a polycondensation reaction catalyst. While alkylene glycol generated as a by-product is discharged from the reaction system, melt polymerization is then carried out until the desired polymerization degree is achieved, so as to produce polyester resins.

Alternatively, a polymer pellet with a medium polymerization degree is produced by the above described melt polymerization, and it is then heated in a solid state, under reduced pressure, or in an inert gas current. Thereafter, solid phase polymerization is carried out by discharging alkylene glycol generated as a by-product from the reaction system for high polymerization, so as to produce polyester resins (see e.g. Patent Document 1).

In order to obtain a molded article by solid phase polymerization, however, a polymer pellet with a medium polymerization degree, which is solidified by cooling after melt polymerization, is heated again to a high temperature, and then dried, and crystallized. Thereafter, it is subjected to solid phase polymerization for a long period of time, so as to obtain a pellet with a high polymerization degree. Thereafter, the obtained pellet is cooled again, transported, and conserved. It is then heated and dried again to supply to a melt molding machine, so that a final molded article, or a preform used to produce a container, is molded. Thus, complex processes are required for production of polyester resins.

Although such complex processes have been required, solid phase polymerization has conventionally been carried out. That is because a low polymerization temperature results in the low likelihood of a pyrolysis reaction, and coloration or decomposition products are thereby hardly generated. Moreover, since volatile impurities are volatilized and eliminated from a polymer during polymerization, a high-quality polymer can be produced. However, this technique is problematic in that it requires special and complex equipment or methods as well as a long period of time. Moreover, the technique is also problematic in that it requires an enormous amount of energy for repeating heating and cooling so many times. Furthermore, such solid phase polymerization is also problematic in that a large amount of powder polymer that is hardly melted is generated during the polymerization, and in that the thus generated polymer plays a role in foreign matter, which might inhibit molding or might deteriorate the quality of a molded article, such as in terms of surface properties, resistance, or transparency. Still further, the core portion and the surface portion of the pellets have different molecular weights, and therefore the molecular weight distribution is wide. Therefore, a change in the molecular weight before and after processing is so significant that it is difficult to stabilize product quality. The surface portion of the pellets has a high polymerization degree and an extremely high crystallinity. Therefore, a large amount of shear heat is generated during molding processing, and a decrease in polymerization degree due to cutting of molecular branches, the amount of acetaldehyde produced as a byproduct and the degree of coloring due to thermal degradation are significant.

To date, an attempt to obtain polyester resins with a high polymerization degree only by melt polymerization without performing solid phase polymerization has also been carried out. Since an equilibrium constant is very small in the polycondensation reaction of polyester resins, a polymerization degree can be increased only after eliminating alkylene glycol generated as a by-product from the reaction system. However, since high polymerization brings on a high viscosity, it becomes more difficult to eliminate alkylene glycol. Thus, there has been a technique of using a horizontal agitator, which enables surface renewal of a large and sufficient surface area of a reaction solution in a final polycondensation reaction vessel that causes a high polymerization degree (see e.g. Patent Documents 2 and 3). Using such a technique, polyester resins with a high polymerization degree can be obtained, but a technique of using a polymerization apparatus having a rotary drive portion in the main body thereof, such as a horizontal agitator, has the following disadvantages.

When polymerization is carried out in a high vacuum, since the rotary drive portion cannot be completely sealed, inflow of a trace amount of air cannot be prevented, and polymer coloration thereby becomes inevitable. Even when a sealing solution is used to prevent such inflow of air, mixing of the sealing solution is inevitable, and thus, the quality of a polymer is inevitably deteriorated. Moreover, even when high sealing properties are kept at the beginning of the operations, the sealing properties might be decreased during long-term operations. Thus, there is also a serious problem regarding maintenance.

Furthermore, it is also difficult to reduce the content of impurities such as acetaldehyde, which is emphasized especially in the field of beverage containers. That is because acetaldehyde is likely to be generated as a by-product due to inflow of the air, and also because since an industrial-scale apparatus, including a horizontal agitator, causes a great depth of liquid, impurities such as acetaldehyde remain in a polymer.

With regard to acetaldehyde, a technique of compulsively removing acetaldehyde from PET obtained by melt polymerization by a melt deaeration treatment or the like, and directly molding a preform in a molten state, has been recently proposed.

For example, a thermoplastic polyester obtained by melt polymerization is subjected to a deaeration treatment without substantial increase in an intrinsic viscosity, so as to decrease the concentration of acetaldehyde, and thereafter, a preform is molded (see Patent Document 4). In this technique, however, since an extruder with a vent is used in deaeration, a polyester with a high polymerization degree has an excessively high viscosity, and acetaldehyde cannot be sufficiently reduced. In addition, a polymer locally has a high temperature due to heating by shearing or a heater, strong coloration occurs due to inflow of the air from an axial sealing portion, as stated above, or a large amount of decomposition products are generated. A technique of adding a phosphate-containing compound to prevent coloration has also been proposed, but it cannot sufficiently enhance quality.

Moreover, there has been another technique whereby inert gas is injected into a polyester molten body with an intrinsic viscosity between 0.5 and 0.75 dl/g, and melt polymerization is then carried out in a polymerization reactor at a temperature between 260° C. and 285° C. under reduced pressure, so as to form a polyester molten body containing low acetaldehyde with an intrinsic viscosity between 0.75 and 0.95 dl/g, followed by injection molding of the obtained polyester molten body (see Patent Document 5). However, according to the studies of the present inventors, since a horizontal biaxial agitator-type reactor is used as a polymerization reactor in this technique, a long period of time is required for high polymerization. Further, inflow of the air from the axial sealing portion causes significant coloration. In addition, since an industrial-scale reactor causes a great depth of liquid, high polymerization is further difficult, and it also becomes impossible to reduce acetaldehyde. It is also extremely difficult to uniformly inject into a polyester molten body inert gas in an amount sufficient for deaeration in a horizontal reactor on an industrial scale.

Furthermore, there has been another technique whereby a polyester polymerized in a reactor is supplied to a mixer without solidifying it at midpoint, acetaldehyde-eliminating agents such as nitrogen or carbon monoxide are then injected into the mixer, acetaldehyde is then eliminated in a flash tank, and the residue is then transported to a molding machine, so as to obtain a molded article (see Patent Document 6). In this technique, a polyester into which a stripping agent is mixed is converted into a large number of strands, filaments, or ribbons through a die, and the thus obtained products are extruded into a flash tank in a reduced-pressure atmosphere. The thus extruded product is allowed to fall onto the bottom of the flash tank, and then it is allowed to intensively foam, so as to eliminate acetaldehyde. Regarding this technique, the form of the polymerization reactor is not described in detail. However, if a common horizontal double axis agitator-type reactor was used in this technique, a long period of time would be required for high polymerization, and further, inflow of the air from an axial sealing portion would cause significant coloration. Further, since this technique requires special auxiliary equipment such as a mixer or flash tank as well as a reactor, the processes become complicated. Furthermore, since such a mixer or flash tank has a space where a polymer can remain for a long time, pyrolysis locally progresses, and a depleted polymer that is significantly colored is mixed into a product.

Still further, there has been another technique of transporting a resin in a molten state from a polymerization machine to a molding machine and then molding it (see Patent Document 7). However, a horizontal agitating polymerization machine is used in this method. Therefore, long-term polymerization is required to achieve a high polymerization degree, and inflow of the air from an axial sealing portion causes significant coloration. A devolatilizer for eliminating acetaldehyde, etc. is essential in this method, but a polymer is required to remain in such a devolatilizer for a further period of time, so that the product is deteriorated in color and that the production cost also increases.

Still further, there has been another technique of adding an acetaldehyde scavenger as well as a devolatilizer for eliminating acetaldehyde (see Patent Document 8). However, the use of a large amount of such an acetaldehyde scavenger causes problems such as generation of odor and coloration derived from the scavenger.

As stated above, the conventional melt polymerization techniques can reduce volatile impurities such as acetaldehyde, but they cannot achieve a molded article of polyester resins, which has a high polymerization degree and a good hue.

Other than the above described technique of using a polymerization apparatus comprising a rotary drive portion in the main body thereof, a method of performing polymerization while allowing a prepolymer to fall by gravitation from the upper part of a polymerization reactor, so as to produce PET with a high polymerization degree by melt polymerization, has also been proposed from a long time ago.

For example, there has been a technique whereby filamentary polyester is allowed to fall into a vacuum space, so as to produce a polyester with a desired molecular weight (see Patent Document 9). In this technique, since recirculation of the fallen polymer results in deterioration of the quality of the produced polyester, polymerization is completed by one-pass operation. However, since it is extremely difficult to keep a sufficient polymerization time by such a method, it is also extremely difficult to obtain a polymer with a high polymerization degree. In addition, filaments are easily cut off in a polymerization reactor. This is problematic in that the quality of the obtained polymer is drastically fluctuated; and in that condensates with a low molecular weight scattered from the filaments contaminate the nozzle surface, and it becomes difficult for the filaments to be injected directly below from the nozzle due to such contamination, and as a result, the filaments come into contact with one another and are cut off, or they are gathered to become a thick filament and it is then fallen, so that it prevents the reaction.

In order to solve such inconveniences, as a continuous polycondensation method of BHET as an initial condensate of PET and/or an initial condensate as an oligomer thereof, there has been proposed a method involving polymerizing the above materials at a reactor temperature of 340° C., while allowing the materials to fall by gravitation along a linear object that is vertically hung from a nozzle in an atmosphere where inert gas is circulated (see Patent Document 10). However, according to the studies of the present inventors, EG generated as a by-product cannot be eliminated from the reaction product at a sufficient rate in such an atmosphere where inert gas is circulated. Thus, a polymer with a high polymerization degree required for beverage containers cannot be obtained. Furthermore, pyrolysis significantly occurs at a high temperature such as 340° C., and only a polymer that is colored so as to become yellow can be obtained.

In addition to the above described methods, as a method of producing a polyester and a polyamide, there has also been a method of performing polymerization while allowing a polymer to fall by gravitation along a linear support vertically disposed in a reactor (see Patent Document 11). Moreover, as a method of producing a polyester, there has also been a technique whereby a PET oligomer with a mean degree of polymerization between 8 and 12 (which corresponds to an intrinsic viscosity of 0.1 dl/g or less) is supplied at 285° C., the oligomer is allowed to fall by gravitation along a cylindrical wire gauze vertically disposed in a reactor, and at the same time, polymerization is carried out under reduced pressure in the reactor (see Patent Document 12). Furthermore, there has also been proposed a method and an apparatus of allowing a PET prepolymer with a melting viscosity of 0.5 Pa·s (which corresponds to an intrinsic viscosity of 0.1 dl/g or less) to absorb inert gas, allowing the prepolymer to fall by gravitation along a guide under reduced pressure, and at the same time, performing polymerization (see Patent Document 13).

However, according to the studies of the present inventors, a polymer with a polymerization degree of interest cannot be obtained by directly applying the above described method in industrial-scale equipment. Moreover, a polymer discharged from a perforated plate or the like intensively foams, and it contaminates the wall of the reactor provided with the support and the nozzle surface. Such contaminants are decomposed, modified, or colored during long-term operations, and these degradation products are mixed into a polymer, so that the quality of a product deteriorates.

Other than these methods, there has also been proposed a polymerization method wherein the temperature of a reaction product is continuously decreased as the reaction product falls when bis-hydroxyethyl terephthalate or an oligomer thereof is supplied to a wetted-wall column followed by continuous polymerization under reduced pressure, and at the same time, vacuum aspiration is carried out from the lower portion of the column (see Patent Document 14). However, according to the studies of the present inventors, a polymer with a high polymerization degree cannot be obtained by applying the above method. When the amount of a polymerization intermediate (prepolymer) supplied is decreased to improve a polymerization velocity, a drift (biased flow) of the polymerization intermediate (prepolymer) occurs, and thus, a high-quality polymer cannot be obtained.

Hence, the conventional gravity falling-type melt polymerization techniques (Patent Documents 9 to 14) could not provide a method of industrially stably producing high-quality polyester resins having a high polymerization degree with good productivity, which can be substituted for the solid phase polymerization technique. In addition, these gravity falling-type melt polymerization techniques give no suggestion regarding a technique of obtaining a molded article containing small quantities of low molecular weight volatile substances such as acetaldehyde.

[Patent Document 1] JP-A-58-45228
[Patent Document 2] JP-A-48-102894
[Patent Document 3] JP-A-9-77857
[Patent Document 4] JP-A-2000-117819
[Patent Document 5] Japanese Patent No. 3345250
[Patent Document 6] National Publication of International Patent Application No. 2001-516389
[Patent Document 7] National Publication of International Patent Application No. 2000-506199
[Patent Document 8] National Publication of International Patent Application No. 2002-514239
[Patent Document 9] U.S. Pat. No. 3,110,547
[Patent Document 10] JP-B-4-58806
[Patent Document 11] JP-A-53-17569
[Patent Document 12] JP-B-48-8355
[Patent Document 13] International Publication WO99/65970 pamphlet
[Patent Document 14] JP-A-58-96627

It is an object of the present invention to provide a polyester resin (particularly polyethylene terephthalate resin) having a polymerization degree ranging from a low polymerization degree to a high polymerization degree, having a reduced amount of carboxyl group on the polymer terminal and a reduced content of impurities such as acetaldehyde, generating a reduced amount of aldehyde during processing, having a favorable hue, having a narrow molecular weight distribution and having high quality and excellent moldability; a polyester resin having a reduced crystallinity and suffering a less degradation in quality during processing in addition to the above-mentioned excellent characteristics; a polyester resin having a reduced content of cyclic trimer and having excellent moldability; a polyester resin pellets having a reduced amount of fine powder, having a good handling characteristic and giving a molded article having good quality; and a preform and a hollow body formed by molding the high-quality polyester resin described above.

DISCLOSURE OF THE INVENTION

As a result of conducting vigorous studies for solving the above described problems, the present inventors have found surprisingly that melt polycondensation at a low temperature which could not have been achieved at all by a previously publicly known polymerization apparatus is made possible by carrying out polymerization under specified conditions in a polymerization reactor of a new principle in which a polymerization intermediate (i.e., prepolymer) of a polyester resin is continuously fed into a polymerization reactor from a raw material feed opening in a molten state, discharged through holes of a perforated plate, and then polymerized while falling along a support under a reduced pressure, and the melt polycondensation is quite excellent in productivity, leading to completion of the present invention.

Namely, the attributes of the present invention are as follows.

(1) A polyethylene terephthalate resin obtained by melt polymerization under a reduced pressure or under an inert gas atmosphere and having the properties comprising:
- (A) an intrinsic viscosity [η] of 0.4 to 2.5 dl/g;
- (B) a content of carboxyl end groups of 30 meq/kg or less;
- (C) a content of acetaldehyde of 10 ppm or less;
- (D) a hue represented by the L value of 99 or greater and the b value of 0.4 or less,
  the above described hue being measured by transmission of hexafluoroisopropanol solution;
- (E) Mw/Mn of 1.8 to 2.3; and
- (F) a content of cyclic trimer of 5 wt % or less.

(2) The polyethylene terephthalate resin according to (1), wherein the crystallinity is 55% or less.

(3) The polyethylene terephthalate resin according to (1) or (2), wherein the content of cyclic trimer is 0.8 wt % or less.

(4) A pellets obtained by pelletizing the polyethylene terephthalate resin set out in any of (1) to (3), wherein the content of a fine powder having a particle size of 1 mm or less is 5 mg/kg or less.

(5) A preform, which is obtained by feeding the polyethylene terephthalate resin set out in any of (1) to (3) in a molten state in a polymerization reactor into an injection molding machine via a feed pipe at a temperature lower by 10° C. or less, and higher by 60° C. or less than the crystalline melting point and then injection-molding the polyethylene terephthalate resin, and having the properties comprising:
- (G) a content of carboxyl end groups of 30 meq/kg or less,
- (H) a content of acetaldehyde of 10 ppm or less, and
- (I) a hue represented by the L value of 98 or greater and the b value of 0.7 or less,
  the above described hue being measured by transmission of hexafluoroisopropanol solution.

(6) A polyethylene terephthalate hollow body obtained by blow-molding the preform set out in (5) and having the properties comprising:
- (J) a content of carboxyl end groups of 30 meq/kg or less,
- (K) a content of acetaldehyde of 10 ppm or less, and
- (L) a hue represented by the L value of 98 or greater and the b value of 0.8 or less,
  the above described hue being measured by transmission of hexafluoroisopropanol solution.

(7) A preform, which is obtained by extruding the polyethylene terephthalate resin set out in any of (1) to (3) in a molten state in a polymerization reactor to feed the polyethylene terephthalate resin into a compression molding machine via a feed pipe at a temperature lower by 10° C. or less, and higher by 60° C. or less than the crystalline melting point and then compression-molding the polyethylene terephthalate resin, and having the properties comprising:
- (G) a content of carboxyl end groups of 30 meq/kg or less,
- (H) a content of acetaldehyde of 10 ppm or less, and
- (I) a hue represented by the L value of 98 or greater and the b value of 0.7 or less,
  the above described hue being measured by transmission of hexafluoroisopropanol solution.

(8) A polyethylene terephthalate hollow body obtained by blow-molding the preform set out in (7) and having the properties comprising:
- (J) a content of carboxyl end groups of 30 meq/kg or less,
- (K) a content of acetaldehyde of 10 ppm or less, and
- (L) a hue represented by the L value of 98 or greater and the b value of 0.8 or less,
  the above described hue being measured by transmission of hexafluoroisopropanol solution.

(9) A method for producing a polyester resin, in which a polymerization intermediate of polyester having an intrinsic viscosity [η] of 0.2 to 2.0 dl/g is fed into a polymerization reactor through a feed opening in a molten state, then discharged through the holes of a perforated plate, and subsequently polymerized under a reduced pressure or under an inert gas atmosphere and a reduced pressure at a temperature lower by 10° C. or less, and higher by 30° C. or less than the crystalline melting point of the polymerization intermediate under the condition of the following formula (I) while falling along an outer open surface(s) of a support(s), wherein the polymerization intermediate contains at least one polycondensation catalyst in an amount of 3 to 300 ppm as a total amount of metal atoms, selected from an Sn catalyst in an amount less than 50 ppm; a catalyst selected from Ti, Ge, Al and Mg in an amount less than 100 ppm, respectively; and a catalyst selected from metals of the IB group and II to VIII groups of the periodic table other than the above metals in an amount less than 300 ppm, respectively, in terms of metal atoms,
and wherein:

$$S1/S2>1 \quad \text{(formula 1)},$$

S1; surface area of the falling polyester resin, and
S2; area in which the support and the polyester resin is in contact with each other.

(10) The method for producing a polyester resin according to (9), wherein at least one of alkali compounds is made to coexist in the polymerization intermediate.

(11) The method for producing a polyester resin according to (9) or (10), wherein at least one of phosphorous compounds is made to coexist in the polymerization intermediate.

(12) A method for producing a polyethylene terephthalate resin, comprising the steps of
providing as a raw material a solid state polyethylene terephthalate resin having the properties comprising:
- (S) a crystallinity of 35% or less, and
- (T) a content of acetaldehyde of 30 ppm or less, and
subjecting the solid state polyethylene terephthalate resin to at least one selected from heat treatment, vacuum treatment and cleaning treatment to obtain a polyethylene terephthalate resin having the properties comprising:
- (U) a crystallinity of 55% or less;
- (V) Mw/Mn=1.8 to 2.3; and
- (W) a content of acetaldehyde of no more than 50% of its content in the raw polyethylene terephthalate resin.

(13) The method for producing a polyethylene terephthalate resin according to (12), wherein the content of acetaldehyde in the raw polyethylene terephthalate resin is 15 ppm or less.

(14) The method for producing a polyethylene terephthalate resin according to (12) or (13), wherein the raw polyethylene terephthalate resin is a polyethylene terephthalate resin produced by feeding a polymerization intermediate of polyethylene terephthalate having an intrinsic viscosity [η] of 0.2 to 2.0 dl/g into a polymerization reactor through a feed opening in a molten state, then discharging the polymerization intermediate through the holes of a perforated plate, and subsequently polymerizing the polymerization intermediate under a reduced pressure or under an inert gas atmosphere and a reduced pressure at a temperature lower by 10° C. or less, and higher by 30° C. or less than the crystalline melting point of the polymerization intermediate under the condition of the following formula (1) while falling along an outer open surface(s) of a support(s), wherein:

$$S1/S2>1 \quad \text{(formula 1)},$$

S1; surface area of the falling polyethylene terephthalate resin, and
S2; area in which the support and the polyethylene terephthalate resin is in contact with each other.

(15) The method for producing a polyethylene terephthalate resin according to any of (12) to (14), comprising subjecting the raw polyethylene terephthalate resin to heat treatment at a temperature of 140 to 220° C. for 20 minutes to 10 hours, whereby the polyethylene terephthalate resin has a content of acetaldehyde of 3 ppm or less.

(16) A method for producing a polyethylene terephthalate resin, wherein a polymerization intermediate of a polyethylene terephthalate resin having an intrinsic viscosity [η] of 0.2 to 2.0 dl/g and having a content of cyclic trimer of 0.8% by weight or less is fed into a polymerization reactor through a feed opening in a molten state, then discharged through holes of a perforated plate, and subsequently polymerized under a reduced pressure at a temperature lower by 10° C. or less, and higher by 30° C. or less than the crystalline melting point of the polymerization intermediate while falling along a support(s) to produce a polyethylene terephthalate resin having the properties comprising:
  (a) an intrinsic viscosity [η] of 0.2 to 2.5 dl/g; and
  (b) a content of cyclic trimer of 0.8% by weight or less.

(17) A method for producing a polyethylene terephthalate resin, wherein a polymerization intermediate of polyethylene terephthalate resin having an intrinsic viscosity [η] of 0.2 to 2.0 dl/g is fed into a polymerization reactor through a feed opening in a molten state, then discharged through holes of a perforated plate, and subsequently polymerized under a reduced pressure at a temperature lower by 10° C. or less, and higher by 30° C. or less than the crystalline melting point of the polymerization intermediate while falling along a support(s) to obtain a polyethylene terephthalate resin, and further processing the polyethylene terephthalate resin to remove a cyclic trimer oligomer by an amount of 0.2% by weight or more therefrom is carried out to produce a polyethylene terephthalate resin having the properties comprising:
  (c) an intrinsic viscosity [η] of 0.20 to 2.5 dl/g; and
  (d) a content of cyclic trimer of 0.8% by weight or less.

(18) The method for producing a polyethylene terephthalate resin according to (16) or (17), comprising feeding a polymerization intermediate of polyethylene terephthalate resin, which shows an increase in content of cyclic trimer when the polymerization intermediate is held in a molten state at 275° C. for 30 minutes is 0.2% by weight or less, into the polymerization reactor to polymerize the polymerization intermediate.

(19) A method for producing a polyester resin, comprising pelletizing a polyester resin obtained by feeding a polymerization intermediate of polyester resin having an intrinsic viscosity [η] of 0.2 to 2.0 dl/g into a polymerization reactor through a feed opening in a molten state, then discharging the polymerization intermediate through the holes of a perforated plate, and subsequently polymerizing the polymerization intermediate under a reduced pressure at a temperature lower by 10° C. or less, and higher by 30° C. or less than the crystalline melting point of the polymerization intermediate while falling along a support(s), and then introducing the resultant pellets into a solid-state polycondensation reactor to further subject the pellets to solid-state polycondensation at a temperature of 190 to 230° C.

(20) A method for producing a polyester resin, in which a polymerization intermediate of polyester resin having a number average molecular weight of 6,000 to 80,000 and showing no crystalline melting point is fed into a polymerization reactor through a feed opening in a molten state, then discharged through the holes of a perforated plate, and subsequently polymerized under a reduced pressure or under an inert gas atmosphere and a reduced pressure under the condition of the following formula (1) while falling along an outer open surface(s) of a support(s), the method comprising polymerizing the polymerization intermediate at a temperature in the range of the higher of 100° C. or a temperature at which a melt viscosity when the polyester resin extracted from the polymerization reactor is evaluated at a shear rate of 1000 (sec$^{-1}$) is 100000 (poise) or greater, to 290° C.:

$$S1/S2 > 1 \qquad \text{(formula 1)},$$

S1; surface area of the falling polyester resin, and
  S2; area in which the support and the polyester resin is in contact with each other.

(21) The method for producing a polyester resin according to any of (9) to (11), (19) and (20), comprising making the polymerization intermediate undergo a reaction with any amount of molecular weight regulator in any step before feeding the polymerization intermediate into the polymerization reactor.

(22) The method for producing a polyester resin according to any of (9) to (11) and (19) to (21), comprising making the polymerization intermediate in a molten state pass through a polymer filter having a filtration accuracy of 0.2 to 200 μm and controlled to have a temperature in the range of a temperature lower by 20° C. than a crystalline melting point of the polymerization intermediate to a temperature higher by 100° C. than the crystalline melting point of the polymerization intermediate; or in the range of the higher of 100° C. or a temperature at which a melt viscosity when the polymerization intermediate is evaluated at a shear rate of 1000 (sec$^{-1}$) is 100000 (poise) or greater, to 350° C., and then feeding the polymerization intermediate into the polymerization reactor.

(23) The method for producing a polyethylene terephthalate resin according to any of (12) to (18), comprising making the polymerization intermediate undergo a reaction with any amount of molecular weight regulator in any step before feeding the polymerization intermediate into the polymerization reactor.

(24) The method for producing a polyethylene terephthalate resin according to any of (12) to (18), comprising making the polymerization intermediate in a molten state pass through a polymer filter having a filtration accuracy of 0.2 to 200 μm and controlled to have a temperature in the range of a temperature lower by 20° C. than a crystalline melting point of the polymerization intermediate to a temperature higher by 100° C. than the crystalline melting point of the polymerization intermediate; or in the range of the higher of 100° C. or a temperature at which a melt viscosity when the polymerization intermediate is evaluated at a shear rate of 1000 (sec$^{-1}$) is 100000 (poise) or greater, to 350° C., and then feeding the polymerization intermediate into the polymerization reactor.

The hollow body of the present invention is a high-quality polyester resin produced with stability from an industrial point of view, with good productivity and at a low cost, having a high polymerization degree, having a reduced amount of carboxyl group on the polymer terminal and a reduced content of impurities such as acetaldehyde, generating a reduced amount of aldehyde during processing, having a favorable hue, having a narrow molecular weight distribution and having high quality and excellent moldability. Therefore, it is a high-quality beverage container or the like having a low-cost production characteristic, and an excellent strength, impact resistance and transparency and having no influence on the taste of contents.

According to the present invention, it is possible to provide a polyester resin (particularly polyethylene terephthalate resin) having a polymerization degree ranging from a low polymerization degree to a high polymerization degree, having a reduced amount of carboxyl group on the polymer terminal and a reduced content of impurities such as acetaldehyde, generating a reduced amount of aldehyde during processing, having a favorable hue, having a narrow molecular weight distribution and having high quality and excellent moldability. It is also possible to provide a polyester resin having a reduced crystallinity and suffering a less degradation in quality during processing in addition to the above-mentioned excellent characteristics, a polyester resin having a reduced content of cyclic trimer and having excellent moldability, a polyester resin pellets having a reduced amount of fine powder, having a good handling characteristic and giving a molded article having good quality, and a preform and a hollow body formed by molding the high-quality polyester resin described above.

BEST MODE FOR CARRYING OUT THE INVENTION

The present invention will be described specifically below.

The present invention uses a polymerization reactor based on a new principle. Thus, (I) principle of polymerization method of the present invention, (II) explanation of polyester resin, (III) explanation of polymerization reactor of the present invention, (IV) explanation of polymerization method of the present invention and (V) explanation of molding method and molded material will be described specifically in this order.

(I) Principle of Polymerization Method of the Present Invention

A polymerization method of the present invention is a method in which a polymerization intermediate of a polyester resin capable of being polymerized by a melt polycondensation reaction is fed into a polymerization reactor from a raw material feed opening in a molten state, discharged through holes of a perforated plate, and then polymerized under a reduced pressure or an inert gas atmosphere under a reduced pressure while falling under gravity along a support.

As described later, the characteristics of the polymerization intermediate, the structure of the polymerization reactor and the polymerization method meet appropriate conditions. Consequently, the polymerization intermediate falling along the support contains a large amount of bubbles, and as polymerization proceeds, the resin comes to have a structure in a form of bubble agglomerates (mass) and exhibits a behavior of falling toward the lower part of the polymerization reactor.

As a result, an area of contact between the resin and a gas phase and an effect of stirring the resin dramatically increase. A byproduct of the polycondensation reaction (ethylene glycol in the case of the PET resin) and impurities generated by thermal decomposition during polymerization (acetaldehyde and the like in the case of the PET resin) can be efficiently removed from the polymerization intermediate. The polymerization velocity dramatically increases compared with conventional melt polymerization techniques. Further, there is an advantage that a high-quality resin having an extremely small amount of remaining impurities can be produced at a low polymerization temperature which could not have been achieved at all by a previously publicly known polymerization apparatus, and with a quite excellent productivity.

(II) Explanation of Polyester Resin

Polyester resins of the present invention include aliphatic polyesters, aliphatic and aromatic polyesters, aromatic polyesters and copolymers thereof. The present invention is suitable for production of a high-quality polyethylene terephthalate resin (PET resin) having a high value in use among the polyester resins described above.

(II-I) Explanation of Polyethylene Terephthalate Resin of the Present Invention

The polyethylene terephthalate resin of the present invention is preferably composed of ethylene terephthalate repeated units in an amount of 50 mol % or more, and may contain one or more other copolymer components in an amount less than 50 mol %.

Examples of copolymer components include ester forming monomers such as 5-sodium sulfoisophthalic acid, 3,5-dicarboxylic acid benzenesulfonic acid tetramethyl phosphonium salts, 1,3-butanediol, 1,4-butanediol, neopentylglycol, 1,6-hexamethyleneglycol, 1,4-cyclohexanediol, 1,4-cyclohexanedimethanol, isophthalic acid, oxalic acid, succinic acid, adipic acid, dodecanedioic acid, fumaric acid, maleic acid, 1,4-naphthalenedicarboxylic acid, 2,6-naphthalenedicarboxylic acid and 1,4-cyclohexanedicarboxylic acid, polyethylene glycol, polypropylene glycol, polytetramethylene glycol and copolymers thereof. They may be polyester amide copolymers, polyester ether copolymers, copolymers with polyalkylene glycols such as polyethylene glycol, polypropylene glycol and polytetramethylene glycol, polyester carbonate copolymers and the like in which different bonds allowing copolymerization with a polyester resin, such as amide bonds, ether bonds and carbonate bonds, in addition to ester bonds.

In addition to the polyethylene terephthalate resin, cyclic and linear oligomers, monomers such as dimethyl terephthalate (hereinafter abbreviated as DMT), terephthalic acid (hereinafter abbreviated as TPA) and ethylene glycol (hereinafter abbreviated as EG in some cases) and various kinds of additives may be contained.

The polyethylene terephthalate resin of the present invention is a high-quality polyethylene terephthalate resin having the properties (A) to (F) and being suitable for production of a beverage bottle or the like:

(A) an intrinsic viscosity [η] of 0.4 to 2.5 dl/g;
(B) a content of carboxyl end groups of 30 meq/kg or less;
(C) a content of acetaldehyde of 10 ppm or less;
(D) a hue represented by the L value of 99 or greater and the b value of 0.4 or less,
the above described hue being measured by transmission of hexafluoroisopropanol solution;
(E) Mw/Mn of 1.8 to 2.3; and
(F) a content of cyclic trimer of 5 wt % or less.

The method for producing a polyethylene terephthalate resin having these properties is not specifically limited, but most preferable is a method using the above-mentioned polymerization reactor based on the new principle of the present invention.

(A) The intrinsic viscosity [η] is preferably 0.4 dl/g or greater in terms of mechanical properties of a molded material produced from the polyethylene terephthalate resin of the present invention, and preferably 2.5 dl/g or less in terms of ease of molding. It is more preferably in the range of 0.5 to 2.0 dl/g, further preferably in the range of 0.6 to 1.5 dl/g in terms of a purpose of production of films, sheets, hollow bodies such as bottles and high-strength fibers, and especially preferably in the range of 0.7 to 1.3 dl/g.

(B) The amount of carboxyl group on the polymer terminal is preferably 30 meq/kg or less in terms of an influence on thermal stability of the resin, more preferably in the range of 25 meq/kg or less, further preferably in the range of 20 meq/kg or less, especially preferably in the range of 15 meq/kg or less and most preferably in the range of 10 meq/kg or less. The carboxyl group on the polymer terminal not only accelerates decomposition of the resin but also brings about production of diethylene glycol and acetaldehyde as a byproduct during production of the resin and during melt molding, thus causing a degradation in resin quality. In the conventional melt polymerization technique, a reaction at a higher temperature and for a longer time is required when a resin having a high polymerization degree is produced, and therefore the amount of carboxyl group is extremely large. In the solid-state polycondensation technique, on the other hand, a raw material having a larger amount of carboxyl group is prepared for the purpose of promoting a polycondensation reaction when a resin having a high polymerization degree is produced. As a result, the amount of carboxyl group is extremely large in the product as well.

(C) For the content of acetaldehyde, it is desired to reduce the content because even a very small amount of acetaldehyde gives discomfort to taste and smell senses of human beings. Thus, the content of acetaldehyde is preferably 10 ppm or less, more preferably 8 ppm or less, further preferably 5 ppm or less, especially preferably 3 ppm or less, and most preferably 1 ppm or less.

The content of acetaldehyde in the present invention was measured by the water extraction method. As a method for quantitative determination of the content of acetaldehyde, the ASTM method (head space GC method) has been often used. However, this method is a method in which the amount of acetaldehyde volatized by heating in a head space is measured. Therefore, acetaldehyde in the resin cannot be totally extracted, and a measured value is lower than an actual level. In the water extraction method used in the present invention, acetaldehyde in the resin is totally extracted, and therefore a measured value closer to an actual level can be obtained. For the error of measured values of these measurement methods, it is known that a value obtained by the water extraction method is higher by about 3 ppm in the order of several ppm. Thus, it is important to compare a value in the conventional literature with 3 ppm added to the value.

In the conventional melt polymerization technique, a reaction at a high temperature and for a long time is required compared with the polymerization method of the present invention, and therefore the content of acetaldehyde is vary high, and normally 50 ppm or greater. On the other hand, in the solid-state polycondensation technique, the reaction is made to proceed at a temperature of 200° C. or greater for several tens of hours, and therefore the content of acetaldehyde can be reduced to about 5 ppm. However, since the surface portion of a pellets produced by the solid-state polycondensation has a high polymerization degree and an extremely high crystallinity as described previously, a large amount of shear heat is generated during molding processing, and the amount of acetaldehyde produced as a byproduct during processing is extremely large. Therefore, the content of acetaldehyde in the molded material is far greater than 10 ppm.

In contrast to this, according to the production method of the present invention, the polymerization temperature is low, i.e. close to a crystalline melting point, in spite of the melt polymerization technique. Moreover, a polyethylene terephthalate resin having a reduced content of impurities such as acetaldehyde can be produced owing to unique bubbling and surface update behaviors of the resin in the polymerization reactor. Moreover, the temperature of the resin drawn out from the polymerization reactor of the present invention is low, and therefore the amount of acetaldehyde generated in a drawing pipe until the resin is cooled into a solid is small. Moreover, the amount of acetaldehyde generated during molding processing is also small because the crystalline of a pellets obtained by solidification of the resin is low.

(D) For the hue measured by the method of penetration of a hexafluoroisopropanol solution, it is preferable that the L value is 99 or greater and the b value is 0.4 or less, it is more preferably that the L value is 99.2 or greater and the b value is 0.3 or less, and it is especially preferable that the L value is 99.4 or greater and the b value is 0.2 or less for producing a molded material having an excellent external appearance.

Evaluations of the hue in the present invention are made by the penetration method for a solution prepared by dissolving a polymer in an HFIP solution in a concentration of 13% by weight. The value is evaluated with the Hunter colorimetric system, and the L value and the b value measured by a method compliant with JIS Z8730 are expressed.

The color E has the following relation.

$$E=(L^2+a^2+b^2)^{1/2}$$

In view of the above relation, a color cannot be specified unless a, b and L are expressed. A transparent resin may take on a yellow tinge due to coloring, and for reducing an apparently yellow tinge, a small amount of blue dye or the like is often added. Since the b value expresses a blue or yellow tinge, addition of the blue dye or the like changes only the b value, and has little influence on the a value expressing a red or green tinge. Addition of a dye or the like definitely causes a reduction in L value, and therefore a color can be specified by expression of the L value and the b value in a transparent resin. For the hue of a transparent resin, a blue dye or the like is often added to a resin having a yellow tinge to reduce the b value (at this time, the L value is certainly reduced). Therefore, expression of only the b value is not sufficient, and a color can be specified only by expressing both L and b values.

In the polymerization method according to the present invention, thermal hysteresis is low compared with the conventional melt polymerization method and solid-state polycondensation technique, and moreover, there is no rotational driving part in a main body of the polymerization reactor. Therefore, neither leakage of air nor heat generation by shearing occurs, and thus a polyethylene terephthalate resin having an excellent hue can be produced.

(E) The molecular weight distribution expressed by Mw/Mn is important in control of quality of a melt-processed product of the polyethylene terephthalate resin of the present invention, and is preferably in the range of 1.8 to 2.3. It is more preferably in the range of 1.8 to 2.2, further preferably in the range of 1.8 to 2.1, and especially preferably in the range of 1.8 to 2.0. As described above, for the polyethylene terephthalate resin produced by the solid-state polycondensation technique, a pellets having a low polymerization degree is used as a raw material, and made to undergo a reaction for a long time to increase the polymerization degree. At this time, EG produced as a byproduct is harder to escape from the core portion of the pellets than from the surface portion of the pellets, and therefore a nonuniform product in which the surface portion of the pellets has a higher polymerization degree than that of the core portion of the pellets is obtained, and its molecular weight distribution is wide. Because of the reaction in the pellets form, a fine powder tends to be generated, but if the pellets forms into a fine powder, the surface area increases, resulting in extreme progress of polymerization. For such a nonuniform resin, the molecular weight significantly changes before and after processing, and it is thus difficult to control quality of a molded material to be stabilized. On the other hand, according to the method of the present invention, a product of uniform quality can be produced, and therefore it is easy to control quality of a molded material.

(F) The content of cyclic trimer is preferably 5 wt % or less in terms of mechanical properties of a molded material, more preferably 2 wt % or less, further preferably 1.2 wt % or less, especially preferably 0.8 wt % or less, and most preferably 0.5 wt % or less.

As described later, examples of methods for producing a polyethylene terephthalate resin having a content of cyclic trimer of 0.8 wt % or less include a method in which a polymerization intermediate of a polyethylene terephthalate resin having an intrinsic viscosity [η] of 0.2 to 2.0 dl/g and a content of cyclic trimer of 0.8% by weight or less is polymerized under a reduced pressure at a temperature in the range of a temperature lower by 10° C. than the crystalline melting point of the polymerization intermediate to a temperature higher by 30° C. than the crystalline melting point of the polymerization intermediate while falling along a support in the polymerization reactor of the present invention, and a method in which processing of removing a cyclic trimer oligomer in an amount of 0.2% by weight or more from a polyethylene terephthalate resin produced by the polymerization method of the present invention is carried out. If these methods for reducing the content of cyclic trimer are carried out, the polymerization intermediate is preferably adjusted so that an increase in content of cyclic trimer when it is held in a molten state at 275° C. for 30 minutes is 0.2% by weight or less. These specific methods will be described in order.

A polyethylene terephthalate resin having a crystallinity of 55% or less in addition to the above features of (A) to (F) requires only a low level of heating for melt processing, and generates only a small amount of sear heat during plasticization. Therefore, a reduction in polymerization degree of the resin due to thermal decomposition, a degradation in hue and the amount of acetaldehyde produced as a byproduct are insignificant. The crystallinity is more preferably 50% or less, further preferably 40% or less, especially preferably 30% or less, most preferably 20% or less, especially most preferably 10% or less. The crystallinity of a polyethylene terephthalate resin produced by the solid-state polycondensation technique is normally 60% or greater, and particularly the surface portion of the pellets and a fine powder mixed in the pellets have a high crystallinity. Therefore, the resin is not uniformly melted during molding processing, and thus has many troubles in terms of product quality leading to defects such as unevenness of the thickness of a sheet molded material and roughening (fisheye) of the surface of a molded material. In contrast to this, if a polyethylene terephthalate resin produced by the method of the present invention is used, the resin is easily melted uniformly during molding processing, whereby a molded material having a good external appearance can be obtained.

(II-2) Explanation of Polymerization Intermediate

A polymerization method using a polymerization reactor based on a new principle of the present invention, which is most suitable for production of a polyester resin, particularly polyethylene terephthalate resin of the present invention will be described below. First, a polymerization intermediate suitable for being fed into the polymerization reactor of the present invention and polymerized will be described.

The polymerization intermediate is a polymer in an initially stage of polymerization having a polymerization degree lower than that of a product resin, and is formed into a product polyester resin by further increasing the polymerization degree using a polymerization apparatus of the present invention. The polymerization intermediate may include an oligomer and a monomer.

Methods for producing a polymerization intermediate of a polyester resin represented by a polyethylene terephthalate resin are broadly classified into two types according to a difference in raw material. The first method is a method in which for example, a monomer having a lower alcohol ester of a carboxyl group such as DMT and a monomer having a hydroxyl group such as EG are made to undergo an ester exchange reaction to obtain hydroxy ethylene terephthalate (hereinafter abbreviated as "BHET") in the case of the polyethylene terephthalate resin, and then the BHET is made to undergo a polycondensation reaction to produce a polymerization intermediate (hereinafter abbreviated as "ester exchange method"). The second method is a method in which for example, a monomer having a carboxyl group such as a terephthalic acid and a monomer having a hydroxyl group such as EG are made to undergo an esterification reaction to obtain a BHET, and then the BHET is made to undergo a polycondensation reaction to produce a polymerization intermediate as in the first method (hereinafter abbreviated as "direct esterification method").

For the method for producing a polymerization intermediate, a broad division is made between the batch polymerization method (also called a batch method) in which a raw material and the like are all introduced into a reaction apparatus and made to undergo a reaction at a time to obtain a polymerization intermediate and the continuous polymerization method in which a raw material is continuously introduced into a reaction apparatus to continuously obtain a polymerization intermediate. For the polyester resin of the present invention, most preferable is a method in which a polymerization intermediate is obtained by the continuous polymerization method and the polymerization intermediate is continuously polymerized by the production method described later.

A method for producing a polymerization intermediate of a polyethylene terephthalate resin as a representative of the polyester resin of the present invention will be described in detail as an example.

In the ester exchange method, for example, DMT and EG are subjected to ester exchange at a temperature of 160 to 240° C. under presence of an ester exchange catalyst to obtain BHET. In the ester exchange method, DMT or the like as a raw material has a relatively high volatility, and therefore it is preferable that the reaction vessel is divided into two or more vessels and the temperature is changed according to the reaction rate. BHET may include a lower alcohol ester of unreacted TPA, EG and an oligomer, but it is preferable that BHET or an oligomer having a low molecular weight occupies 70% by weight or more based on the total amount of reactants.

The molar ratio of DMT to EG during placement is preferably in the range of 1:1.2 to 1:4, and more preferably in the range of 1:1.4 to 1:2.5 for reducing the reaction time and obtaining a polymer of good quality.

The ester exchange method requires use of an ester exchange catalyst. Preferable examples thereof include titanium alkoxides represented by titanium tetrabutoxide and titanium tetraisopropoxide, tin compounds such as tin 2-ethylhexanoate, manganese acetate, cobalt acetate, calcium acetate and zinc acetate. Among them, manganese acetate and calcium acetate are preferable because a polymer of good quality can be obtained. The amount of ester exchange catalyst is preferably in the range of 0.0005 to 0.5% by weight, more preferably in the range of 0.0005 to 0.3% by weight and further preferably in the range of 0.0005 to 0.1% by weight based on the amount of DMT.

In the direct esterification method, for example, TPA and EG can be made to undergo an esterification reaction at a temperature of 150 to 240° C. to obtain BHET. The molar ratio of TPA to EG during placement is preferably in the range of 1:1.01 to 1:3, and more preferably in the range of 1:1.03 to 1:2. By limiting the molar ratio to within this range, the reaction time can be reduced.

In the direct esterification method, protons isolated from TPA serve as a catalyst, and therefore an esterification catalyst is not necessarily required, but an esterification catalyst may be used for enhancing a reaction velocity. Examples of catalysts include titanium alkoxides represented by titanium tetrabutoxide and titanium tetraisopropoxide and tin compounds such as tin 2-ethylhexanoate. The amount of the catalyst added is preferably in the range of 0.0005 to 1% by weight, more preferably in the range of 0.0005 to 0.5% by weight and further preferably in the range of 0.0005 to 0.2% by weight based on the amount of TPA.

For making the esterification reaction proceed smoothly, BHET is preferably added when the reaction is started. In the batch method, TPA and EG as raw materials and 5 to 80% by weight of BHET based on the amount of TPA are placed at a time, and the reaction is started. At the time of starting the continuous polymerization method, 5 to 80% by weight of BHET based on a predetermined level is placed in advance in a reaction vessel in which a direct esterification reaction is carried out, and melted, and then a fixed amount of mixture of TPA and EG is introduced thereinto while a fixed amount of reaction product (BHET) is withdrawn to start the reaction. Thereafter, the feeding of the raw material and the withdrawal of the product can be continued to make a transition to a steady state.

BHET produced by the by the direct esterification method may include unreacted TPA, EG and an oligomer, but it is preferable that BHET or an oligomer having a low molecular weight occupies 70% by weight or more based on the total amount of reactants.

BHET obtained by the method described above is subsequently subjected to polycondensation to produce a polymerization intermediate for use in the present invention. BHET is made to undergo a polycondensation reaction under a reduced pressure or under an inert gas atmosphere while removing EG produced as a byproduct. The temperature of the polycondensation reaction is preferably set to 260 to 300° C. By setting the temperature 260° C. or higher, a situation in which the reactant is solidified or the reaction time increases is prevented. By setting the temperature to 300° C. or lower, thermal decomposition can be inhibited to obtain a resin having an excellent hue. The temperature of the polycondensation reaction is more preferably in the range of 260 to 290° C. and further preferably in the range of 260 to 280° C.

If the polycondensation reaction is carried out under a reduced pressure, the degree of reduced pressure is appropriately adjusted according to the sublimation state and the reaction velocity of BHET and polycondensation reactants. If the reaction is carried out under an inert gas atmosphere, it is important to sufficiently replace the inert gas as required so that EG produced as a byproduct can be efficiently removed.

It is desirable to use a polycondensation catalyst for polycondensation of BHET. Use of the polycondensation catalyst can dramatically reduce the polycondensation time. Preferable examples of the polycondensation catalyst include germanium compounds such as germanium dioxide, antimony compounds such as diantimony trioxide and antimony acetate, aluminum compounds represented by aluminum acetate, aluminum isopropoxide and aluminum phosphate, tin compounds such as tin 2-ethylhexanoate, titanium alkoxides represented by titanium tetrabutoxide and titanium tetraisopropoxide, titanium dioxide, and complex salts of titanium dioxide and silicon dioxide.

Among them, the antimony compound has a high reaction velocity and is advantageous in terms of the cost of the catalyst. The germanium compound catalyst is advantageous in terms of the hue of the resin. The tin compound is advantageous in terms of the reaction velocity. The aluminum compound and the titanium compound catalyst are advantageous in terms of the cost of the catalyst and influences on environments. Only one of these catalysts may be used, or two or more thereof may be used in combination.

The amount of polycondensation catalyst added is preferably in the range of 0.0005 to 1% by weight, more preferably in the range of 0.0005 to 0.5% by weight and especially preferably in the range of 0.0005 to 0.2% by weight based on the weight of the polymerization intermediate. If a compound acting also as a polycondensation catalyst in a process of production of BHET is used, the amount of the compound should be included in the amount described above.

According to the polymerization method of the present invention, a polyester resin of high quality can be produced according to the above condition for use of the catalyst, but the more preferable amount of catalyst used is an amount close to the lower limit of the above amount of catalyst used in terms of product quality.

Specifically, the amount polycondensation catalyst is preferably a used amount of at least one catalyst in an amount of 3 to 300 ppm as a total amount of metal atoms, selected from an Sn catalyst in an amount less than 50 ppm; a catalyst selected from Ti, Ge, Al and Mg in an amount less than 100 ppm, respectively; and a catalyst selected from metals of the IB group and II to VIII groups of the periodic system other than the above metals in an amount less than 300 ppm, respectively, in terms of metal atoms based on the amount of polymerization intermediate.

For each type of catalyst described above, the antimony compound and tin compound catalysts have disadvantages of degradation of the hue of the resin, precipitation of the catalyst, adverse effects on environments and the like. The germanium compound catalyst has a disadvantage of expensiveness. The aluminum compound and titanium compound catalysts have a disadvantage that the hue of the resin is much poor than that of the antimony compound and the germanium compound. For these problems, a method of reducing the amount of catalyst used for the purpose of reduction of catalyst cost and alleviation of adverse effects on environments and degradation of the hue of the resin, a method of adding a phosphorus compound or the like for the purpose of inhibiting the activity of the polymerization catalyst to prevent degradation of the hue of the resin, and the like have been proposed. However, if a sufficient effect is to be obtained by these methods, the velocity of the polymerization reaction significantly decreases, so that productivity is degraded, much time is required for the reaction, and it is necessary to increase the polymerization temperature. As a result, the amount of byproduct increases and the hue is degraded against the intention, and it is thus impossible to obtain adequate results.

In the polymerization method of the present invention, surprisingly, even if the amount of these catalysts used is considerably reduced, a reduction in productivity is insignificant, and reduction of the catalyst cost, alleviation of effects on environments, improvement of the hue of the polymer and the like can be adequately achieved. Even if a phosphorus compound or the like is added, a reduction in productivity is insignificant, thus making it possible to further improve the hue of the resin. Moreover, the reduction in hue and the amount of thermal decomposition byproduct during the molding of a produced resin can be alleviated.

Especially preferable as a polycondensation catalyst is at least one metal-containing compound selected from the group consisting of antimony compounds, germanium compounds, titanium compounds and aluminum compounds. For the antimony compound, antimony pentaoxide, metal antimony and alkoxides represented by antimony glycoxide and antimony isopropoxide are preferable in addition to the diantimony trioxide and antimony acetate described above; for the germanium compound, germanium tetrachloride, germanium acetate, metal germanium, and alkoxides represented by germanium glycoxide and germanium isopropoxide are preferable in addition to the germanium dioxide described above; for the titanium compound, hydrolysates obtained by hydrolyzing titanium halides or titanium alkoxides, complexes prepared by dehydrating and drying hydrolysates obtained by hydrolyzing titanium halides or titanium alkoxides under coexistence of a polyvalent alcohol, titanium oxalate, titanium acetate, titanium benzoate, titanium trimellitate, metal titanium, and reactants of any one or more of the above titanium compounds and trimellitic anhydrate are preferable in addition to the titanium alkoxides represented by titanium tetrabutoxide, titanium tetra n-propoxide, titanium tetraisopropoxide, titanium tetra n-butoxide, titanium tetraisobutoxide, titanium tetra t-butoxide, titanium tetracyclohexide, tetraphenyl titanate and tetrabenzyl titanate, titanium dioxide, and complex salts of titanium dioxide and silicon dioxide described above; and for the aluminum compound, there are metal aluminum, carboxylates such as aluminum formate, basic aluminum acetate, aluminum propionate, aluminum oxalate, aluminum acrylate, aluminum laurate, aluminum stearate, aluminum benzoate, aluminum trichloroacetate, aluminum lactate, aluminum citrate, aluminum salicylate, inorganic acid salts such as aluminum chloride, aluminum hydroxide, aluminum chloride hydroxide, aluminum carbonate, aluminum phosphate and aluminum phosphonate, aluminum alkoxides such as aluminum methoxide, aluminum ethoxide, aluminum n-propxide, aluminum iso-propoxide, aluminum n-butoxide and aluminum t-butoxide, aluminum chelate compounds such as aluminum acetylacetnate, aluminum acetylacetate, aluminum ethylacetacetate and aluminum ethylacetacetate diiso-propoxide, organic aluminum compounds such as trimethyl aluminum and trimethyl aluminum and partial hydrolysates thereof, and aluminum oxide in addition to the aluminum acetate, aluminum isopropoxide and aluminum phosphate described above. Among them, carboxylates, inorganic acid salts and chelate compounds are preferable and among them, further, aluminum acetate, aluminum chloride, aluminum hydroxide, aluminum chloride hydroxide and aluminum acetylacetnate are especially preferable.

Further, catalysts containing at least one of these aluminum compounds and phenol compounds are also preferable. Phenol compounds are not specifically limited as long as they are compounds having a phenol structure, but they may include, for example, 1,3,5-trimethyl 2,4,6-tris(3,5-di-t-butyl-4-hydroxybenzyl)benzene, tetrakis-(methyl-3-(3',5'-di-t-butyl-4-hydroxyphenyl)propionate)methane, thiodiethylene-bis(3-(3,5-di-t-butyl-4-hydroxyphenyl)propionate), 2,6-di-t-butyl-4-methylphenol, 2,6-di-t-butyl-4-ethylphenol, 2,6-dicyclohexyl-4-methylphenol, 2,6-diisopropyl-4-ethylphenol, 2,6 di-t-amyl-4-methylphenol, 2,6-di-t-octyl-4-n-propylphenol, N,N'-hexamethylenebis(3,5-di-t-butyl-4-hydroxy-hydrocinamide), 1,3,5-tris(2,6-dimethyl-3-hydroxy-4-tpbutylbenzyl)isocyanurate, 2-cyclohexyl-4-n-butyl-6-isopropylphenol and 1,1,1-tris(4-hydroxyphenyl)ethane.

Two or more of these compounds may be used in combination. By adding these phenol compounds during polymerization, the catalytic activity of the aluminum compound is improved and the thermal stability of polyester produced is improved. The amount of the above described phenol compound added is preferably in the range of $5 \times 10^{-5}$ to 1 mol %, and further preferably in the range of $1 \times 10^{-4}$ to 0.5 mol % based on the number of moles of all carboxylic acid components such as dicarboxylic acid and polyvalent carboxylic acid in the obtained polyester.

It is also preferable that in addition to the compounds described above, metal compounds of sodium, potassium, magnesium, calcium, iron, cobalt, copper, tin, zirconium, hafnium and the like are used in combination or one of these metal compounds is used as a polycondensation catalyst. If the antimony compounds, germanium compounds, titanium compounds and aluminum compounds are used in combination, an arbitrarily selected metal compound can be separately added, but it is also preferable that a coprecipitate is prepared by concurrent hydrolysis and added.

Coexistence at least one of alkali compounds coexist in the polymerization intermediate as necessary has an effect of inhibiting generation of foreign matters and degradation of the hue, and is thud preferable. The alkali compound for use in the present invention is a generalized alkali, and refers to an entire group consisting of hydroxides of alkali metals and alkaline earth metals as well as alkali metal carbonates, ammonia, amine and derivatives thereof. More specifically, examples of alkali compounds of nitrogen-containing alkali compounds include ammonia, diethyl amine, trimethyl amine, ethylene diamine, pyridine, quinoline, pyrroline, piperidine, pyrolidone and tetramethylammonium hydroxide. These compounds may be separately added to the polymerization intermediate, or a method in which these compounds are added with the compound in contact with the polycondensation catalyst is preferable, and especially preferable when they are used in combination with titanium compounds and aluminum compounds.

Examples of alkali compounds of alkali metals include lithium compounds, sodium compounds, potassium compounds, rubidium compounds and cesium compounds. Among them, sodium compounds and potassium compounds are preferable. Examples of alkali compounds of alkaline earth metals include calcium compounds, magnesium compounds, strontium compounds and barium compounds. Among them, calcium compounds and magnesium compounds are preferable. Alkali metals and alkaline earth metals are used in the form of salts such as sulfates, carbonates, chlorides, acetates, formates and benzoates. These compounds may be separately added to the polymerization intermediate, or a method in which these compounds are added with the compound in contact with the polycondensation catalyst is preferable, and especially preferable when they are used in combination with titanium compounds and aluminum compounds because the activity of the polymerization reaction is improved.

If the alkali compound is added in the present invention, the amount of alkali compound added is preferably in the range of 50 to 5000 ppm based on the amount of polyester resin obtained. However, it is preferable that the total amount of metal-containing components does not exceed 300 ppm. If the amount is less than 50 ppm, an effect of inhibiting generation of foreign matters is hard to be obtained. If the compound is added in an amount greater than 5000 ppm, the hue of the obtained polyester resin may be degraded. The amount of the compound added is preferably in the range of 60 to 3000 ppm, and especially preferably in the range of 70 to 1000 ppm.

Coexistence of at least one of phosphorus compounds in the polymerization intermediate as necessary has an effect of inhibiting generation of foreign matters and degradation of the hue, and is thus preferable. The phosphorus compound is not specifically limited, but is selected from, for example, phosphoric acid, polyphosphoric acid, tripolyphosphoric acid, phosphorous acid, trioctyl phosphate, triphenyl phosphate, triphenyl phosphite, hypophosphoric acid, methyl hypophosphite, trimethyl hypophosphite, dimethyl esters, diethyl esters, dipropyl esters and dibutyl esters of phosphonic acid derivatives such as phenyl phosphonic acid, ethyl phosphonic acid, propyl phosphonic acid, butyl phosphonic acid, biphenyl phosphonic acid, naphthyl phosphonic acid, 2-carboxyphenyl phosphonic acid, 2,6-dicarboxyphenyl phosphonic acid, 2,3,4-tricarboxyphenyl phosphonic acid, phenyl phosphinic acid, ethyl phosphinic acid, propyl phosphinic acid, butyl phosphinic acid, biphenyl phosphinic acid, diphenyl phosphinic acid, diethyl phosphinic acid, dipropyl phosphinic acid, dibutyl phosphinic acid, 2-carboxyphenyl phosphinic acid, 2,-dicarboxyphenyl phosphinic acid, 2,3,4-tricarboxyphenyl phosphinic acid, 2,3,5-tricarboxyphenyl phosphinic acid, 2,3,6-tricarboxyphenyl phosphinic acid, bis (2,4,6-tricarboxyphenyl)phosphinic acid, carbomethoxymethane phosphonic acid, carboethoxymethane phosphonic acid, carbopropoxymethane phosphonic acid, carbobutoxymethane phosphonic acid and carbomethoxyphenylmethane phosphonic acid, phosphates such as lithium phosphate, sodium phosphate, sodium dihydrogen phosphate, disodium hydrogen phosphate, potassium phosphate, potassium dihydrogen phosphate, dipotassium hydrogen phosphate, strontium phosphate, zirconium phosphate, barium phosphate and aluminum phosphate, phosphites such as lithium phosphite, sodium phosphite, potassium phosphite, zirconium phosphite, barium phosphite and aluminum phosphite, and the like.

The phosphorus compound can be added directly to the polymerization intermediate. A method in which the phosphor compound is added with the phosphor compound in direct contact with a metal compound as a polycondensation catalyst, or added in a form of a reaction product obtained by making the phosphor compound undergo a reaction in water and/or an organic solvent is also preferable.

If the phosphorus compound is added in the present invention, the amount of phosphor compound added is preferably in the range of 2 to 5000 ppm based on the amount of polyester obtained. If the amount is less than 2 ppm, an effect of inhibiting generation of foreign matters is hard to be obtained, and if the phosphor compound is added in an amount greater than 5000 ppm, the polycondensation reaction may be hard to proceed. The amount of the compound added is more preferably in the range of 5 to 2000 ppm, further preferably in the range of 10 to 1000 ppm, especially preferably in the range of 15 to 500 ppm, most preferably in the range of 20 to 200 ppm, and especially most preferably in the range of 20 to 100 ppm.

Addition of a cobalt compound together with the above metal-containing organic compounds as necessary is preferable because the hue of a polyester resin produced is further improved in addition to the action as a polycondensation catalyst. The type of cobalt catalyst is not specifically limited, but examples thereof include cobalt acetate, cobalt nitrate, cobalt chloride, cobalt acetyl acetate and cobalt naphthenate. The amount of cobalt compound added may be arbitrarily selected according to applications, but is usually preferably 100 ppm or less and more preferably 50 ppm or less in the case of, for example, applications of beverage containers.

The reason why in this way, a polyester resin having a high polymerization degree and high quality can be produced while reducing the amount of catalyst used in the present invention is as follows. Namely, in the polymerization reactor of the present invention, the surface turnover of the polymerization intermediate involved in a polymerization reaction is extremely high, and the polymerization reaction easily proceeds; the polymerization reactor has no stirring mechanism, and therefore a resin having a high polymerization degree is not subjected to a high shear force, and the cutoff of a molecular chain does not occur during polymerization; and in addition because the polymerization reactor has no stirring mechanism, polymerization can be carried out under a condition in which the amount of oxygen mixed is small, and at a low temperature, and therefore a reduction in catalyst activity due to degeneration of the resin or catalyst itself, agglomeration of the catalyst, influences of degenerated matters and the like is hard to occur.

Examples of apparatuses carrying out polycondensation include previously publicly known vertical stirring polymerization reactors; horizontal stirring reaction vessels having a uniaxial or biaxial stirring vane; gravity flow type thin film polymerization reactors having shelves; thin film polymerization reactors in which a raw material flows down under gravity along an inclined plane; tube type polymerization reactors; wetted-wall columns; and apparatuses discharging a raw material through holes of a perforated plate and making the material undergo a reaction while falling along a support, like the polymerization reactor of the present invention described in detail later. Of course, they may be used in combination.

For the polycondensation reaction apparatus, a single apparatus may be used from the start of polycondensation of BHET to the production of a polymerization intermediate in the batch polymerization method, but of course, the reaction apparatus may be divided into two or more reaction vessel. In the continuous polymerization method, a single apparatus may be used, but for making the reaction proceed efficiently, the apparatus may be divided into two or more reaction vessels where the temperature, the degree of reduced pressure and the like are changed.

Time required for the reaction after polycondensation of BHET is started until the polymerization intermediate is produced is normally in the range of 30 minutes to 20 hours. The reaction time is preferably 30 minutes or more for producing a polymerization intermediate having a polymerization degree suitable for the polymerization reactor of the present invention described later, and the reaction time is preferably 20 hours or less for obtaining a product excellent in quality such as a hue. The reaction time is more preferably in the range of 35 minutes to 10 hours, further preferably in the range of 40 minutes to 5 hours, and especially preferably in the range of 45 minutes to 3 hours.

The amount of carboxyl group on the terminal of a polymerization intermediate produced by the ester exchange method is preferably 50 meq/kg or less. More preferable is 45 meq/kg or less, further preferable is 40 meq/kg or less, especially preferable is 35 meq/kg or less, most preferable is 30 meq/kg or less, and especially most preferable is 25 meq/kg or less.

The amount carboxyl group on the terminal of a polymerization intermediate produced by the direct esterification method is preferably 70 meq/kg or less. Particularly if the intrinsic viscosity [η] of the polymerization intermediate is 0.4 dl/g or more, the amount of carboxyl group is preferably 50 meq/kg or less, more preferably 45 meq/kg or less, further preferably 40 meq/kg or less, especially preferably 35 meq/kg or less, most preferably 30 meq/kg or less, and especially most preferably 25 meq/kg or less. When the intrinsic viscosity [η] of the polymerization intermediate is less than 0.4 dl/g, the amount of carboxyl group is more preferably 60 meq/kg or less, and further preferably 50 meq/kg or less.

If other conditions for the polymerization intermediate are the same, conductivity in the polymerization reactor of the present invention improves as the amount of carboxyl group of the polymerization intermediate decreases. Furthermore, the quality of the product also improves.

The polymerization degree of a polymerization intermediate suitable for the present invention can be specified by a melt viscosity evaluated under the condition of a shear rate of 1000 (sec$^{-1}$) at a temperature at which polymerization is carried out in the polymerization reactor of the present invention, and the polymerization degree is preferably in the range of 60 to 100000 (poise). By setting the polymerization degree to 60 (poise) or more, vigorous bubbling and splashing of the polymerization intermediate discharged through holes of the perforated plate of the polymerization reactor can be inhibited. By setting the polymerization degree to 100000 (poise) or less, the reaction byproduct can be efficiently removed to outside the system so that polymerization swiftly proceeds. The polymerization degree is more preferably in the range of 100 to 50000 (poise), further preferably in the range of 200 to 10000 (poise), and especially preferably in the range of 300 to 5000 (poise). One reason why a polymerization intermediate having a relatively high viscosity is thus preferred in the present invention is that polymerization is carried out with the resin containing a large amount of bubbles as described previously and as a result, the polymerization velocity dramatically increases. For another reason, if the polymerization intermediate discharged through holes of the perforated plate vigorously bubbles and splashes, splashed matters are deposited on, and smears, the nozzle surface and wall surfaces of the perforated plate through which the polymerization intermediate is discharged. The deposited polymerization intermediate is thermally decomposed into a colored low-molecular weight matters and degenerated matters as it resides over a long time period. If such matters find their way into a product, quality is degraded such that a predetermined polymerization degree is not achieved. For preventing the splashing of the resin due to vigorous bubbling, the polymerization degree of the polymerization intermediate should be within the range described above. For producing a polyester resin having a less content of impurities such as acetaldehyde, the polymerization intermediate preferably has a lower polymerization degree. This is probably because the amount of byproducts of the polycondensation reaction such as EG increases, and therefore impurities are efficiently removed with the impurities entrained in these byproducts.

The polymerization degree of the polymerization intermediate suitable for the present invention is in the range of 6000 to 80000 if specified as a number average molecular weight.

If the polymerization intermediate is a polyethylene terephthalate resin, the polymerization degree suitable for the present invention may also be specified as an intrinsic viscosity [η]. The intrinsic viscosity [η] of the polymerization intermediate of the polyethylene terephthalate resin is in the range of 0.2 to 2.0 dl/g, preferably in the range of 0.25 to 1.5 dl/g, more preferably in the range of 0.3 to 1.2 dl/g, further preferably in the range of 0.4 to 0.8 dl/g, especially preferably in the range of 0.42 to 0.7 dl/g, and most preferably in the range of 0.44 to 0.6 dl/g.

For a specific method for producing the polymerization intermediate described above, a reference may be made to, for example, "Polymer Synthesis, vol. 1, second edition," 1992 (issued by Academic Press, Inc., U.S.).

In the method for producing the polyethylene terephthalate resin of the present invention, one method for producing a polyethylene terephthalate resin having a content of cyclic trimer of 0.8 wt % or less is the following method. Namely, it is a method in which a polymerization intermediate of a polyethylene terephthalate resin having an intrinsic viscosity [η] of 0.2 to 2.0 dl/g and a content of cyclic trimer of 0.8% by weight or less is polymerized under a reduced pressure at a temperature in the range of a temperature lower by 10° C. than the crystalline melting point of the polymerization intermediate to a temperature higher by 30° C. than the crystalline melting point of the polymerization intermediate while falling along a support in the polymerization reactor of the present invention.

Here, the method for producing a polymerization intermediate of a polyethylene terephthalate resin having a content of cyclic trimer of 0.8% by weight or less is not specifically limited, and a previously publicly known method may be used. Examples of the method include a method in which the cyclic trimer contained in the polymerization intermediate is removed by extraction and/or devolatilization; a method in which a polymerization intermediate having a content of cyclic trimer of 0.8% by weight or less is prepared by producing a polymerization intermediate by the solid-state polycondensation method; a method in which a polyethylene terephthalate resin produced by the solid-state polycondensation method and having a content of cyclic trimer of 0.8% by weight or less is crushed, and this crushed resin is directly used, or a material of which the molecular weight is arbitrarily adjusted by making the resin undergo a reaction with a molecular weight regulator as necessary is adjusted so that the content of cyclic trimer contained in the polymerization intermediate is 0.8% by weight or less, and used as part or all of the polymerization intermediate; and a method in which a polymerization intermediate having a content of cyclic trimer of 0.8% by weight or less is produced using a polymerization catalyst containing an element such as tin or titanium having a capability of ring opening polymerization of a cyclic trimer.

For further reducing the content of cyclic trimer in the polyethylene terephthalate resin of the product, the content of cyclic trimer in the polymerization intermediate is preferably lower. More preferable is 0.7% by weight or less, further preferable is 0.6% by weight or less, especially preferably is 0.5% by weight or less, most preferable is 0.4% by weight or less, and especially most preferable is 0.3% by weight or less.

A polymerization intermediate of which the content of cyclic trimer increases by 0.2% by weight or less when held in a molten state at 275° C. for 30 minutes is fed into the polymerization reactor of the present invention and polymerized, whereby the rate of generation of the cyclic trimer during polymerization can be made further sluggish. Thus, a polyethylene terephthalate resin having a lower content of cyclic trimer can be obtained, and moreover the rate of generation of the cyclic trimer by an equilibration reaction when the produced resin is melt-molded can be reduced. As a result, a molded article having a low content of cyclic trimer can be produced. Particularly, in the present invention, the produced resin can be transferred to a molding machine in a molten state and formed with high efficiency. Therefore, it is preferable that an increase in content of cyclic trimer during transfer is reduced to inhibit the problem of mold deposit or the like impairing molding efficiency.

The method for reducing to 0.20% by weight or less an increase in content of cyclic trimer when the polymerization intermediate is held in a molten state at 275° C. for 30 minutes is not specifically limited, and a previously publicly known method may be used. Examples of the method include a method in which water or a compound containing an element such as phosphorus is added to the polymerization intermediate to adjust the activity of a polymerization catalyst involved in a reaction producing a cyclic trimer as a byproduct; and a method in which a hydroxyl group on the terminal of the molecule of the polymerization intermediate serving as an origin of a reaction producing a cyclic trimer is replaced by a different functional group. In a usual method for polymerization of polyester, if the above-mentioned method is used for the polymerization intermediate, the polymerization activity itself drops, and therefore a polyethylene terephthalate resin having a high polymerization degree cannot be produced with good productivity. In contrast to this, in the polymerization reactor of the present invention, a polymerization reaction proceeds with high efficiency compared with the conventional polymerization apparatus, and therefore a resin having a high polymerization degree can be produced with good productivity.

For obtaining a sufficient effect for reduction of the content of cyclic trimer in the present invention, the increase in content of cyclic trimer when the polymerization intermediate is held in a molten state at 275° C. for 30 minutes is preferably 0.20% by weight or less. The increase in content of cyclic trimer when the polymerization intermediate is held in a molten state at 275° C. for 30 minutes is more preferably 0.15% by weight or less, further preferably 0.10% by weight or less, especially preferably 0.05% by weight or less, most preferably 0.03% by weight or less, and especially most preferably 0.02% by weight or less.

(III) Explanation of Polymerization Reactor of the Present Invention

The polymerization reactor of the present invention is an apparatus characterized in that the above-mentioned polymerization intermediate is fed into the polymerization reactor in a molten state, discharged through holes of a perforated plate, and then subjected to melt polycondensation under a reduced pressure or under an inert gas atmosphere under a reduced pressure while falling along a support.

(III-1) Perforated Plate

The perforated plate is a plate having a plurality of through-holes. By using the perforated plate, a biased flow of the polymerization intermediate is inhibited and local residence of the material in the reaction vessel is prevented, thus making it possible to produce a high-quality and homogenous resin.

For the structure of the perforated plate, the thickness is not specifically limited, but is usually in the range of 0.1 to 300 mm, preferably in the range of 1 to 200 mm, and further preferably in the range of 5 to 150 mm. The perforated plate is required to have a strength for enduring a pressure of feeding chamber for the melt polymerization intermediate, and bearing the weights of the support and the falling polymerization intermediate if the support of a polymerization chamber is fixed to the perforated plate. It is preferably reinforced with a rib or the like.

The shape of the hole of the perforated plate is usually selected from circular, elliptic, triangular, slit, polygonal and star shapes and the like. The cross-sectional area of the hole is usually in the range of 0.01 to 100 $cm^2$, preferably in the range of 0.05 to 10 $cm^2$, and especially preferably in the range of 0.1 to 5 $cm^2$. Provision of a nozzle or the like connected to the hole is also included.

The distance between holes is usually in the range of 1 to 500 mm, and preferably in the range of 10 to 100 mm in terms of a distance between the centers of holes. The hole of the perforated plate may be a hole perforating the perforated plate, or may be a hole of a pipe attached to the perforated plate. It may be tapered. It is preferable that the size and shape of the hole are determined so that the pressure loss when the polymerization intermediate passes through the perforated plate is in the range of 0.1 to 50 $kg/cm^2$.

The number of holes of the perforated plate is not specifically limited, and varies depending on conditions of the reaction temperature, pressure and the like, the amount of catalyst, the range of molecular weights for polymerization, and the like. Normally, when a polymer is produced at a rate of, for example, 100 kg/hr, 10 to $10^5$ holes, more preferably 50 to $10^4$ holes and further preferably $10^2$ to $10^3$ holes are required.

Normally, the material of the perforated plate is preferably metal materials made of stainless steel, carbon steel, hastelloy, nickel, titanium, chromium and other alloys.

Examples of the method for discharging the polymerization intermediate through such a perforated plate include a method in which the material is made to fall by a liquid head or under its own weight, and a method in which the material is squeezed out under pressure using a pump or the like. It is preferable that the polymerization intermediate is squeezed out using a pump, such as a gear pump, having a metering capability for inhibiting variations in the amount of the falling polymerization intermediate.

A filter is preferably provided in a channel on the upstream side from the perforated plate. By the filter, foreign matters clogging holes of the perforated plate can be removed. The type of filter is appropriately selected so that foreign matters having a size equal to or greater than that of the hole of the perforated plate can be removed, and the filter is not damaged by passage of the polymerization intermediate.

For the filter, for example, the filtration accuracy is preferably in the range of 0.2 to 200 µm. The filtration accuracy is an index representing the size of a particle of minimum size removable by the filter. The filtration accuracy is preferable 0.2 µm or greater in terms of the frequency of replacement due to the clogging of the filter, and is preferably 200 µm or less in terms of the size of foreign matters perceived by the human eye. The filtration accuracy of the filter is more preferably in the range of 0.5 to 180 µm, further preferably in the range of 1 to 150 µm especially preferably in the range of 3 to 120 µm, most preferably in the range of 5 to 100 µm, and especially most preferably in the range of 10 to 80 µm.

The temperature of the filter is preferably in the range of a temperature lower by 20° C. than the crystalline melting point of the polymerization intermediate made to pass through the filter to a temperature higher by 100° C. than the crystalline melting point of the polymerization intermediate. If the polymerization intermediate shows no crystalline melting point, the filter temperature is preferably in the range of the higher of 100° C. or a temperature at which the polymerization intermediate is evaluated at a shear velocity of 1000 ($sec^{-1}$) is 100000 (poise) or greater, to 350° C. A temperature equal to or higher than the lower limit of the ranged described above is preferable in terms of prevention of adverse effects on product quality and damage of the filter due to shear heat generation occurring when the polymerization intermediate passes through the filter. A temperature equal to or lower than the upper limit of the range described above is preferable in terms of prevention of adverse effects on product quality due to the heating of the polymerization intermediate in the filter. The temperature of the filter is more preferably is in the range of a temperature lower by 10° C. than the crystalline melting point of the polymerization intermediate to a temperature higher by 90° C. than the crystalline melting point of the polymerization intermediate. The temperature is further preferably in the range of a temperature lower by 10° C. than the crystalline melting point of the polymerization intermediate to a temperature higher by 80° C. than the crystalline melting point of the polymerization intermediate, especially preferably in the range of a temperature lower by 10° C. than the crystalline melting point of the polymerization intermediate to a temperature higher by 70° C. than the crystalline melting point of the polymerization intermediate, and most preferably in the range of a temperature lower by 10° C. than the crystalline melting point of the polymerization intermediate to a temperature higher by 60° C. than the crystalline melting point of the polymerization intermediate.

Examples of the material of the polymer filter may include wire nets, metallic powder sintered bodies, metallic fiber sintered bodies and sintered metal stacked wire nets. Among them, nonwoven sintered bodies composed of stainless steel long fibers are preferable. Examples of the shape of the filter include a candle shape, a cylindrical shape, a cylindrical shape with a pleat, a disc shape and a leaf disc shape.

A filter may also be provided on extraction side of the polymerization reactor of the present invention, but the filtration accuracy of the filter preferably exceeds 10 μm. If the filtration accuracy is less than 10 μm, the polymer is degenerated due to shear heat generation. More preferable is 20 μm or greater, and further preferable is 30 μm or greater.

By making the polymerization intermediate pass through the filter under the above conditions when its viscosity is still low, very small foreign matters can be removed without causing significant shear heat generation to occur even if a filter with a relatively low filtration accuracy (aperture) is used. In this way, surface roughing such as fisheye can be prevented when the obtained resin is molded into a bottle, sheet or the like. The feed pressure for filtration can be reduced, and the filtration area can be reduced. Therefore, the structure is simplified, thus making it possible to reduce the size.

By making the polymerization intermediate pass through the filter when its viscosity is still low in this way, control of the temperature of a filter portion is facilitated. Further, degeneration of the polymer due to shear generation (coloring of the product, surface roughing of the product due to occurrence of foreign matters, rise in pressure of the resin due to occurrence of foreign matters, and the like) is insignificant, and a rise in feed pressure is low compared to an increase in degree of clocking of the filter. Therefore, a stable operation can be performed over a long time period.

In the polymerization reactor of the present invention, polymerization can be carried out at a low temperature close to the melting point of the resin, and productivity is extremely high, and therefore no fine foreign matters newly occur within the polymerization reactor. Therefore, the filter should be placed only in the upstream of the feed opening of the polymerization reactor of the present invention, and it is not necessary at all to provide a filter on the extraction port side of the polymerization reactor. It is not necessary to make a highly polymerized polymer on the extraction port side of the polymerization reactor pass through a polymer filter having a small aperture. Therefore, a high-quality resin and formed material having reduced degeneration such as coloring due to shear heat generation and an increase in content of acetaldehyde polymer after extraction from the polymerization reactor can be produced.

In contrast to this, in the conventional polymerization reactor, the polymerization temperature is higher and the residence time in the polymerization reactor is longer, and therefore product quality is inevitably degraded unless a polymer filter is provided on the extraction port side of the polymerization reactor.

(III-2) Support

The polymerization intermediate discharged through holed of the perforated plate falls along a support. Examples of the specific structure of the support include "wire" shape; "chain shape" and "lattice shape (wire net shape)" having a wire-shaped material combined; "space lattice shape" having a wire-shaped material coupled like so called a jungle gym; "thin plate shape" being flat or curved; and "perforated plate shape." In addition, it is preferable for efficiently extracting reaction byproducts, impurities generated by thermal decomposition, and the like, the surface area of the resin made to fall is increased, the resin is made to fall along a support having irregularities (concavities and convexities) along a direction in which the polymerization intermediate falls to cause stirring and surface update to actively occur. A support having a structure hindering the resin from falling, such as "wire shape having irregularities along the direction in which the resin falls," is also preferable. These supports may be used in combination.

The "wire shape" represents a material in which the ratio of a length along a direction vertical to a cross section to an average length of the outer periphery of the cross section is very high. The area of the cross section is not specifically limited, but it is usually in the range of $10^{-3}$ to $10^2$ cm$^2$, preferably in the range of $10^{-3}$ to $10^1$ cm$^2$, and especially preferably in the range of $10^{-2}$ to 1 cm$^2$. The shape of the cross section is not specifically limited, and is usually selected from shapes such as a circular shape, an elliptic shape, a triangular shape, a rectangular shape, a polygonal shape and a star shape. The shape of the cross section is either fixed or varied along the lengthwise direction. Wires include hollow wires. The wire is either a single wire having a wiry shape or the like or multiple wires combined by a method such as stranding. Examples of the surface of the wire include a flat surface, a surface having irregularities, a surface having partially protrusions or the like.

The "chain shape" represents a material having rings made of the above described wire material coupled together. Examples of the shape of the ring include a circular shape, an elliptic shape, a rectangular shape and a quadrate form. The way of coupling is any of one-dimensional coupling, two-dimensional coupling and three-dimensional coupling.

The "lattice shape (wire net shape) represents a material having the above-described wire-shaped material combined into a lattice shape. The wire to be combined is either linear or a curved, and an angle of combination may be freely selected. The ration of the area of the material to space when the lattice-shaped (wire net-shaped) material is projected onto the surface in a vertical direction is not specifically limited, but it is usually in the range of 1:0.5 to 1:1000, preferably in the range of 1:1 to 1:500, and especially preferably in the range of 1:5 to 1:100. The ratio of the area is preferably 1:1 in a horizontal direction, and is preferably 1:1 or such that the ratio of space becomes greater in the lower part in a vertical direction.

The "space lattice shape" represents a material having the wire-shaped material combined three-dimensionally into a space lattice shape like so called a jungle gym. The wire to be combined is either linear or curved, and an angle of combination may be freely selected.

The "wire shape having irregularities along a direction in which the polymer halls" represents a material having a stick having a circular cross section or polygonal cross section attached to the wire, or a material having a disc or cylinder attached to the wire. The step of irregularities is preferably 5 mm or greater. Specific examples include a wire with discs in which a wire extends through a disk having a size larger by 5 mm or greater than the wire size and nor larger than 100 mm and a thickness of 1 to 50 mm, and the distance between the discs is in the range of 1 to 500 mm.

The volume ratio of the volume of the support placed in the reaction vessel to space of the reaction vessel is not specifically limited, but it is usually in the range of 1:0.5 to 1:$10^7$, preferably in the range of 1:10 to 1:$10^6$, and especially preferably in the range of 1:50 to 1:$10^5$. The volume ratio of the volume of the support to space of the reaction vessel is preferably 1:1 in a horizontal direction, and is preferably 1:1 or such that the ratio of space of the reaction vessel becomes greater in the lower part in a vertical direction.

Provision of a single support or provision of multiple supports may be appropriately selected according to the shape. In the case of "wire shape" and "chain shape," the number of supports is usually in the range of 1 to $10^5$, and preferably in the range of 3 to $10^4$. In the case of "lattice shape," "two-dimensionally coupled chain shape," "thin plate shape" and "perforated plate shape," the number of supports is usually in the range of 1 to $10^4$, and preferably in the range of 2 to $10^3$. In the case of "three-dimensionally coupled chain shape" and "space lattice shape," providing a single support or dividing the support into multiple supports may be appropriately selected considering the size of the apparatus, installation space and the like.

In the case of multiple supports, it is preferable that a spacer or the like is appropriately used so that supports are not in contact with one another.

The material of the support is not specifically limited, but it is usually selected from stainless steel, carbon steel, hastelloy, titanium and the like. The wire may be subjected to various surface treatments such as plating, lining, passivation processing and acid cleaning.

In the present invention, the polymerization intermediate is usually fed through one or more hole of the perforated plate for one support, but the number of holes may be appropriately selected according to the shape of the support. The polymerization intermediate which has passed through one hole can be made to fall along a plurality of supports.

The position of the support is not specifically limited as long as it allows the polymerization intermediate to fall along the support. For the method for attaching the support to the perforated plate, a method in which the hole of the perforated plate is perorated to place the support or a method in which the support is placed in the lower part of the hole of the perforated plate without perforating the hole may be appropriately selected.

The height at which the polymerization intermediate which has passed through the hole falls along the support is preferably in the range of 0.5 to 50 m, further preferably in the range of 1 to 20 m, and more preferably in the range of 2 to 10 m.

(III-3) Heating Apparatus

The polymerization temperature can be appropriately set by controlling the temperature of a heater or heat medium jacket placed on the surface of the wall of the polymerization reactor covering the support, or putting a heater or heat medium in the interior of the support and controlling the temperature thereof.

(III-4) Pressure Reducing Apparatus

The degree of a reduced pressure of the polymerization reactor can be appropriately set by connecting an evacuation port placed at any location in the polymerization reactor to a vacuum line and controlling the degree of the reduced pressure. From the evacuation port, impurities produced by thermal decomposition during polymerization, an inert gas introduced into the polymerization reactor as necessary, and the like are discharged.

(III-5) Inert Gas Feeding Apparatus

If an inert gas is introduced directly into the polymerization reactor for the purpose of carrying out a reaction under an inert gas atmosphere under a reduced pressure, the inert gas can be fed through an inlet placed at any location in the polymerization reactor. The position of the inert gas inlet is preferably distant from the perforated plate, and close to the extraction port for the resin. It is also preferably away from the evacuation port. Alternatively, the polymerization intermediate can be made to absorb and/or contain an inert gas in advance. In this case, an inert gas feeding apparatus is additionally provided in the upstream in the polymerization reactor.

The inert gas feeding apparatus uses, for example, a method in which a publicly known absorption apparatus such as a packed tower type absorption apparatus, shelf type absorption apparatus or spray tower type absorption apparatus described in Chemical Apparatus Design/Operation Series No. 2, Revised Gas Absorption, pp. 49-54 (issued by Kagaku Kogyo Ltd. at Mar. 15, 1981) is used, a method in which an inert gas is injected into a pipe through which the polymerization intermediate is transferred, or the like. Most preferable is a method in which an apparatus making the polymerization intermediate absorb an inert gas while it falls along the support under an inert gas atmosphere is used. In this method, an inert gas having a pressure higher than that in the interior of the polymerization reactor is introduced into an apparatus absorbing the inert gas. The pressure at this time is preferably in the range of 0.01 to 1 MPa, more preferably in the range of 0.05 to 0.5 MPa, and further preferably in the range of 0.1 to 0.2 MPa.

(IV) Explanation of the Polymerization Method According to the Present Invention The present inventors found the following: surprisingly, when an intermediate for polymerization having a polymerization degree in the above-mentioned polymerization degree range is polymerized in the above-mentioned polymerization reactor in the ranges of polymerization temperature and degree of vacuum described hereinafter, the deterioration in quality of a resin by fouling of the nozzle surface and the wall surfaces of the polymerization reactor can be suppressed by preventing spattering of the intermediate for polymerization caused by vigorous foaming just under a perforated plate; and there is caused such a phenomenon that the resin dropped along a support contains a large amount of bubbles, resulting in "extension of the surface area of the resin" and "rolling-down of the resin in a form of bubble agglomerates or in a form of bubble balls". At the same time, the present inventors confirmed a marked increase in the polymerization velocity and the improvement of hue of the resin.

It is conjectured that the marked increase in the polymerization velocity is due to the synergistic effect of the extension of the surface area by the incorporation of a large volume of water and the surface renewal by the plasticizing effect of bubbles. The plasticizing effect of bubbles has made it possible to improve the hue of the resin by reducing the residence time of the resin in the polymerization reactor and take out the highly viscous resin with a high polymerization degree easily from the polymerization reactor.

A conventional gravity-type molten-thin-film polymerization reactor such as a wetted-wall column is designed to polymerize an intermediate for polymerization obtained in the initial reaction and having a low degree of coloring and a polymerization degree much lower than that in the method according to the present invention, at a higher temperature and a shorter resistance time as compared with the method according to the present invention, in order to obtain a resin having a high polymerization degree and a high quality. From a commonsense standpoint, it has been considered that when an intermediate for polymerization having a high polymerization degree and a high melt viscosity as in the method according to the present invention is continuously melt-polymerized, coloring proceeds remarkably and moreover, the residence time during dropping of a resin in a polymerization reactor is extremely increased. Therefore, it has been not conceivable at all that a resin with a high quality can be produced.

On the other hand, in the present invention, the range of the melt viscosity of an intermediate for polymerization is set at a rather high melt viscosity range in contrast to conventional common sense as described above, and moreover, the polymerization temperature is set at a low temperature in contrast to conventional common sense. The present inventors found that by employing these conditions, the following surprising effects can be obtained: the foamed state of a resin can be controlled, the polymerization velocity can be greatly increased at a low temperature rather than at a high temperature, and a resin having a high polymerization degree can easily be taken out.

(IV-1) Polymerization Temperature

The polycondensation reaction temperature is preferably (the crystalline melting point of the polyester resin−10° C.) or more and (the crystalline melting point+30° C.) or less. The adjustment of the reaction temperature to (the crystalline melting point−10° C.) or more makes it possible to prevent the solidification of reactants and the increase of the reaction time. The adjustment of the reaction temperature to (the crystalline melting point+30° C.) or less makes it possible to suppress thermal decomposition and produce a resin having an excellent hue. The temperature is more preferably (the crystalline melting point−5° C.) or more and (the crystalline melting point+25° C.) or less, still more preferably the crystalline melting point or more and (the crystalline melting point+20° C.) or less. The reason why such a relatively low reaction temperature is preferable in the present invention is that it easily allows the resin to contain a large amount of bubbles and hence makes it possible to increase the polymerization velocity greatly.

In general, polymer resins have a temperature-drop crystallization temperature considerably lower than their crystalline melting point. It is known that particularly in the case of slightly crystalline resins among them, the difference between the temperature-drop crystallization temperature and the crystalline melting point is as large as tens degrees. Polyester resins and their intermediates for polymerization also have a low temperature-drop crystallization temperature and hence can be handled even at a temperature 10° C. lower than their crystalline melting point.

Here, the term "crystalline melting point" means the peak temperature of an endothermic peak due to melting of crystals measured under the following conditions with Pyris 1 DSC (an input compensation type differential scanning colorimeter) manufactured by Perkin-Elmer Corporation. The peak temperature was determined by the use of attached analysis software.

Measuring temperature: 0 to 300° C.
Heating rate: 10° C./min.

On the other hand, in the case of slightly crystalline or non-crystalline polyester resins for which no endothermic peak due to melting of crystals is observed, polymerization is preferably carried out at a temperature not higher than 290° C. and not lower than the higher of the following two temperatures: 100° C. and a temperature at which the melt viscosity of the polyester resin taken out of the polymerization reactor is 100,000 (poise) or more when the resin is evaluated at a shear rate of 1,000 (sec$^1$). When the polymerization temperature is within the above range, the resin is satisfactorily foamed, so that polymerization can be carried out while dropping the resin at a short residence time. On the other hand, the quality is hardly deteriorated by thermal decomposition. The polymerization temperature is more preferably not higher than 280° C. and not lower than the higher of the following two temperatures: 150° C. and a temperature at which the melt viscosity of the polyester resin taken out of the polymerization reactor is 100,000 (poise) or more when the resin is evaluated at a shear rate of 1,000 (sec$^1$). The polymerization temperature is still more preferably not higher than 270° C. and not lower than the higher of the following two temperatures: 190° C. and a temperature at which the melt viscosity of the polyester resin taken out of the polymerization reactor is 100,000 (poise) or more when the resin is evaluated at a shear rate of 1,000 (sec$^{-1}$).

(IV-2) Polymerization Pressure

The melt polycondensation reaction according to the present invention should be carried out under reduced pressure also for allowing a resin to contain a large amount of bubbles. The degree of vacuum (i.e., the degree of a reduced pressure) is properly controlled depending on the sublimed states of an intermediate for polymerization and reactants for polycondensation and the reaction rate. The degree of vacuum is preferably 50,000 Pa or less, more preferably 10,000 Pa or less, still more preferably 1,000 Pa or less, particularly preferably 500 Pa or less. Although the lower limit of the degree of vacuum is not prescribed, the degree of vacuum is preferably 0.1 Pa or more from the viewpoint of, for example, the scale of an equipment for evacuating the polymerization reactor.

The following is also a preferable method: a small amount of an inert gas having no undesirable influence on the polycondensation reaction is introduced into the polymerization reactor under reduced pressure, and for example, polymerization by-products and impurities produced by thermal decomposition during the polymerization are removed in company with the gas.

The introduction of an inert gas into a polymerization reactor has been considered as an operation for allowing the reaction to proceed advantageously by reducing the partial pressure of polymerization by-products to displace the equilibrium. However, the amount of an inert gas introduced in the present invention may be very small, and an effect of increasing the polymerization velocity by the partial pressure reduction is so small that it is hardly expectable. Such a role of the inert gas cannot be explained by the conventional way of understanding.

As a result of investigation by the present inventors, the following was observed: surprisingly, the foaming phenomenon of an intermediate for polymerization dropping in a molten state along a support is intensified by the introduction of the inert gas into the polymerization reactor, so that the surface area of the intermediate for polymerization is greatly increased and that the surface renewal state of the intermediate is extremely improved. Although the principle of this fact is not clear, it can be speculated that the change of the interior and surface profile of the intermediate for polymerization causes a marked increase in the polymerization velocity.

The inert gas introduced is preferably a gas having no undesirable influence (e.g. coloring, modification or decomposition) on the resin and includes nitrogen, argon, helium, carbon dioxide, lower hydrocarbon gases, and mixed gases thereof. As the inert gas, nitrogen, argon, helium and carbon dioxide are more preferable. Of these, nitrogen is especially preferable because of its easy availability.

The amount of the gas introduced in the present invention may be very small and is preferably 0.05 to 100 mg per g of a resin to be taken out of the polymerization reactor. When the amount of the inert gas is adjusted to 0.05 mg or more per g of the resin to be taken out, foaming of resin becomes sufficient, so that the improving effect on the polymerization degree is enhanced. On the other hand, when the amount of the inert gas is adjusted to 100 mg or less, it becomes easy to attain a high degree of vacuum. The amount of the inert gas is more preferably 0.1 to 50 mg, particularly preferably 0.2 to 10 mg, per g of the resin to be taken out.

As a method for introducing the inert gas, there can be exemplified a method of directly introducing the inert gas into the polymerization reactor; a method of previously allowing an intermediate for polymerization to absorb and/or contain the inert gas and releasing the absorbed and/or contained gas from the intermediate for polymerization under reduced pressure to introduce the inert gas into the polymerization reactor; and a method comprising a combination of the above two methods. Here, the term "absorb" means the case where the inert gas is dissolved in a resin and is not present as bubbles. And the term "contain" means the case where the inert gas is present as bubbles. When the inert gas is present as bubbles, the bubbles are preferably as small as possible. The average diameter of the bubbles is preferably 5 mm or less, more preferably 2 mm or less.

(IV-3) Polymerization Time

The polymerization time is the sum of a time required for dropping a resin along a support and the residence time of the resin in the bottom of the polymerization reactor. The polymerization time ranges preferably from 10 seconds to 100 hours, more preferably from 1 minute to 10 hours, still more preferably from 5 minutes to 5 hours, particularly preferably from 20 minutes to 3 hours, most preferably 30 minutes to 2 hours.

As a process for producing the polyester resin of the present invention, there can be exemplified a process of continuously feeding an intermediate for polymerization in a molten state into the polymerization reactor through a material feed opening, polymerizing the intermediate while dropping the intermediate along a support from the holes of a perforated plate, and continuously taking out the whole of the dropped resin from the polymerization reactor; and a process of recycling a portion of the dropped polymer and subjecting it to polymerization while dropping it along the support. The process of taking out the whole of the dropped resin is preferable. When a portion of the dropped polymer is recycled and then subjected to polymerization while being dropped along the support, it is preferable to reduce the residence time in a liquid receiver, a recycling line and the like and lower the temperature, in order to prevent thermal decomposition from occurring in these places after the dropping along the support. Also in the process of taking out the whole of the dropped resin, it is preferable to reduce the residence time in the bottom of the polymerization reactor, a taking-out piping and the like in order to prevent thermal decomposition from occurring in these places.

(IV-4) Polymerization Rate

The polymerization capability of the polymerization rector according to the present invention is characterized in that when wire-like supports are used, the design of scale-up is easy because the polymerization capability can be enhanced in proportion to the number of the supports set in the polymerization reactor.

In the case of the wire-like supports, the flow rate of an intermediate for polymerization per support is preferably $10^{-2}$ to $10^2$ liters/hr. By adjusting the flow rate to a value in this range, a sufficient production capacity can be assured and the polymerization velocity can be greatly increased. The flow rate is more preferably 0.1 to 50 liters/hr.

In the case of a support obtained by braiding wires, such as a lattice-like (wire-net-like) support, the flow rate is preferably $10^{-2}$ to $10^2$ liters/hr, more preferably 0.1 to 50 liters/hr, per vertical wire structure constituting the support.

In the case of a support having a structure other than a structure formed by braiding wires, such as a thin-plate-like support, the flow rate is preferably $10^{-2}$ to $10^2$ liters/hr, more preferably 0.1 to 50 liters/hr, per hole of a perforated plate for feeding an intermediate for polymerization to the support.

(IV-5) Molecular Weight Regulator

In the present invention, if necessary, an intermediate for polymerization may be reacted with any amount of a molecular weight regulator in any step before the feed of the intermediate for polymerization into the polymerization rector according to the present invention. The present inventors found the following: the rate of dropping of the intermediate for polymerization along a support can be drastically changed by changing the molecular weight of the intermediate for polymerization to be fed into the polymerization rector according to the present invention; and by this dropping rate change, the residence time in the polymerization reactor can be controlled, so that the quality (e.g. polymerization degree) and output of the polyester resin produced can easily be controlled in wide ranges.

As the molecular weight regulator, a molecular weight reducing agent or a molecular weight increasing agent is used. In the present invention, by using the molecular weight regulator, the quality (e.g. polymerization degree) and output of the polyester resin can be adjusted in such wide ranges that the adjustment cannot be achieved in conventional polymerization processes at all.

For example, when a molecular weight reducing agent is used, the polymerization degree of the polyester resin produced in the polymerization rector according to the present invention can be greatly reduced merely by adding a relatively small amount of the molecular weight reducing agent. This is because the molecular weight reducing agent has not only its intrinsic effect but also the effect of reducing the reaction time by increasing the rate of dropping of the intermediate for polymerization along the support. That the polymerization degree of the polyester resin produced can be greatly reduced is synonymous with that the output can be greatly reduced. On the other hand, in conventional polymerization methods, only the effect intrinsic to the molecular weight reducing agent is obtained, so that the polymerization degree of the polyester resin is reduced only to an extent corresponding to the amount of the molecular weight reducing agent added. Therefore, a large amount of the molecular weight reducing agent should be added for adjusting the molecular weight in a wide range, so that the conventional polymerization methods are disadvantageous also from the viewpoint of handling, cost and product quality.

On the other hand, when a molecular weight increasing agent is used, the polymerization degree of the polyester resin produced in the polymerization rector according to the present invention can be greatly increased merely by adding a relatively small amount of the molecular weight increasing agent. This is because the molecular weight increasing agent has not only its intrinsic effect but also the effect of increasing the reaction time by reducing the rate of dropping of the intermediate for polymerization along the support. That the polymerization degree of the polyester resin produced can be greatly increased is synonymous with that the output can be greatly increased. On the other hand, in conventional polymerization methods, only the effect intrinsic to the molecular weight increasing agent is obtained, so that the polymerization degree of the polyester resin is increased only to an extent corresponding to the amount of the molecular weight increasing agent added. Therefore, a large amount of the molecular weight increasing agent should be added for adjusting the molecular weight in a wide range, so that the conventional polymerization methods are disadvantageous also from the viewpoint of handling, cost and product quality.

When the molecular weight of the intermediate for polymerization fed from a step of producing the intermediate for polymerization varies, the varied state can be detected and on the basis of the detection result, the molecular weight regulator can be added to the intermediate for polymerization in a step prior to the feed of the intermediate for polymerization into the polymerization reactor. It is also possible to absorb the variation of the molecular weight by the addition of the regulator and introduce the intermediate for polymerization varied little in molecular weight, into the polymerization reactor.

The molecular weight regulator can be reacted with the intermediate for polymerization in any step prior to the feed of the intermediate for polymerization into the polymerization reactor. This reaction may be carried out in a reactor separately provided. It is also possible to introduce the molecular weight regulator into a piping for feeding the intermediate for polymerization and carry out the reaction in the piping. It is also preferable to adopt a method in which the mixing and reaction of the molecular weight regulator are accelerated by utilizing a kneading apparatus having a driving portion (e.g. an extruder) or a static mixer.

As the molecular weight reducing agent, known molecular weight reducing agents used for the depolymerization or molecular weight reduction of a polyester resin may be properly used. It is also preferable to utilize as the molecular weight reducing agent the above-exemplified starting monomer, an intermediate for polymerization with a lower molecular weight collected in a step nearer to the starting material, or a compound produced as a by-product by polycondensation reaction.

There can be used, for example, one member or a mixture of two or more members selected from the group consisting of compounds formed by direct bonding of one or two hydroxyl groups to an aliphatic hydrocarbon group of 1 to 30 carbon atoms, such as ethylene glycol, 1,3-propanediol, 1,4-propanediol, neopentyl glycol, 1,6-hexamethylene glycol, 1,4-cyclohexanediol, methanol, ethanol, propanol, butanol, benzyl alcohol, etc.; alkylene glycols such as diethylene glycol, triethylene glycol, tetraethylene glycol, dipropylene glycol, tripropylene glycol, etc., water, and compounds formed by direct bonding of one or two carboxyl groups to an aromatic hydrocarbon group of 6 to 30 carbon atoms, such as terephthalic acid, isophthalic acid, naphthalenedicarboxylic acid, 5-sodium sulfoisophthalate, tetramethylphosphonium benzenesulfonate 3,5-dicarboxylate, etc.; compounds formed by direct bonding of one or two carboxyl groups to an aliphatic hydrocarbon group of 1 to 30 carbon atoms, such as formic acid, acetic acid, propionic acid, butanoic acid, oxalic acid, succinic acid, adipic acid, dodecanedioic acid, fumaric acid, maleic acid, 1,4-cyclohexanedicarboxylic acid, etc.; and compounds formed by direct bonding of a hydroxyl group and a carboxyl group to an aliphatic hydrocarbon group of 1 to 30 carbon atoms, such as lactic acid, glycolic acid, etc., and compounds formed by the esterification of the carboxyl group of each of these compounds with a lower alcohol.

In addition, the following methods may also be adopted: a method in which the increase of the molecular weight is suppressed by inhibiting polycondensation reaction by the addition of a compound capable of inhibiting the action of a polymerization catalyst, such as water, trimethyl phosphate or the like; a method in which not only the reduction of the molecular weight but also the suppression of the increase of the molecular weight are achieved by adding a compound having a single functional group or a low reactivity which can be used as a reactive-end-blocking agent; and a method in which polycondensation reaction is inhibited by lowering the temperature of the intermediate for polymerization by adding intermediate for polymerization of a lower temperature or mixing a portion of intermediate for polymerization locally adjusted to a lower temperature with the other portion.

The molecular weight increasing agent is not particularly limited so long as it increases the molecular weight of the intermediate for polymerization when added. The molecular weight can be increased also by exchange reaction by adding, for example, an intermediate for polymerization with a higher molecular weight collected in a step nearer to the product, a high-molecular weight polyester resin as product, or a high-molecular weight polyester resin produced by another polymerization technique such as solid-state polycondensation. More specifically, there can be adopted one method or a combination of two or more methods selected from the group consisting of, for example, a method in which the molecular weight is increased by partial crosslinking reaction by adding a compound having three or more functional groups and capable of undergoing condensation reaction, such as glycerol, pentaerythritol, sorbitol, 1,2,4-benzenetricarboxylic acid, citric acid or the like; a method in which the molecular weight is increased by accelerating polycondensation reaction by addition (or addition in an amount larger than a usual adding amount) of a compound capable of catalyzing polymerization and containing titanium, germanium, antimony, tin, aluminum or cobalt, such as titanium oxide, titanium tetrabutoxide, titanium tetraisopropoxide, a titanium halide, a hydrolyzate obtained by hydrolysis of a titanium alkoxide, germanium oxide, germanium isopropoxide, a hydrolyzate obtained by hydrolysis of a germanium alkoxide, antimony oxide, tin acetate, tin 2-ethylhexanoate, aluminum acetate, aluminum propionate, aluminum lactate, aluminum chloride, aluminum hydroxide, aluminum carbonate, aluminum phosphate, aluminum ethoxide, aluminum isopropoxide, aluminum acetylacetonate, cobalt acetate or the like; a method in which the molecular weight is increased by accelerating polycondensation reaction by raising the temperature of the intermediate for polymerization by adding intermediate for polymerization heated to a higher temperature or mixing a portion of intermediate for polymerization locally heated to a higher temperature with the other portion.

(IV-6) Combination of the Polymerization Method According to the Present Invention and a Solid-State Polycondensation Technique A method comprising pelletizing the polyester resin produced by the above-mentioned polymerization method according to the present invention, introducing the pellets into a solid-state polycondensation reactor and then subjecting the pellets to solid-state polycondensation at a temperature of 190° C. to 230° C., is also preferable for producing a polyester resin having a high polymerization degree and a high quality.

Since pellets conventionally used as a starting material in solid-state polycondensation are produced by a conventional melt polymerization technique, the intrinsic viscosity [η] of the starting pellets has been at most 0.5 dl/g. The reason is as follow: in the case of the conventional melt polymerization technique, when an attempt is made to increase the polymerization degree to a value higher than the above value, polycondensation reaction and thermal decomposition reaction proceed in parallel with each other because of a high polymerization temperature, so that the hue of the product is extremely deteriorated. There has also been the following problem: the amount of carboxyl group at the end of the polymer is increased by the thermal decomposition reaction, resulting in a deteriorated productivity in a solid-state polycondensation step or a deteriorated quality of the product.

As other problems in a combination of the conventional melt polymerization technique and a solid-state polycondensation technique, the following problems can be exemplified: a problem that in the case of the conventional melt polymerization technique, the intrinsic viscosity [η] of the starting pellets is low for the above-mentioned reason, so that the crystallization degree of product pellets becomes very high, resulting in marked quality deterioration during melt processing; a problem that the molecular weight distribution expressed as Mw/Mn becomes too wide, so that only a non-uniform product can be obtained; a problem that the amount of fine powder produced in a solid-state polycondensation step is increased, resulting in an increase in production process troubles and troubles about product quality which produce defects such as surface roughening (fish eye) of the surface of a molded or shaped product; and a problem that since the starting pellets has a high acetaldehyde content, the acetaldehyde cannot be completely removed during solid-state polycondensation, so that about 5 ppm of acetaldehyde remains in the product pellets.

On the other hand, in the case of a combination of the polymerization technique according to the present invention and a solid-state polycondensation technique, starting pellets have a high polymerization degree, a good hue and a small amount of carboxyl group at the end of the polymer, so that a high-quality polyester resin can be stably produced at low cost by greatly improving the productivity in a solid-state polycondensation step. Moreover, since the intrinsic viscosity [η] of the starting pellets can be increased, the crystallization degree of product pellets does not exceed 55% and quality deterioration is hardly caused during melt processing. In addition, almost no fine powder is produced, so that production process troubles and troubles about product quality are hardly caused. Because of a negligible amount of fine powder and the high molecular weight of the starting material, a uniform product having a narrow molecular weight distribution expressed as Mw/Mn can be produced. Since the acetaldehyde content of the starting pellets is low, the acetaldehyde content of the product pellets is very low. Furthermore, since a cyclic trimer is incorporated into the main chain of the polymer as a result of cyclic chain equilibration reaction, the cyclic trimer content can be reduced. Thus, the above-mentioned combination solves all the problems in the method comprising a combination of a conventional melt polymerization technique and a solid-state polycondensation technique, to permit production of a high-quality polyester resin, and hence is a preferable method.

When the polymerization technique according to the present invention is combined with a solid-state polycondensation technique, the intrinsic viscosity [η] of starting pellets produced by the polymerization technique according to the present invention ranges preferably from 0.4 to 1.5 dl/g, more preferably from 0.5 to 1.2 dl/g, still more preferably from 0.6 to 1 dl/g, particularly preferably from 0.7 to 0.9 dl/g. As a pelletizing method, drying method, pre-crystallization method, crystallization method and solid-state polycondensation method for the starting pellets, the methods described hereinafter and methods based on a conventional solid-state polycondensation technique can be adopted.

(IV-7) Process for Producing a Polyethylene Terephthalate Resin Having a Reduced Content of a Cyclic Trimer As described above, as a production process of a polyethylene terephthalate resin with a cyclic trimer content of 0.8 wt % or less as the production process of a polyethylene terephthalate resin of the present invention, there is a process in which an intermediate of polyethylene terephthalate resin having an intrinsic viscosity [η] of 0.2 to 2.0 dl/g and a cyclic trimer content of 0.8 wt % or less is polymerized under reduced pressure in the polymerization rector according to the present invention while being dropped along a support, at a temperature of (the crystalline melting point of the intermediate for polymerization−10° C.) or more and (the crystalline melting point+30° C.) or less. As another process, a process can be exemplified in which a treatment is carried out for reducing a cyclic trimer by 0.2% by weight or more in a polyethylene terephthalate resin produced by the polymerization method according to the present invention. When either of these methods for reducing the cyclic trimer content is practiced, the intermediate for polymerization is preferably adjusted so that the cyclic trimer content may be increased by 0.2% by weight or less when the intermediate is kept melted at a temperature of 275° C. for 30 minutes.

The reason why the cyclic trimer content of the product can be reduced by the former method is as follows. That is, in the polymerization method according to the present invention, the polymerization temperature is as low as near the crystalline melting point. Therefore, although the equilibration reaction of a cyclic trimer proceeds during polymerization, the production rate of the cyclic trimer is slow and moreover, the polymerization degree can be increased in a short time. As a result, the cyclic trimer content of the product is hardly increased. In addition, when the polymerization method according to the present invention is adopted, oligomers such as bis(β-hydroxyethyl) terephthalate (BHET) can also be reduced which accelerate the transfer of the cyclic trimer to a mold and the surface of a molded or shaped product. Therefore, a polyethylene terephthalate resin and its molded or shaped product can desirably be produced which hardly cause mold deposit and bleed out.

In the latter method, a method for the treatment for reducing the cyclic trimer content of the polyethylene terephthalate resin is not particularly limited. As the treatment method, there can be exemplified a method of removing the cyclic trimer contained in the resin by extraction and/or volatile elimination; a method of subjecting the resin produced by the polymerization method according to the present invention to solid-state polycondensation until the cyclic trimer content is reduced to 0.8% by weight or less; and a method of reacting the resin with a compound containing an element such as tin or titanium, which permits ring-opening polymerization of the cyclic trimer, to reduce the cyclic trimer content to 0.8% by weight or less.

The polyethylene terephthalate resin produced by utilizing the polymerization reactor according to the present invention has a high polymerization degree and is excellent also in quality such as hue. Therefore, this resin retains its polymerization degree and quality even after being subjected to a procedure for reducing the cyclic trimer, such as extraction, and hence can be used in various articles such as vessels for drinking. In addition, the resin has a low content of oligomers such as bis(β-hydroxyethyl) terephthalate (BHET) which accelerate the transfer of the cyclic trimer to a mold and the surface of a molded or shaped products. Therefore, the resin is desirably characterized in that it hardly causes problems such as mold deposit and bleed out.

Since the problems such as mold deposit and bleed out are further prevented by reducing the cyclic trimer content of the resin, the cyclic trimer content is preferably as low as possible. The cyclic trimer content is preferably 0.7% by weight or less, more preferably 0.6% by weight or less, particularly preferably 0.5% by weight or less, most preferably 0.4% by weight or less, in particular, 0.3% by weight or less.

For further enhancing the effects of the present invention, a method is preferable in which a treatment is carried out for reducing a cyclic trimer by 0.2% by weight or more in a polyethylene terephthalate resin obtained by polymerizing an intermediate for polymerization with a cyclic trimer content of 0.8% by weight or less in the polymerization reactor according to the present invention. Another method is also preferable in which a treatment is carried out for reducing a cyclic trimer by 0.2% by weight or more in a polyethylene terephthalate resin obtained by polymerizing, in the polymerization reactor according to the present invention, an intermediate for polymerization whose cyclic trimer content is increased by 0.20% by weight or less when the intermediate is kept melted at a temperature of 275° C. for 30 minutes.

(IV-8) Method for Further Reducing Acetaldehyde in a Polyethylene Terephthalate Resin Produced by the Polymerization Method According to the Present Invention In the present invention, a polyethylene terephthalate resin satisfying the following requirements at the same time is used as a starting material: a crystallization degree of 35% or less and an acetaldehyde content of 30 ppm or less, and this resin is subjected to one or more treatments selected from heat treatment, vacuum treatment and washing treatment, whereby the treated polyethylene terephthalate resin can be produced which has (U) a crystallization degree of 55% or less, (V) a molecular weight distribution expressed as Mw/Mn of 1.8 to 2.3, and (W) an acetaldehyde content of 50% or less of the acetaldehyde content of the starting polyethylene terephthalate resin.

Here, the crystallization degree of the starting polyethylene terephthalate resin is preferably 35% or less for reducing the acetaldehyde content more easily (under easier conditions such as a lower treatment temperature and a shorter treatment time). The crystallization degree may be 0%, though when the starting resin is in the form of pellets, its crystallization degree is preferably 1% or more for preventing the pellets from fusing together with one another. The crystallization degree ranges more preferably from 2 to 30%, particularly preferably from 2.3 to 25%, most preferably from 2.5 to 20%. When the crystallization degree of the starting resin is more than 35%, a high treatment temperature and a long treatment time are required for reducing acetaldehyde, resulting in a high production cost. In addition, it becomes difficult to reduce the acetaldehyde content to 5 ppm which is the same as the acetaldehyde content of a solid-state polycondensation product. Moreover, the treated polyethylene terephthalate resin has a high crystallization degree and hence is undesirably liable to be deteriorated in quality when molded or shaped.

The acetaldehyde content of the starting polyethylene terephthalate resin is preferably 30 ppm or less for reducing the acetaldehyde content under easier conditions. The acetaldehyde content is more preferably 25 ppm or less, still more preferably 20 ppm or less, particularly preferably 15 ppm or less, most preferably 10 ppm or less, in particular, 7 ppm or less. Particularly when the acetaldehyde content of the starting resin is 15 ppm or less, it becomes possible surprisingly to reduce the acetaldehyde content of the treated polyethylene terephthalate resin to 2 ppm or less under easy conditions. Unexpectedly, this value is lower than the acetaldehyde content of a solid-state polycondensation product.

On the other hand, when the acetaldehyde content of the starting resin is more than 30 ppm, a high treatment temperature and a long treatment time are required for reducing acetaldehyde. In addition, it is difficult to reduce the acetaldehyde content to 5 ppm, which is the same as the acetaldehyde content of a solid-state polycondensation product, even if the treatment time is increased. Under such conditions, the production cost is raised and moreover, the treated polyethylene terephthalate resin has a high crystallization degree and hence is undesirably liable to be deteriorated in quality when molded or shaped.

Although the reason is not known in detail, the following possibility is conjectured: when the starting resin having a high acetaldehyde content of more than 30 ppm is heat-treated, the resin is more easily crystallized to a high degree and a site holding acetaldehyde is formed in the resin, resulting in difficult reduction of acetaldehyde.

On the other hand, the starting polyethylene terephthalate resin used in the present invention has an acetaldehyde content of as low as 30 ppm or less and a crystallization degree of as low as 35% or less. It can be speculated that since such a resin is used, a site holding acetaldehyde is hardly formed in the resin during the treatment, so that an acetaldehyde content lower than that of a solid-state polycondensation product can be attained under treatment conditions much milder than solid-state polycondensation conditions.

A method for adjusting the crystallization degree and acetaldehyde content of the starting polyethylene terephthalate resin is not particularly limited. From the viewpoint of resin quality and production cost, it is most preferable to adopt a method in which a polyethylene terephthalate resin having an acetaldehyde content of 30 ppm or less in spite of the adoption of a melt polymerization method is produced in a polymerization reactor based on the novel principle according to the present invention.

As to a method for further reducing acetaldehyde in the polyethylene terephthalate resin produced by the polymerization method according to the present invention, the above-mentioned starting resin is treated in a solid state by one or more methods selected from heat treatment, vacuum treatment and washing treatment.

For maintaining the solid state, the treatment temperature should be lower than the crystalline melting point of the resin. In addition, for removing the acetaldehyde efficiently, the treatment temperature is preferably higher than 21° C., the boiling point of acetaldehyde. The treatment temperature ranges more preferably from 30 to 220° C. From the viewpoint of quality and cost, the treatment temperature ranges further preferably from 140 to 220° C., still more preferably from 140 to 200° C., particularly preferably from 145 to 190° C., most preferably from 150 to 180° C.

The treatment temperature is preferably low because the crystallization degree of the treated polyethylene terephthalate resin is low, so that acetaldehyde production and quality deterioration such as hue deterioration can be suppressed during molding or shaping. When the treatment is carried out at a temperature of 200° C. or lower, it is more advantageous also in cost than solid-state polycondensation. The treatment may be carried out at a constant temperature, or with stepwise temperature rise or lowering, or with repeated temperature rise or lowering, so long as the treatment temperature is within the above range. When the starting resin is in the form of pellets, it is most preferable to adopt a method in which in order to prevent the pellets from fusing together with one another, the treatment temperature is gradually raised and the treatment is completed finally in the range of 40 to 220° C., followed by cooling to ordinary temperature.

The shape of the starting polyethylene terephthalate resin at the time of the treatment for reducing acetaldehyde is not particularly limited and may be a definite shape, an indefinite shape, a powder shape, a leaf shape or a pellet shape. It is preferably a leaf shape in order to use the resin produced according to the present invention, suitably as a material for melt molding or melt shaping. The shape of the pellets may be any shape, for example, a cubic shape, a spherical shape, a cylindrical shape, a flat cylindrical shape or a granular shape of go stone.

The size of the pellets is preferably suitable for acetaldehyde-reducing treatment conditions and molding or shaping conditions for the treated resin. When the size is too small, the pellets are liable to be nonuniform in size or are liable to fuse together with one another during heating. On the other hand, when the size is too large, the feed of the pellets into a molding or shaping machine and the treatment for reducing acetaldehyde become difficult. When the pellets are cylindrical, the diameter and height of the cylindrical pellets range preferably from 1 to 10 mm, more preferably from 1.5 to 8 mm, still more preferably from 2 to 6 mm.

When the heat treatment is carried out, it may be carried out in the above-mentioned temperature range in an atmosphere of an inert gas (e.g. air or nitrogen); or while introducing an inert gas (e.g. air or nitrogen); or under pressure or reduced pressure in an atmosphere of an inert gas (e.g. air or nitrogen). In order to suppress quality deterioration such as polymerization degree lowering during the treatment, the heat treatment is preferably carried out in an atmosphere of an inert gas (e.g. dry air or dried nitrogen); or while introducing an inert gas (e.g. dry air or dried nitrogen); or under pressure or reduced pressure in an atmosphere of an inert gas (e.g. dry air or dried nitrogen). The heat treatment is most preferably carried out while introducing a dried inert gas.

Although depending on the treatment temperature, the heat treatment time is preferably 10 minutes or more for effective reduction of acetaldehyde and is preferably 15 hours or less from the viewpoint of production cost. The heat treatment time ranges more preferably from 15 minutes to 10 hours, particularly preferably from 20 minutes to 6 hours, most preferably from 30 minutes to 4 hours. During the treatment, the starting resin may be in a standing state. Alternatively, the starting resin may be in a stirred, suspended or flowing state in order to suppress the fusion.

When the vacuum treatment is carried out, it is preferable for effective reduction of acetaldehyde to carry out the vacuum treatment in the above-mentioned temperature range under a reduced pressure of 100,000 Pa or less in an atmosphere of an inert gas such as air or nitrogen, preferably in an atmosphere of an inert gas such as dry air or dried nitrogen. Although depending on the scale, the treatment pressure is preferably 5 Pa or more from the viewpoint of the cost of equipment. The treatment pressure ranges more preferably from 10 to 80,000 Pa, still more preferably from 20 to 50,000 Pa, particularly preferably from 30 to 10,000 Pa; most preferably from 40 to 5,000 Pa, in particular, from 50 to 2,000 Pa.

Although depending on other conditions, the vacuum treatment time is preferably 10 minutes or more for effective reduction of acetaldehyde and is preferably 15 hours or less from the viewpoint of production cost. The vacuum treatment time ranges more preferably from 15 minutes to 10 hours, particularly preferably from 20 minutes to 6 hours, most preferably from 30 minutes to 4 hours. During the treatment, the starting PET resin may be in a standing state. Alternatively, the starting resin may be in a stirred, suspended or flowing state in order to suppress the fusion.

When the washing treatment is carried out, the starting resin is brought into contact with a washing agent selected from the group consisting of water, alcohols, acetone, MEK, ethers, hexanes, halogen compounds (e.g. chloroform), nitrogen, carbon dioxide and the like. These washing agents may be liquid, gaseous or supercritical.

Whichever treatment method is adopted, the treated PET resin produced according to the present invention should satisfy the following requirements at the same time: (i) the crystallization degree is 55% or less; (ii) the molecular weight distribution Mw/Mn ranges from 1.8 to 2.3; and (iii) the acetaldehyde content after the treatment is a reduced content of 50% or less of the acetaldehyde content of the starting resin.

(U) When the crystallization degree of the treated polyethylene terephthalate resin is 55% or less, acetaldehyde production and quality deterioration such as hue deterioration by thermal decomposition can be greatly suppressed during molding or shaping of the treated resin, which is desirable. The crystallization degree may be 0%, though when the resin is in the form of pellets, the crystallization degree is preferably 1% or more for preventing the pellets from fusing together with one another. The crystallization degree ranges more preferably from 2 to 52%, still more preferably from 3 to 47%, particularly preferably from 4 to 45%, most preferably from 5 to 43%, in particular, from 6 to 41%.

(V) When Mw/Mn of the treated polyethylene terephthalate resin ranges from 1.8 to 2.3, the nonuniformity of the molecular weight before and after molding or shaping of the treated resin is slight, so that the quality of the molded or shaped product can easily be controlled to be constant, which is desirable. Usually, Mw/Mn of a PET resin produced by melt polymerization ranges from 1.8 to 2.1. However, if this resin is treated in a solid state under unsuitable treatment conditions, Mw/Mn exceeds 2.5 in some cases because for example, when the PET resin is in the form of pellets, the surfaces of the pellets are locally decomposed or solid-state polycondensation reaction proceeds nonuniformly. In the case of the local decomposition, the polymer obtained has an increased amount of a hydroxyethyl end group in some cases, so that the amount of the acetaldehyde produced during melt molding or shaping is increased. When the solid-state polycondensation reaction proceeds nonuniformly, the pellets become slightly meltable, so that the increase of the amount of acetaldehyde produced during melt molding or shaping and quality deterioration are unavoidable. Mw/Mn of the treated polyethylene terephthalate resin ranges more preferably from 1.9 to 2.2 and has particularly preferably the same value as in the case of the starting PET resin.

When all the requirements described above are satisfied and moreover, (W) the acetaldehyde content of the treated polyethylene terephthalate resin is a reduced content of 50% or less of the acetaldehyde content of the starting resin, a molded or shaped product having a very low acetaldehyde content can desirably be produced by the use of the treated resin. If the acetaldehyde reduction is insufficient, no effect corresponding to a production cost increase required for the reducing treatment can be obtained. Therefore, the insufficient reduction is uneconomical. By the acetaldehyde-reducing treatment, the acetaldehyde content is preferably reduced to 40% or less, more preferably 30% or less, particularly preferably 20% or less, of the acetaldehyde content of the starting resin. The absolute value of the acetaldehyde content after the acetaldehyde-reducing treatment is preferably 15 ppm or less, more preferably 10 ppm or less, still more preferably 5 ppm or less which is the same as in the case of a solid-state polycondensation product, particularly preferably 3 ppm or less, more particularly preferably 2 ppm or less, most preferably 1 ppm or less, in particular, 0.5 ppm or less.

Although the polymerization degree of the starting resin and the resin subjected to the acetaldehyde-reducing treatment is not particularly limited, their intrinsic viscosity [η] is preferably 0.4 dl/g or more for sufficient exhibition of physical properties of a molded or shaped product by the use the resin as a molding or shaping material. The intrinsic viscosity [η] is preferably 2.5 dl/g or less from the viewpoint of ease of molding or shaping. The intrinsic viscosity [η] ranges more preferably from 0.45 to 2.0 dl/g, still more preferably from 0.55 to 1.7 dl/g, particularly preferably from 0.65 to 1.4 dl/g, most preferably from 0.7 to 1.2 dl/g.

The difference in polymerization degree between the starting resin and the resin subjected to the acetaldehyde-reducing treatment is preferably 0.20 dl/g or less, more preferably 0.15 dl/g or less, still more preferably 0.10 dl/g or less, particularly preferably 0.05 dl/g or less, most preferably 0.02 dl/g or less, for maintaining the quality of the product stably.

(IV-9) Others

The present invention includes the case where the following various additives are copolymerized or mixed if necessary: for example, delustering agents, heat stabilizers, flame reterdants, antistatic agents, defoaming agents, orthochromatic agents, antioxidants, ultraviolet absorbers, crystal nucleators, brightening agents, and impurity scavengers. Such stabilizers and various additives may be added in any stage before molding or shaping.

Particularly in the present invention, a suitable stabilizer is preferably added depending on a polymer to be produced. For example, pentavalent and/or trivalent phosphorus compounds and hindered phenol type compounds are preferable. The amount of the phosphorus compound added is preferably 2 to 500 ppm, more preferably 10 to 200 ppm, in terms of the weight proportion of phosphorus element contained in the polymer. Specific preferable examples of the phosphorus compounds are trimethyl phosphite, phosphoric acid and phosphorous acid. The phosphorus compounds are preferable because they prevent coloring of the polymer and are effective also as a crystal nucleator.

The hindered phenol type compounds are phenol type derivatives having a substituent capable of causing steric hindrance, at a position adjacent to the phenolic hydroxyl group, and are compounds having one or more ester linkages in the molecule. As to the amount of the hindered phenol type compound added, its weight proportion relative to the polymer to be obtained is preferably 0.001 to 1% by weight, more preferably 0.01 to 0.2% by weight. Specific examples of the hindered phenol type compounds are pentaerythritol, tetrakis [3-(3,5-di-tert-butyl-4-hydroxyphenyl)propionate], 1,1,3-tris(2-methyl-4-hydroxy-5-tert-butylphenyl)butane, octadecyl-3-(3,5-di-tert-butyl-4-hydroxyphenyl)propionate and N,N'-hexamethylenebis(3,5-tert-butyl-4-hydroxyhydro-cinnamamide). Co-using these stabilizers is a preferable method.

In the present invention, the addition of a crystal nucleator is also preferable. Preferable examples of the crystal nucleator are phosphorus compounds, organic acid metal salts and resin powder of a polyolefine or the like. The amount of the crystal nucleator added is preferably 2 to 1,000 ppm, more preferably 10 to 500 ppm, in the polymer. Specific examples of the crystal nucleator are phosphates such as sodium 2,2'-methylenebis(4,6-di-t-butylphenyl) phosphate, sodium bis (4-t-butylphenyl) phosphate, etc.; sorbitols such as bis(p-methylbenzylidene)sorbitor, etc.; and metal-element-containing compounds such as hydroxy aluminum bis(4-t-butylbenzoate), etc. Particularly in a preform for PET bottle to be subjected to thermal crystallization by heating of a mouth portion, the crystal nucleator is preferably used in order to accelerate the crystallization to lower the thermal crystallization temperature.

In the present invention, the addition of a scavenger for volatile impurities is also preferable method. For example, in the case of a polyethylene terephthalate resin, its impurity is acetaldehyde and a scavenger for acetaldehyde includes, for example, polymers and oligomers, such as polyamides, polyester amides, etc.; and low-molecular weight compounds having an amide group and an amine group, such as 2-aminobenzamide, etc. Specific examples of the scavenger are polyamides such as nylon 6.6, nylon 6, nylon 4.6, etc.; polymers such as polyethylene imines, etc.; a reaction product of N-phenylbenzenamine with 2,4,4-trimethylpentene; and Irganox1098 and Irganox565 (trade names) manufactured by Ciba Specialty Chemical Co., Ltd. These scavengers are preferably added after the discharge of the resin from the polymerization reactor and before the feed of the resin into a molding or shaping machine.

(V) Description of the Molding Method and the Molded Article

The polyester resin produced in the present invention may be once formed as pellets and then remelted for use in molding. Alternatively, the polyester resin produced in the polymerization reactor of the present invention may be transferred to a molding machine for molding with the molten state maintained without solidification to allow production of a molded article of higher quality at low cost.

(V-1) Description of the Production Method of Pellets

When the polyester resin is once formed as pellets, it is desirable to achieve low loss and uniform extrusion by an extruder. The methods of pelletization are not particularly limited and include a strand cut method in which molten strands are cooled in water and palletized by a pelletizer, an underwater cut method in which molten strands are directly extruded into water and formed into pellets by a cutter provided at the outlet, a direct cult method in which strands are extruded with the molten state maintained and cut by a cutter, and the like. When a coolant such as water is used, the temperature of the coolant is preferably 60° C. or lower, more preferably 50° C. or lower, and more preferably 40° C. or lower. In view of economics and handleability, water is preferable as the coolant, and thus the temperature of the coolant is preferably 0° C. or higher. The cutting for providing the pellet form is preferably performed after the cooling to 100° C. or lower within 120 seconds after the extrusion of the resin.

The crystallinity of the pellet produced according to the present invention is 55% or lower, preferably 50% or lower, more preferably 40% or lower, more preferably 30% or lower, particularly preferably. 20% or lower, and most preferably 10% or lower. Polyethylene terephthalate resin with the crystallinity of 55% or lower requires less heating for melt processing and generates less shearing heat in plasticization. Thus, that crystallinity is preferable since it does not cause a great reduction in the degree of polymerization of the resin due to thermal decomposition, deteriorated hues, or a large amount of acetaldehyde as a by-product. In addition, uniform melting easily achieved in the melt molding can provide a molded article with a favorable appearance.

On the other hand, polyethylene terephthalate resin produced in the solid-state polycondensation technique typically has a crystallinity of 60% or higher. Particularly, the crystallinity is higher in a surface portion of a pellet or in fine powder contained in the pellet to cause nonuniform melting in molding, resulting in many disadvantageous troubles in product quality such as variations in thickness of a sheet-shaped molded article and fish eyes on the surface of the molded article. It also requires a large amount of heat for crystal melting in melt molding of the pellet, which leads to production of acetaldehyde due to decomposition of the resin from excessive heat and an increased amount of the carboxyl group at the end. Besides, it easily causes clouding associated with crystallization in blow molding.

The amount of fine powder with a diameter of 1 mm or lower contained in the pellet produced according to the present invention is preferably 5 mg/kg or lower, more preferably 3 mg/kg or lower, more preferably 2 mg/kg, and particularly preferably 1 mg/kg or lower.

In contrast, in the solid-state polycondensation technique, crystallization and polymerization are performed in the form of pellets, so that a great amount of fine powder is produced due to fusion/solidification and grinding of the pellets. Such fine powder causes process troubles such as stuck pneumatic piping and operational troubles such as an increased loss rate. In addition, since the degree of polymerization and the crystallinity of the fine powder of the polymer are significantly higher than those of the product pellet, it is not melted uniformly in molding to create many disadvantageous troubles in product quality such as such variations in thickness of a sheet-shaped molded article and fish eyes on the surface of the molded article.

(V-2) Description of the Method of Transferring the Polyester Resin Produced in the Polymerization Reactor of the Present Invention to a Molding Machine for Molding with the Molten State Maintained without Solidification The polyester resin produced in the polymerization reactor of the present invention may be once solidified into pellets and then remelted for use in molding as described above. However, the resin may be transferred to a molding machine for use in molding with the molten state maintained without solidification. The molten state refers to the state in which the resin is melted under heat and flows with a viscosity of approximately 500,000 Pa·s or lower. In this case, it is important to perform molding while suppressing a reduction in the degree of polymerization due to thermal decomposition of the polyester resin, coloring, and production of a volatile impurity such as acetaldehyde.

The temperature of transfer piping from the polymerization reactor to the molding machine and the temperature in molding according to the present invention can be set to a temperature represented by (the crystalline melting point−10° C.) or higher to achieve stable transfer and molding without significantly increasing the viscosity or causing solidification. On the other hand, the setting to a temperature represented by (the crystalline melting point+60° C.) or lower can reduce coloring due to thermal decomposition or production of a volatile impurity such as acetaldehyde to easily provide a molded article of high quality. The temperatures are preferably in a range represented by (the crystalline melting point+0 to 50° C.) of the polymerization intermediate, more preferably in a range represented by (the crystalline melting point+0 to 40° C.), more preferably in a range represented by (the crystalline melting point+0 to 30° C.), particularly preferably in a range represented by (the crystalline melting point+0 to 20° C.), and most preferably in a range represented by (the crystalline melting point+0 to 10° C.). On the other hand, for the polyester resin which shows no crystalline melting point, of the temperature of 100° C. and the temperature at which the melting viscosity is 100,000 (poise) or higher when the polyester resin extruded from the polymerization reactor is evaluated at a shear rate of 1,000 (sec$^{-1}$), the temperatures are preferably in a range from the higher one of the two temperatures to 290° C. More preferably, of the temperature of 150° C. or the temperature at which the melting viscosity is 100,000 (poise) or higher when the polyester resin extruded from the polymerization reactor is evaluated at a shear rate of 1,000 (sec$^{-1}$), the temperatures are preferably in a range from the higher one of the two temperatures to 280° C. More preferably, of the temperature of 190° C. or the temperature at which the melting viscosity is 100,000 (poise) or higher when the polyester resin extruded from the polymerization reactor is evaluated at a shear rate of 1,000 (sec$^{-1}$), the temperatures are preferably in a range from the higher one of the two temperatures to 270° C. Such a temperature range can be achieved by properly controlling the temperatures of the transfer piping, the transfer pump, and the heater or jacket which covers the molding machine.

The time period taken before the molding is preferably 40 minutes or shorter, more preferably 20 minutes or shorter, and particularly preferably 10 minutes or shorter. Of course a shorter time period is better. It should be noted that the time period taken before the molding refers to the period from the time when the molten resin comes out of the drainage pump of the polymerization reactor to the time when it is cooled equal to or lower than the crystalline melting point or the temperature at which the viscosity of the resin is 500,000 Pa·s or higher in the molding machine or after it is removed out of the molding machine. When the resin is moved continuously in the piping or the like, the average time period calculated from the volume and flow rate in the piping or the like can be used. If the time period varies, it must be controlled within the abovementioned time period.

In the present invention, the polyester resin of high quality can be polymerized with the abovementioned method. In addition, the resin temperature is maintained at a low temperature close to the crystalline melting point and the resin is transferred to the molding machine for molding with a short melting residence time and the quality maintained, so that a high-quality molded article can be created with excellent productivity, which is an object of the present invention. As a result, no need of the solid-state polycondensation can omit a series of complicated steps typical of the solid-state polycondensation such as cooling and solidification of the resin of low polymerization degree produced in the melt polymerization, pelletization, predrying, crystallization, solid-state polycondensation, cooling of the product, carrying of the product, heating and drying before molding, and molding. Besides, energy can be saved. In terms of quality, the solid-state polycondensation technique requires a long time period for polymerization over several tens of hours although it is performed at the melting point or lower. In addition, temperature rises and drops repeated many times outside the polymerization system as described above have effects such as moisture absorption of the pellet or oxidation degradation. Furthermore, the highly crystalline pellet requires heating at a high temperature in the melt processing, and a large amount of shearing heat generation tends to cause extreme conditions to result in significantly reduced quality. In contrast, the polyester resin and the molded article produced in the polymerization method and the molding method of the present invention involve a slight quality reduction between before and after the melt molding. It is contemplated that this is achieved for the following reasons. Specifically, in the polymerization method of the present invention, the polymerization is typically completed within three hours at a temperature close to the crystalline melting point of the polyester resin, the polymerization reactor body has no rotary driving part or no resin residence part to produce little air leakage, cutting of polymer molecular chains due to shearing, or degradation of the resin due to melting residence, and the supply of the molten resin to the molding machine involves no moisture absorption, oxidation degradation, or shearing heat generation. The above-mentioned points are presumed as the reasons.

Examples of the molded article formed in the abovementioned method include a preform for molding of a hollow body such as a beverage container, a hollow body, a film, a sheet, a fiber for clothing or an industrial material such as a tier cord, a strand, and a pellet. It is possible that those molded articles are formed by a single molding machine, molded articles of the same type are simultaneously formed by two or more molding machines, or molded articles of a plurality of types are simultaneously formed by two or more types of molding machines.

The intrinsic viscosity ($\eta$) of the polyester resin produced in the present invention is in a range of 0.4 to 2.5 dl/g. For applications as a hollow body such as a beverage bottle, the use of a resin of high viscosity provides better blow-up during biaxial stretching to improve spreading of the material, thereby allowing a thinner wall of a bottle. The viscosity can reduce the drawdown of the preform and is advantageous in providing transparency. For applications as a stretched film, the use of a resin of high viscosity in film formation also facilitates a film having a better stretching property and uniform thickness and is suitable for production of thin films. In addition, since slack and drawdown in stretching are reduced, the viscosity is preferable for thick sheet molding.

For molding a hollow body as an example of the molded article, the following molding method including the steps (a) to (h) is preferably selected. The hollow body refers to a molded article which has space inside a resin molded article, and a blow bottle is an example thereof. An injection molding machine or an extruder for molding the preform may be provided separately from a blow molding machine for forming the hollow body. It is also preferable to use a molding machine which allows molding therein from a resin to a hollow body through a preform since heating steps are reduced. In addition, it is more preferable to perform aseptic filling for conducting steps to content filling in a sterile room after the blow molding since a high-temperature sterilization step is not required. All the molding methods preferably have biaxial stretching after the blow molding since it can provide impact resistance for the bottle. The stretching in the vertical direction is suitably 1.0 to 5.0 times. The resin temperature in the molding machine is preferably 230 to 330° C., and more preferably 240 to 320° C.

(a) The resin in the molten state is transferred from the polymerization reactor to the injection molding machine to mold a preform. After the preform is completely solidified and then removed, the preform is heated and melted, and blow-molded in a mold to provide a hollow body (a cold parison method). The bottle is preferably stretched in the vertical direction during the blow molding in providing the impact resistance for the bottle. The preform is preferably heated externally when it is remelted.

On the other hand, it is also preferable that the preform is removed with only its surface solidified, the overall preform is again melted resulting from the diffusion of the heat stored inside, and then blow molding is performed to provide a hollow body (a hot parison method). The bottle is preferably stretched in the vertical direction in the blow-up.

(b) The resin in the molten state is transferred from the polymerization reactor to the injection molding machine to mold a preform. The preform is removed with the molten state maintained and is blow-molded in a mold to provide a hollow body. The bottle is preferably stretched in the vertical direction during the blow molding.

(c) The resin is once palletized, and the resulting pellet is transferred to the injection molding machine and formed into a molded article in the same manner as in (a). The bottle is preferably stretched in the vertical direction during the blow molding.

(d) The resin is once palletized, and the resulting pellet is transferred to the injection molding machine and formed into a molded article in the same manner as in (b). The bottle is preferably stretched in the vertical direction during the blow molding.

(e) The resin in the molten state is transferred from the polymerization reactor to the extruder, and the extruded resin mass is put in a mold and subjected to compression molding to mold a preform. After the preform is completely solidified and then removed, the preform is heated and melted, and blow-molded in a mold to provide a hollow body (the cold parison method). The bottle is preferably stretched in the vertical direction during the blow molding in providing the impact resistance for the bottle. The preform is preferably heated externally when it is remelted.

On the other hand, it is also preferable that the preform is removed with only its surface solidified, the overall preform is again melted resulting from the diffusion of the heat stored inside, and then blow molding is performed to provide a hollow body (the hot parison method). The bottle is preferably stretched in the vertical direction during the blow-up.

The method of producing the preform with the compression molding is particularly suitable for molding polyethylene terephthalate resin of high polymerization degree and high viscosity as produced according to the present invention.

(f) The resin in the molten state is transferred from the polymerization reactor to the extruder, the extruded resin mass is put to a mold and subjected to compression molding, and it is removed with the molten state maintained and then blow-molded in a mold to provide a hollow body. The bottle is preferably stretched in the vertical direction during the blow molding.

(g) The resin is once palletized, and the resulting pellet is transferred to the extruder and formed into a molded article in the same manner as in (e). The bottle is preferably stretched in the vertical direction during the blow molding.

(h) The resin is once palletized, and the resulting pellet is transferred to the extruder and formed into a molded article in the same manner as in (f). The bottle is preferably stretched in the vertical direction during the blow molding.

A single or two or more molding machines and/or a single or two or more extruders may be connected to the polymerization reactor to supply the resin. When a plurality of molding machines which intermittently receive the resin such as injection molding machines are used, the plurality of molding machines preferably operate in molding cycles with a certain shift between them to average the flow rate in order to maintain the flow rate constant without residence of the resin drawn from the polymerization reactor.

When the resin drawn continuously from the polymerization reactor is supplied to the molding machine which intermittently receives the resin, an accumulator is preferably provided between them for storing the resin. It is more preferable to synchronize the molding machine with the accumulator to reduce residence of the resin. It is also preferable to provide an extruder separate from the molding machine to allow pelletization simultaneously with the molding.

A commercially available pellet molding machine can be used as it is or with some modifications as the molding machine. Particularly, in the present invention, the resin in the molten state is supplied from the polymerization reactor, which can simplify or omit a plasticating mechanism for the pellet such as a melt plasticating screw essential to the conventional molding machine which uses a pellet as a material. In this case, molding can be performed under less shearing heat generation in the screw to allow production of the molded article with higher quality.

(V-3) Description of the Preform for Producing a Hollow Body and the Hollow Body in the Present Invention The preform for producing the hollow body suitable for producing a beverage bottle or the like in the present invention is provided by supplying the polyethylene terephthalate resin having the abovementioned characteristics (A) to (F) to the injection molding machine or the compression molding machine from the polymerization reactor of the present invention through pipes in a temperature range represented by (the crystalline melting point−10° C.) or higher and (the crystalline melting point+60° C.) or lower and performing molding. The preform has the following characteristics (G) to (I).

(G) The amount of the carboxyl group at the end of the polymer; 30 meq/kg or lower, (H) The amount of acetaldehyde contained; 10 ppm or lower, and (I) The hue in a transmission method with a hexafluoroisopropanol solution; an L value of 98 or higher and a b value of 0.7 or lower.

The hollow body suitable for a beverage bottle and the like in the present invention is provided by performing blow molding of the preform for producing the hollow body having the above-mentioned characteristics (G) to (I) and has the following characteristics (J) to (L).

(J) The amount of the carboxyl group at the end of the polymer; 30 meq/kg or lower, (H) The amount of acetaldehyde contained; 10 ppm or lower, and (I) The hue in the transmission method with hexafluoroisopropanol solution; an L value of 98 or higher and a b value of 0.8 or lower.

The amount of the carboxyl group at the end of the polymer described in (G) and (J) is preferably 30 meq/kg or lower in terms of the influence upon the thermal stability of the resin. It is more preferably 25 meq/kg or lower, more preferably 20 meq/kg or lower, particularly preferably 15 meq/kg or lower, and most preferably 10 meq/kg or lower. The carboxyl group at the end of the polymer not only promotes decomposition of the resin but also leads to acetaldehyde as a by-product in producing the hollow body or deteriorated hues, thereby reducing the quality of the resin.

The amount of acetaldehyde contained described in (H) and (K) is desirably reduced since even a slight amount thereof causes discomfort in senses of taste and smell of humans and is preferably 10 ppm or lower. It is more preferably 8 ppm or lower, and more preferably 7 ppm or lower, and particularly preferably 5 ppm or lower.

According to the polymerization method of the present invention, the polyethylene terephthalate resin having a low content of acetaldehyde can be produced. In addition, the resin can be transferred to the molding machine for molding with the molten state maintained at a low temperature close to the melting point. Thus, no influence of heat generation due to shearing allows the preform and the hollow body to be produced with a low content of acetaldehyde. In contrast, since the conventional melt polymerization technique requires reaction at a higher temperature for a longer time period than in the polymerization method of the present invention, a significantly large amount of acetaldehyde is contained. On the other hand, the surface portion of the pellet produced in the solid-state polycondensation technique is highly polymerized and highly crystallized to generate much shearing heat in the mold processing, thereby producing a large amount of acetaldehyde as a by-product in processing. Consequently, the acetaldehyde content in the molded article greatly exceeds 10 ppm.

For the hue in the transmission method with the hexafluoroisopropanol solution described in (I) and (L), the L value of the preform is preferably 98 or higher and the b value thereof is preferably 0.7 or lower in order to produce a molded article with an excellent appearance. The L value and b value are more preferably 99 or higher and 0.6 or lower, respectively, and the L value and b value are particularly preferably 99.2 or higher and 0.5 or lower, respectively. For the hollow body, the L value and b value are preferably 98 or higher and 0.8 or lower, respectively. The L value and b value are more particularly preferably 99 or higher and 0.7 or lower, respectively, and the L value and b value are particularly preferably 99.2 or higher and 0.6 or lower, respectively.

According to the polymerization method of the present invention, since the amount of thermal hysteresis is small and the polymerization reactor body has no rotary driving part as compared with the conventional melt polymerization technique or solid-state polycondensation technique, air leakage or heat generation due to shearing are not created, and the polyethylene terephthalate resin can be produced with excellent hues. In addition, according to the method of transferring the resin to the molding machine for molding with the molten state maintained, the preform and the hollow body can be produced with excellent hues because of no influence of heat generation due to shearing or no influence of contact with air or moisture.

(Representative Embodiment of the Polymerization Reactor and the Polymerization Method in the Present Invention)

Next, description will be made for examples of a preferred polymerization reactor and a preferred polymerization method used in the present invention with reference to the drawings.

FIG. 1 shows a specific example of the polymerization reactor suitable for producing the polyester resin in the present invention. The polymerization intermediate of the polyester resin is supplied from a feed opening 2 to a polymerization reactor 10 through a transfer pump 1, is introduced into the polymerization reactor through a perforated plate 3, and falls along a support 5. The inside of the polymerization reactor is controlled to a predetermined reduced pressure. EG produced from the polymerization intermediate as a by-product, an inert gas such as nitrogen introduced through an inert gas feed port 6 as required and the like are discharged from an evacuation port 7. The highly polymerized polyester resin is discharged from a drainage port 9 with a drainage pump 8. When the pellet is produced, the resin is pulled out from the drainage port 9 and then immediately brought into contact with a coolant such as water for cooling, followed by cutting into pellets. The body or the like of the polymerization reactor 10 is heated and heat retention is provided by a heater or a jacket.

FIG. 2 shows a specific example of the polymerization reactor suited for producing the polyester resin of the present invention when an inert gas absorption apparatus N10 is used. The polymerization intermediate of the polyester resin is supplied into the inert gas absorption apparatus N10 from a feed opening N2 through a transfer pump N1, is introduced into the inert gas absorption apparatus through a perforated plate N3, and then falls along a support N5. The inside of the inert gas absorption apparatus is controlled to a predetermined reduced pressure with an evacuation port N7. While falling, the polymerization intermediate absorbs an inert gas such as nitrogen introduced from an inert gas feed port N6. The polymerization intermediate is supplied into a polymerization reactor 10 from a feed opening 2 through a drainage/transfer pump N8, is introduced into the polymerization reactor through a perforated plate 3, and falls along a support 5. The inside of the polymerization reactor is controlled to a predetermined reduce pressure. EG produced from the polymerization intermediate as a by-product, an inert gas such as nitrogen introduced through an inert gas feed port 6 as required and the like are discharged from an evacuation port 7. The highly polymerized polyester resin is discharged from a drainage port 9 with a drainage pump 8. When the pellet is produced, the resin is pulled out from the drainage port 9 and then is immediately brought into contact with a coolant such as water for cooling, followed by cutting into pellets. The body or the like of the polymerization reactor 10 is heated and heat retention is provided by a heater or a jacket.

FIGS. 3 and 4 are schematic diagrams showing an example of an apparatus which achieves the method of the present invention. FIG. 3 shows an example of an apparatus in which BHET, an intermediate of polyethylene terephthalate resin, is provided from direct esterification reaction, and polycondensation reaction of the BHET is caused to produce a polymerization intermediate which is then supplied to a polymerization reactor 10 of the present invention for polymerization. FIG. 4 shows an example of an apparatus in which BHET is provided from transesterification reaction, and a polymerization intermediate is produced by a combination of a stirred vessel polymerization reactor with a horizontal stirred polymerization reactor and then is supplied to a polymerization reactor 10 of the present invention for polymerization.

In both methods, the resin falling along a support reaches a lower portion of the polymerization reactor and then pulled out from a drainage port with a drainage pump. In this case, the smallest possible amount of the resin is preferably stored as uniformly as possible in the lower portion of the polymerization reactor. This can easily suppress coloring due to thermal decomposition or a reduction in the degree of polymerization and reduce variations in quality of the resin. The stored amount can be controlled by monitoring the stored amount through a sight glass 4 or monitoring the stored amount using a level meter of capacitance type or the like to adjust the feed amount by the transfer pump 1 and the drainage pump 8.

The polymerization reactor for use in the present invention may has a stirrer or the like at the bottom thereof, but it is not particularly necessary. Thus, it is possible to eliminate a rotary driving part in the polymerization reactor body and achieve polymerization with favorable sealing under high vacuum. Since the rotary driving part of the drainage pump is covered with the resin to be discharged, the sealing is much more excellent as compared with the case where the polymerization reactor body has a rotary driving part.

The method of producing the polyester resin in the present invention may be performed by a single polymerization reactor, but two or more polymerization reactors may be used. Alternatively, a single polymerization reactor may be divided vertically or horizontally to provide a multistage polymerization reactor.

In the present invention, it is possible to perform the overall process of increasing the molecular weight from the polymerization intermediate to the intended polyester resin with a high degree of polymerization while the resin is dropped along the support from the holes in the perforated plate and polymerized at the same time. In addition, the process may be performed in combination with another polymerization method, for example, by using a stirred vessel polymerization reactor, a horizontal stirred polymerization reactor or the like.

The horizontal stirred polymerization reactor includes a screw type, an independent blade type, a uniaxial type, a biaxial type or the like, and for example, a polymerization reactor described in Chapter 4 of "Research Report of Research Group of Reaction Engineering: Reactive Processing Part 2" (The Society of Polymer Science, 1992).

As the stirred vessel polymerization reactor, any of stirred vessels described, for example, in Chapter 11 of Chemical Equipment Guide (The Society of Chemical Engineers, 1989) can be used. The shape of the vessel is not particularly limited, and a vertical or horizontal cylindrical type is typically used. The shape of the stirring blade is not particularly limited, and a paddle type, an anchor type, a turbine type, a screw type, a ribbon type, a double blade type or the like is used.

The process of producing the polymerization intermediate from a material such as monomer can be performed in batches or continuously. It can be performed in batches by supplying all of the material and the reactant to the reactor for reaction over a predetermined time period and then transferring all of the reactant to the next reactor. On the other hand, it can be performed continuously by supplying the material and reactant continuously to each reactor and discharging the reactant continuously. It is preferably performed continuously to produce a large amount of polyester resin with uniform quality.

The material of the polymerization reactor for use in the present invention is not particularly limited, and it is typically selected from stainless steel, nickel, glass lining and the like.

Next, FIGS. 5 and 6 show a preferable combination when the polyester resin and the molded article thereof are produced, but the present invention is not limited thereto.

FIG. 5 is a schematic diagram showing an example of the polymerization reactor and the molding machine used in the present invention. The polymerization intermediate is supplied to a polymerization reactor 10 from a feed opening 2 through a transfer pump 1, is introduced into the polymerization reactor through a perforated plate 3, and falls along a support 5. The inside of the polymerization reactor is controlled to a predetermined reduced pressure. EG produced from the polymerization intermediate as a by-product, an inert gas such as nitrogen introduced from an inert gas feed port 6 as required and the like are discharged from an evacuation port 7. The highly polymerized polyester resin is discharged continuously from a drainage pump 8 and then supplied to an I2 molding machine A, an I3 molding machine B, and an I4 molding machine C with transfer piping and a distributor I1 to perform molding. More than three molding machines may be connected. The transfer pump 1, the polymerization reactor 10, the drainage pump 8, the transfer piping and the distributor I1 and the like are heated by a heater or a jacket and heat retention is provided.

FIG. 6 is a schematic diagram showing an example of the inert gas absorption apparatus, the polymerization reactor, and the molding machine used in the present invention.

In all the methods, the highly polymerized polyester resin falls to a lower portion of the polymerization reactor and is discharged continuously from the drainage pump 8, and then supplied to the I2 molding machine A, the I3 molding machine B, and the I4 molding machine C with the transfer piping and the distributor I1 to perform molding.

In this case, the smallest possible amount of the resin is preferably stored as uniformly as possible in the lower portion of the polymerization reactor. This can easily suppress coloring due to thermal decomposition or a reduction in the degree of polymerization and reduce variations in quality of the resin. The stored amount can be controlled by monitoring the stored amount through a sight glass 4 or monitoring the stored amount using a level meter of capacitance type or the like to adjust the feed amount by the transfer pump 1 and the drainage pump 8.

The method of transferring the polymerized resin to the molding machine is not particularly limited, but a gear pump, an extruder and the like can be used. The transfer to the molding machine includes continuous transfer and intermittent transfer, but in both cases, the transfer and molding must be performed within the abovementioned time period. When the resin is intermittently transferred, the discharge from the polymerization reactor may be intermittently performed. However, it is preferable as shown in FIG. 5 that the resin is continuously discharged from the polymerization reactor and is intermittently transferred to two or more molding machines (three in FIG. 5, and more than three molding machines may be used) with sequential switching between them through the transfer piping and the distributor I1 provided between the polymerization reactor and the molding machine. Alternatively, it is preferable to set a known apparatus, for example an apparatus formed of a reservoir and a piston, or to set an apparatus called an accumulator which temporarily stores the resin.

The molding machine in the present invention refers to an apparatus which forms the resin in the molten state into a specific shape, and includes, for example, an extruder, an injection molding machine, and a blow molding machine. The molding machine performs molding of a bottle or a preform of a bottle, a film, a sheet, a tube, a rod, a fiber, injection molded produces in various shapes. Of them, the present invention is suited especially for producing a preform of a beverage bottle. This is because it is highly desirable that the beverage bottle has high strength and transparency, includes a reduced amount of volatile impurity of a low molecular weight which adversely affects the taste or smell of the content, represented by acetaldehyde in the polyethylene terephthalate resin, and allows high productivity.

FIG. 7 shows a specific example of the polymerization reactor suited for the polymerization method which includes reaction with an arbitrary amount of a molecular weight regulator at the step before the polymerization intermediate is supplied to the polymerization reactor in producing the polyester resin of the present invention. In FIG. 7, the polymerization intermediate is supplied to a polymerization reactor 10 with a transfer pump 1 through piping after the polymerization intermediate producing step. In the feed piping, the polymerization intermediate is mixed and reacts with the molecular weight regulator to change the molecular weight of the polymerization intermediate. Next, the polymerization intermediate is supplied to the polymerization reactor 10 from a feed opening 2 through the transfer pump 1, is introduced into the polymerization reactor through a perforated plate 3, and falls along a support 5. The inside of the polymerization reactor is controlled to a predetermined reduced pressure. EG produced from the polymerization intermediate as a by-product, an inert gas such as nitrogen introduced as required from an inert gas feed port 6 and the like are discharged from an evacuation port 7. The highly polymerized polyester resin is discharged from a drainage port 9 with a drainage pump 8. When the pellet is produced, the resin is pulled out from the drainage port 9 and then immediately brought into contact with a coolant such as water for cooling, followed by cutting into pellets. When the molded article is produced, the resin is discharged continuously and then supplied to an I2 molding machine A, an I3 molding machine B, and an I4 molding machine C for molding through transfer piping and a distributor I1, similarly to the stages of the drainage pump 8 or after in FIG. 5. More than three molding machines may be connected.

FIG. 8 shows a specific example of the polymerization reactor suited for the method which includes supplying the polymerization intermediate to the polymerization reactor for polymerization after it is passed through a polymer filter in producing the polyester resin of the present invention. In FIG. 8, the polymerization intermediate is supplied to a polymerization reactor 10 with a transfer pump 1 through piping after the polymerization intermediate producing step. Then, the polymerization intermediate passes through a polymer filter 11 which is set immediately before a feed opening 2, has a filtering accuracy of 0.2 to 200 μm, and is controlled in a temperature range represented by (the crystalline melting point−20° C.) of the polymerization intermediate or higher to (the crystalline melting point+100° C.) or lower. Then, the resin is supplied to the polymerization reactor 10 from the feed opening 2, is introduced into the polymerization reactor through a perforated plate 3, and falls along a support 5. The inside of the polymerization reactor is controlled to a predetermined reduced pressure. EG produced from the polymerization intermediate as a by-product, an inert gas such as nitrogen introduced as required from an inert gas feed port 6 and the like are discharged from an evacuation port 7. The highly polymerized polyester resin is discharged from a drainage port 9 with a drainage pump 8. FIG. 8 shows the example in which a polymer filter 12 is provided after the drainage port 9, but the polymer filter 12 may not be provided. When the pellet is produced, the resin is pulled out from the drainage port 9, passed through the polymer filter 12 as required, and immediately brought into contact with a coolant such as water for cooling, followed by cutting into pellets. When the molded article is produced, the resin is discharged continuously, then passed through the polymer filter 12 as required, and is supplied to an I2 molding machine A, an I3 molding machine B, and an I4 molding machine C for molding through transfer piping and a distributor I1, similarly to the stages of the drainage pump 8 or after in FIG. 5. More than three or more molding machines may be connected.

EXAMPLES

The present invention will be described on the basis of Examples.

In Examples, principal measured values were obtained in the following methods.

(1) Intrinsic Viscosity (η)

The intrinsic viscosity (η) was calculated with an Ostwald viscometer in accordance with the following equation by extrapolating the ratio $\eta_{sp}/C$ of a specific viscosity $\eta_{sp}$ in o-chlorophenol at a temperature of 35° C. and a concentration C (g/100 milliliters) in the concentration zero.

$$[\eta] = \lim_{c \to 0}(\eta_{sp}/c)$$

(2) Crystalline Melting Point

The crystalline melting point was measured with Pyris 1 DSC (a differential calorimeter of input compensation type) manufactured by PerkinElmer, Inc. under the following conditions, and the value of an endothermic peak from the molten crystal was used as the crystalline melting point. The peak value was determined by using the accompanying analysis software.

Measurement temperature: 0 to 280° C.
Temperature rise rate: 10° C./min (3) Carboxyl Group Amount at the End of the Polymer A gram of sample was dissolved in 25 ml of benzyl alcohol, and then 25 ml of chloroform was added thereto. The resulting solution was subjected to titration with 1/50 N of potassium hydroxide dissolved in benzyl alcohol to make calculations from the titration value $V_A$ (ml) and the blank value $V_0$ when PET is not present in accordance with the following equation:

Carboxyl Group Amount at End of Polymer $$(\text{meq/kg}) = (V_A - V_0) \times 20$$

(4) Hue (L Value, b Value)

1.5 g of sample was dissolved in 10 g of 1,1,1,3,3,3-hexafluoro-2-propanol, and analyzed in the transmission method with UV-2500 PC (an ultraviolet-visible spectrophotometer) manufactured by Simadzu Corporation, and evaluated with the accompanying analysis software in the method based on JIS Z8730.

(5) Rate of Content of Acetaldehyde (Water Extraction Method)

Finely cut sample pieces were frozen and crushed for 3 to 10 minutes under cooling in liquid nitrogen with 6700 freezer mill manufactured by SPEX into powder with a particle size of 850 to 1000 μm. A gram of the powder was put into a glass ampul together with 2 ml of water for nitrogen substitution before sealing. Then, it was heated at 130° C. for 90 minutes to extract the impurity such as acetaldehyde. After the ampul was cooled, it was opened to perform analysis by GC-14B (a gas chromatograph) manufactured by Simadzu Corporation in the following conditions:

Column: VOCOL (60 m×0.25 mmØ×a thickness of 1.5 μm);
Temperature conditions: maintained at 35° C. for 10 minutes, then raised to 100° C. at 5° C./min, and then raised to 100 to 220° C. at 20° C./min.
Temperature of intake port: 220° C.
Intake method: Split Method (split ratio=1:30), intake of 1.5 μl
Measurement method: FID method (6) Molecular Weight Distribution The sample was dissolved in 1,1,1,3,3,3-hexafluoro-2-propanol (5 mmol/l of sodium trifluoroacetate dissolved) at a concentration of 1.0 mg/ml. The resulting solution was analyzed with HLC-8020GPC (a gel-permeation chromatograph) manufactured by Tosoh Corporation in the following conditions and evaluated with the accompanying analysis software.

Column: HFIP-606M and HFIP-603 manufactured by Showa Denko K.K.
Column temperature: 40° C.
Intake Amount: 30 μl
Measurement Method: RI detector, PMMA conversion (7) Content of Cyclic Trimer A g of the sample was completely dissolved in a mixed solution of 10 g of 1,1,1,3,3,3-hexafluoro-2-propanol and 5 g of chloroform, and then 15 g of chloroform was also added to that solution for dilution. While the diluted solution was stirred with a magnetic stirrer, 100 g of tetrahydrofurane was dropped thereto to reprecipitate the sample. This was filtered to provide the solution from which any precipitation is removed. The solvent was evaporated by an evaporator from the solution to take oligomer as a residue thereof. The resulting oligomer was dissolved in 20 g of dimethylformamide and analyzed with SCL-10A (a high-performance liquid chromatograph) manufactured by Simadzu Corporation in the following conditions:

Columns: Unisil Q C18 (4.6 mm in diameter and 250 mm in length)
Column Temperature: 40° C.
Intake amount: 20 μl
Separation Solvent: solvent A (distilled water containing 1 wt % of acetic acid)
solvent B (acetonitrile containing 0.02 wt % of acetic acid)

A mixed solution of the solvent A and the solvent B was flowed at a flow rate of 1.0 ml/min. The mixing conditions of the solvents are such that the percentage of the solvent B was linearly increased from 17 to 70% over 18 minutes in the early phase of the analysis, linearly increased from 70 to 100% over the next 22 minutes, and then to 100% over 20 minutes until the end of the analysis.

Measurement method: a UV detector (254 nm) was used to provide a calibration curve from the sample of the cyclic trimer to calculate the amount of the cyclic trimer contained in the polymer sample from the amount of the cyclic trimer contained in the oligomer.

(8) Crystallinity

The crystallinity (crystallization degree) was calculated in the following equation from the density determined in a density gradient tube method using a density gradient tube formed with carbon tetrachloride and n-heptane based on JIS K7112D. The measurement was performed at 10 points of the sample and the average value thereof was used:

$$Xc = (((\rho c \times \rho a)/\rho) - \rho c) \times (1/(\rho a - \rho c)) \times 100 (\%)$$

$\rho a$: amorphous density (g/cm$^3$)=1.335
$\rho c$: crystal density (g/cm$^3$)=1.455
$\rho$: density of sample (g/cm$^3$)

(9) Amount of Fine Powder

A commercially available adhesive tape is spread over one surface of a 2-by-10 centimeter plate with its adhesive surface facing upward to perform precise weighing. Then, the above-mentioned plate and 300 g of resin pellet were put into a 28-by-40 centimeter plastic bag and they were shaken for one minute. All the resin pellet attached to the adhesive surface of the plate was removed with tweezers. The weight of the fine powder of 1 mm or smaller remaining on the adhesive surface was measured from the increase in the weight of the plate.

The molding in Examples was performed in the following conditions.

(I) Preform and Bottle Molding

Molding machine: SBIII-100H-15 manufactured by Aoki Technical Laboratory, Inc. for bottle molding with biaxial stretching
Cylinder temperature: 280° C.
Hot runner nozzle temperature: 290° C.
Injection pressure: 140 kg/cm$^2$
Mold temperature: water cooling
Preform weight: 24 g
Bottle content: 500 ml (II) Preform Molding Molding machine: SE280S manufactured by Sumitomo Heavy Industries, Ltd.
Cylinder temperature: 285° C.
Injection rate: 100 mm/s
Mold temperature: 15° C.

(III) Molding of Dumbbell Molded Article

MJEC-10 injection molding machine manufactured by Modern Machinery Co. LTD

Cylinder temperature: 275° C.
Injection pressure: 55 kg/cm$^2$
Mold temperature: 70° C.

Example 1

Using the apparatus shown in FIG. 3 and high-purity terephthalic acid and EG as starting materials, a PET resin was polymerized at a rate of 2.4 kg per hour on the average by a continuous polymerization method. Vertical stirring polymerization reactors having paddle stirring blade (P2, P6, P10) were used as the esterification reaction vessel (P1) and the first and second stirring vessel type polymerization reactors (P5, P9), and the materials were polymerized under a reduced pressure by discharging them from the holes in a perforated plate (3) and letting them fall down along the supports (5) in a final polymerization reactor (10). Polymerization was carried out under the conditions shown in Table 1 and Table 3 by continuously supplying a slurry-like 1:1.2 (by mole) mixture of terephthalic acid and EG to the esterification reaction vessel. The structure of the supports 1 used here is described in Table 9.

In this operation, 0.04% by weight of diantimony trioxide and 20 ppm of trimethyl phosphate as phosphorus element were added continuously to the polymerization intermediate obtained in the first stirring vessel type polymerization reactor (P5). Diantinony trioxide and trimethyl phosphate were each added as a 2 wt % EG solution.

The properties of the polymerization intermediate are shown in Table 1 and Table 3. The polymerization intermediate supplied to the final polymerization reactor had an intrinsic viscosity [η] of 0.30 dl/g and a crystalline melting point of 255° C.

The polymerization intermediate of said PET resin was supplied to the polymerization reactor (10) from a feed opening (2) by a transfer pump (1) and discharged from the holes in the perforated plate (3) in a 260° C. molten state at a rate of 10 g/min per hole. Then, the intermediate was polymerized under a reduced pressure of 65 Pa by letting it fall down along the supports (5) at an ambient temperature same as the discharge temperature, and discharged by a drainage pump (8), and then palletized. The perforated plate (3) was 50 mm thick and had 4 holes, each being 1 mm in diameter, arranged linearly at intervals of 25 mm.

The supports (5) (supports 1 in Table 9) comprised the 2 mm diameter and 8 m long wires, each being suspended vertically and positioned close to a hole, and the 2 mm diameter and 100 mm long wires disposed at intervals of 15 mm to cross the above-said wires at right angles to constitute a latticework. The supports (5) were made of stainless steel.

The prepolymer in the polymerization reactor (10) was foamed moderately, and there took place no fouling of the polymerization reactor due to vehement foaming. The resin falling down along the supports contained a large volume of bubbles and was observed rolling down along the supports in a form of bubble balls.

The drainage pump (8) was operated while watching the inside of the polymerization reactor (10) from a sight glass (4) to check against accumulation of the resin at the bottom of the reactor (10). The residence time in the polymerization reactor in this operation was 40 minutes. The residence time was determined by using the value given by dividing the amount of the resin staying in the reactor (10) by the feed of the resin.

The polymerized PET resin was discharged out continuously from the polymerization reactor by a drainage pump (8) and drawn out in a form of strand from the outlet (9). The obtained strand was cooled and solidified in a 20° C. running-water bath and palletized continuously by a pelletizer.

The properties of the obtained resin and pellets are shown in Table 1 and Table 2. Analysis of the obtained cylindrical transparent pellets showed that their intrinsic viscosity [η] was 0.49 dl/g, the amount of the carboxyl groups at the polymer terminal was 28 meq/kg, the acetaldehyde content was 5.0 ppm, the crystallization degree was 2.7%, and Mw/Mn=2.1. These pellets also had an excellent hue. The grain size of the pellets was 3.0 mm in circle diameter and 2.0 mm in cylinder height on the average. The pellets contained no fine particles (dust-size particles) with a size of 1 mm or less.

Example 2

By following the same procedure as Example 1, a PET resin was polymerized at a rate of 5.5 kg per hour on the average by a continuous polymerization method under the conditions shown in Table 1 and Table 4.

The perforated plate (3) was 50 mm thick and had 7 holes, 1 mm in diameter, arranged linearly at intervals of 10 mm in two parallel rows with a spacing of 70 mm.

The supports (5) (supports 2 in Table 9) comprised the seven 2 mm diameter and 8 m long wires, each being suspended vertically and positioned close to a hole, and the 2 mm diameter and 100 mm long wires disposed at intervals of 100 mm to cross the above-said group of seven wires at right angles to constitute a wire gauze. Two sheets of such wire gauze were used (Table 9).

The properties of the polymerization intermediate are shown in Table 1 and Table 4. 10 kg of the polymerized pellets were put into a vat and subjected to a 10-hour heat treatment in a 130° C. hot-air dryer, and the heat treated pellets were further subjected to biaxially oriented blow molding by an injection molding machine. SB111-100H-15 manufactured by Aoki Technical Laboratory, Inc. was used as the biaxially oriented blow molding machine. The properties of the obtained resin and pellets are shown in Table 1 and Table 2.

The untreated pellets had the following properties: intrinsic viscosity [η]=0.80 dl·g, amount of carboxyl end groups of the polymer=16 meq/kg, acetaldyhide content=5.4 ppm, crystallization degree=2.7%, Mw/Mn=2.1. They also had an excellent hue. The grain size of the pellets was 3.0 mm in circle diameter and 2.0 mm in cylinder height on the average. The pellets were free of fine powders with a size of 1 mm or smaller.

The treated pellets have advanced in crystallization and assumed a milky white color. These pellets had an intrinsic viscosity [η] of 0.80 dl·g, a carboxyl end group amount of 16 meq/kg and an acetaldehyde content of 2.8 ppm. These values were equal to or lower than those of the PET resins produced by the conventional solid-state polycondensation techniques. On the other hand, the crystallization degree of the said pellets was relatively low at 25% and Mw/Mn was 2.1, indicating a limited distribution of molecular weight. These pellets also excelled in hue and contained no fine particles with a size of 1 mm or smaller.

The preform and hollow body produced by injection molding the treated pellets had an intrinsic viscosity [η] of 0.78 dl/g and were limited in reduction of viscosity during molding. The acetaldehyde content was also low: 9.0 ppm in preform and 7.2 ppm in hollow body. They also had an excellent hue.

Example 3

A polymerization intermediate was produced by using the apparatus of FIG. 3. The process steps after the transfer pump (1) operation, viz. polymerization and molding, were carried out using the apparatus of FIG. 5.

Polymerization was carried out in the same way as in Example 1 by polymerizing a PET resin by a continuous polymerization method under the conditions shown in Table 1 and Table 5 at a rate of 40 kg per hour on the average.

The perforated plate (3) was 50 mm thick and had 15 holes, 1 mm in diameter, arranged linearly at intervals of 10 mm in three parallel rows spaced 70 mm from each other.

The supports (5) (supports 3 in Table 9) comprised 15 pieces of 2-mm diameter and 8 m long wire, each being suspended vertically and positioned close to a hole, and the 2-mm diameter and 150 mm long wires disposed at intervals of 100 mm to cross the above-said group of 15 wires at right angles to constitute a wire gauze. Three sheets of such wire gauze were used.

The properties of the polymerization intermediate are shown in Table 1 and Table 5. The polymerization intermediate supplied to the final polymerization reactor had an intrinsic viscosity [η] of 0.50 dl/g and a crystalline melting point of 255° C.

Polymerization was carried out using the final polymerization reactor (10) shown in FIG. 5 and a molding machine under the conditions of Table 1 to obtain a PET resin having an intrinsic viscosity of 0.80 dl/g, and this resin was passed as it was through transfer piping (I1) and led into an injection molding machine A for conducting biaxially oriented blow molding. Here, one set of SB111-100H-15 manufactured by Aoki Technical Laboratory, Inc. was used as the biaxially oriented blow molding machine, and the molding operations from preform molding to hollow body molding were conducted successively under the conditions of: resin temperature=280° C., injection time=7 seconds, cooling time=3 seconds and cycling time=18 seconds. Other molding machines B and C shown in FIG. 5 were not used, and instead a discharge nozzle was provided to allow discharge of the surplus resin.

First, the resin was drawn out in a form of strand from the discharge nozzle, palletized continuously in the same way as in Examples 1 and 2, then heat treated and injection molded to produce a preform and a hollow body.

Then 30 g of molten resin was extruded from the discharge nozzle into a compression mold and compressed to produce a preform. After 10 seconds of compression molding, the preform female die was replaced by a blow molding male die and compressed air was blown into the mold from a compressed air nozzle provided in the preform male die to produce a hollow body.

The properties of the obtained resin and pellets are shown in Table 1 and Table 2. The obtained PET resin pellets and moldings before and after the treatment were the high-quality ones having a high polymerization degree, an excellent hue and a low acetaldehyde content.

Comparative Example 1

By following the same procedure as Example 1 except for nonuse of the final polymerization reactor (10) in the apparatus of FIG. 3, PET was polymerized by a continuous polymerization method under the conditions shown in Table 1 and Table 6 at a rate of 2.4 kg per hour on the average.

There was obtained a PET resin having an intrinsic viscosity [η] of 0.57 dl/g. The properties of the obtained resin and pellets are shown in Table 1, Table 2 and Table 6. As seen from these tables, the acetaldehyde content was high and hue of the products was also bad.

Comparative Example 2

A polymerization intermediate having an intrinsic viscosity of 0.49 dl/g obtained according to Example 2 was extruded into water from a discharge nozzle and made into pellets by a cutter. The obtained pellets were vacuum dried (under a reduced pressure of 13.3 Pa or less at 80° C. for 12 hours) and successively subjected to a crystallization treatment (under a reduced pressure of 13.3 Pa or less at 130° C. for 3 hours, followed by additional 3-hour treatment at 160° C.). After allowed to cool by standing, the pellets were put into a tumbler type solid-state polycondensation reactor to conduct solid-state polycondensation while maintaining the inside of the system under a reduced pressure of 13.3 Pa or less and at 215° C.

The produced pellets had a crystallization degree of as high as 58.8% and a large Mw/Mn ratio of 2.4, and contained a large volume of fine particles. The pellets were further subjected to a heat treatment under the same conditions as in Example 2, but the acetaldehyde content was not reduced.

Injection molding and biaxially oriented blow molding were conducted with these pellets under the same conditions as used in Example 2. Also, these pellets were melted by an extruder and the melt was extruded and compression molded under the same conditions as in Example 3.

The properties of the polymerization intermediate and the obtained resin and pellets are shown in Table 1 and Table 2. The pellets produced by solid-state polycondensation were greater in reduction of polymerization degree in the molding work and also higher in amount of acetaldehyde as a by-product generated than those of the Examples.

Comparative Examples 3 to 5

Using a polymerization intermediate having an intrinsic viscosity of 0.45 dl/g and a carboxyl end group amount of 0.30 meq/kg, polymerization was carried out under the conditions shown in Table 1. The properties of the polymerization intermediate and the obtained resin are shown in Table 1. In the case of Comparative Example 3, vehement bubbling took place due to too high discharge temperature and polymerization temperature to cause fouling of the nozzle surface and wall surfaces. Also, the obtained polymer was discolored to yellow and non-uniform in hue.

In the case of Comparative Example 4, because of too low setting of both discharge temperature and polymerization temperature, the polymerization intermediate was solidified and incapable of discharge from the holes in the perforated plate.

In the case of Comparative Example 5, because the interior of the polymerization reactor was set at normal pressure, the falling polymer did not contain a large amount of bubbles, so that its polymerization degree did not rise up but was rather reduced as a result of thermal decomposition.

Comparative Example 6

Using the apparatus shown in FIG. 1, a high polymerization degree PET was produced from a polymerization intermediate having an intrinsic viscosity [η] of 0.45 dl/g, a carboxyl end group amount of 30 meq/kg and a crystalline melting point of 255° C. The residence time in this operation was 60 minutes. There took place little vehement bubbling of the prepolymer discharged from the perforated plate (3) in the polymerization operation, and therefore fouling of the nozzle surface and wall surfaces by such bubbling was strikingly reduced. On the other hand, the falling resin contained a large volume of bubbles, and there was observed the behavior of the resin rolling down in a form of bubble balls along the supports. The obtained polymer had a high polymerization degree and a good hue but its acetaldehyde content was as high as 40 ppm. The properties of the polymerization intermediate and the obtained resin are shown in Table 1.

Examples 4 to 6

Using a polymerization intermediate having an intrinsic viscosity of 0.45 dl/g and a carboxyl end group amount of 0.30 meq/kg, a prepolymer was discharged out form a perforated plate having 4 holes arranged lattice-wise under the conditions of Table 1 at a rate of 10 g/min per hole, and polymerization was carried out using the supports of a structure described later. The supports, in Example 4, were a cubic latticework (supports 4) comprising the 3 mm diameter wires combined with each other at intervals of 30 mm vertically and 50 mm transversely. Used as the supports in Example 5 were chains of ellipsoids measuring 3 mm in linear diameter, 50 mm in length and 20 mmϕ in curvature (supports 5), and the supports used in Example 6 were the wires having a round section with a diameter of 5 mm (supports 6). The properties of the polymerization intermediate and the obtained resin are shown in Table 1. In each case, vehement bubbling of the prepolymer discharged from the perforated plate and fouling of the nozzle surface, etc., caused thereby were minimized, and the falling resin contained a large volume of bubbles. The obtained polymer was a homogeneous high-quality PET having a high polymerization degree, an excellent hue and a low acetaldehyde content. Of the supports used in these Examples, those having a structure hindering the fall of the polymer, such as cubic latticework or chain type, could provide a polymer with a higher polymerization degree under the same conditions.

Example 7

Using the apparatus of FIG. 4 and using DMT and EG as starting materials, a PET resin was polymerized by a continuous polymerization method at a rate of 2.4 kg per hour on average. A vertical polymerization reactor having a turbine stirring blade was used as the first and second ester exchange reaction vessels (E1, E2), and a vertical stirring polymerization reactor having a paddle stirring blade (E10) was used as the first stirring vessel type reactor (E9). There was also used a horizontal stirring polymerization reactor (E13) having a single-screw disc stirring blade. The final polymerization reactor (10) was the same as used in Example 1.

Polymerization was carried out under the conditions shown in Table 1 and Table 7 by continuously supplying DMT and an EG solution at a molar ratio of 1:2 to an esterification reactor, said EG solution being prepared by adding manganese acetate in an amount of 0.05% by weight based on DMT. In this operation, trimethyl phosphate of an amount of 100 ppm as the weight ratio of phosphorus element and 0.04% by weight of diantimony trioxide were added continuously to the polymer obtained from the line between the second ester exchange reaction vessel (E5) and the first stirring vessel type polymerization reactor (E9). Diantimony trioxide and trimethyl phosphate were both added as an EG solution with a concentration of 2% by weight.

The properties of the polymerization intermediate and the obtained resin are shown in Table 1. The polymerization intermediate supplied to the final polymerization reactor (10) is embraced within the scope of the present invention. Vehement bubbling of the polymerization intermediate discharged from the perforate plate and fouling of the nozzle surface, etc., caused by such bubbling were minimized. The falling resin contained a large volume of bubbles, and the obtained polymer was a homogeneous high-quality PET resin having a high polymerization degree, an excellent hue and a low acetaldehyde content.

Example 8

Polymerization was carried out under the conditions shown in Table 1 and Table 7 in the same way as in Example 7 except that nitrogen of the amount shown in Table 1 was introduced from an inert gas feeding port (6) of the polymerization reactor (10). The properties of the polymerization intermediate and the obtained resin are shown in Table 1.

The polymerization intermediate supplied to the final polymerization reactor falls within the scope of the present invention. Vehement bubbling of the polymerization intermediate discharged from the perforated plate (3) and fouling of the nozzle surface, etc., caused thereby were minimized. The falling resin contained a large volume of bubbles, and the obtained polymer had a high polymerization degree, a good hue and a low acetaldehyde content and was confirmed to be a homogeneous high-quality PET resin.

Comparative Example 7

Following the same procedure as in Example 7 except for the decrease of polymerization rate to 1.2 kg per hour and nonuse of the polymerization reactor (10), polymerization was carried out under the conditions of Table 1 and Table 8 using the apparatus shown in FIG. 4. The properties of the polymerization intermediate and the obtained resin are shown in Table 1. The obtained polymer could not be increased in polymerization degree to a satisfactory level, and it also assumed a yellowish discoloration and had a high acetaldehyde content.

Example 9

Polymerization was carried out in the same way as in Example 2 except for use of a polymerization apparatus in which an inert gas is introduced into the polymerization reactor (10) by an inert gas absorption apparatus (N10) and use of the conditions shown in Table 1. The perforated plate (N3) of the inert gas absorption apparatus (N10) had nine 1-mm diameter holes arranged in lattice form, and the supports (N5) (supports 6 in Table 9) comprised the 5 mm diameter and 8 m long stainless steel wires having a circular sectional shape. One support (N5) was provided for each of the holes of the perforated plate (N3). Nitrogen gas was supplied into the absorption apparatus for maintaining the inside thereof under a pressure of 0.11 MPa, causing the polymerization intermediate falling down along the supports (N5) to absorb and contain nitrogen.

The transfer pump (N1) was operated while watching the inside of the inert gas absorption apparatus (N10) from a sight glass to make sure that the polymer would not substantially be accumulated at the bottom of the absorption apparatus. There existed a certain amount of bubbles in the polymer transferred from the absorption apparatus. Also, when the change of gas pressure was examined by stopping the supply of nitrogen gas to the absorption apparatus, there was noted a change of pressure corresponding to 0.5 mg of gas per gram of polymer. This amount is considered as the quantity of nitrogen gas absorbed and contained in the polymerization intermediate. Supposing that the whole amount of feed gas has been introduced into the polymerization reactor, the quantity of nitrogen introduced into the polymerization reactor was determined.

The properties of the polymerization intermediate and the obtained resin are shown in Table 1. Observation from the sight glass (4) confirmed that the falling polymer was in a foamed state and contained a large volume of bubbles. The polymerization intermediate supplied to the final polymerization reactor (10) is embraced within the scope of the present invention. There took place little vehement bubbling of the polymerization intermediate discharged from the perforated plate (3), and so fouling of the nozzle surface, etc., caused thereby was minimized. The obtained polymer had a high polymerization degree, a good hue and a low acetaldehyde content and proved to be a homogeneous high-quality PET resin.

Example 10

Using the apparatus shown in FIG. 1, the polymerization intermediate of a PET resin having an intrinsic viscosity [η] of 0.52 dl/g, a carboxyl end group amount of 30 meq/kg and a crystalline melting point of 256° C. was supplied continuously to the polymerization reactor (10) from the feed opening (2) by the transfer pump (1), and the 255° C. melt thereof was discharged out from the holes of the perforated plate (3) at a rate of 10 g/min per hole. Then the discharged material was polymerized under a reduced pressure of 60 Pa by letting it fall along the supports at an ambient temperature same as the discharge temperature.

The perforated plate of the polymerization reactor was 50 mm thick and had 7 holes, 1 mm in diameter, arranged linearly at intervals of 10 mm. The supports comprised the 2-mm diameter and 8 m long wires, each being hanged down vertically and positioned close to a hole, and the 2-mm diameter and 100 mm long wires disposed at intervals of 100 mm to cross the above-said wires at right angles to constitute a latticework. Stainless steel was used as the support material.

The residence time in the polymerization reactor in the polymerization operation was 55 minutes. The residence time was determined by using the value obtained by dividing the amount of the polymer remaining in the polymerization reactor by the feed of the resin. In this polymerization operation, vehement bubbling of the PET resin polymerization intermediate discharged from the perforated plate and fouling of the nozzle surface and wall surfaces caused thereby were minimized. On the other hand, the falling PET resin contained a large volume of bubbles and was observed rolling down along the support in a form of bubble balls.

The polymerized PET resin was discharged continuously from the polymerization reactor by the drainage pump (8) and drawn out as a strand from the outlet (9). This strand was cooled and solidified in a 20° C. running-water bath and palletized continuously by a pelletizer.

Analyzing the obtained cylindrical transparent pellets, it was found that the intrinsic viscosity [η] of the pellets was 0.81 dl/g, the amount of the carboxyl groups at the molecular terminal of the polymer was 28 meq/kg, the acetaldehyde content was 4.8 ppm, the crystallization degree was 2.7%, and Mw/Mn=1.9. The grain size of the pellets was 3.0 mm in diameter and 2.0 mm in cylinder height on the average.

When 10 kg of these pellets were put into a vat and heat treated by a 140° C. hot-air dryer for 8 hours, the pellets were crystallized and became milky white. Analysis of the pellets after the treatment showed that their intrinsic viscosity [η] was 0.81 dl/g, the amount of the carboxyl end groups was 28 meq/kg, and the acetaldehyde content was as low as 1.2 ppm. Also, the crystallization degree was relatively low 39.5% and Mw/Mn was as small as 1.9, indicating homogeneity of the produced resin.

These heat treated pellets were further subjected to the molding operations from preform molding to hollow body molding at a molding temperature of 280° C. using a biaxially oriented blow molding machine (SB111-100H-15 manufactured by Aoki Technical Laboratory, Inc.).

Analyzing the produced preform, it was found that this preform was low in acetaldehyde content (7.1 ppm) and also had a good hue. Reduction of polymerization degree after molding was also limited. The evaluation results are shown in Table 10 along with the properties of the PET resin used as starting material, etc.

Comparative Example 8

Analysis of the commercially available flat cylindrical highly crystallized PET resin pellets produced by solid-state polycondensation showed that their intrinsic viscosity [η] was 0.80 dl/g, the amount of the carboxyl end groups of the polymer was 30 meq/kg, the acetaldehyde content was 3.6 ppm, the crystallization degree was 59.6%, and Mw/Mn=2.4. The grain size of the pellets was 3 mm and 1.5 mm in major diameter and minor diameter, respectively, of the circle, and 3.0 mm in cylinder height on the average.

10 kg of these pellets were put into a vat as in Example 10 and subjected to an 8-hour heat treatment by a 140° C. hot-air dryer. Analysis of the resultant milky white pellets showed that their intrinsic viscosity [η] was 0.80 dl/g, the amount of the carboxyl end groups was 30 meq/kg, and the acetaldehyde content was 3.6 ppm, which were all unchanged from those before the heat treatment. Also, the crystallization degree was 59.6% and Mw/Mn=2.4.

Further, using the pellets after the heat treatment, the molding operations were continued from preform molding to hollow body molding at a molding temperature of 280° C. according to Example 10.

Analysis of the produced preform showed a high acetaldehyde content of 17.6 ppm. Reduction of polymerization degree after molding was also relatively large. The evaluation results are shown in Table 10 along with the properties of the PET resin used as starting material, etc.

Comparative Example 9

Analysis of the commercially available flat cylindrical transparent PET resin pellets produced by melt polymerization showed that these pellets had an intrinsic viscosity [η] of 0.58 dl/g, the amount of carboxyl groups at the molecular terminal of the polymer was 40 meq/kg, the acetaldehyde content of these pellets was 41.3 ppm, their crystallization degree was 2.7%, and Mw/Mn=2.0. The grain size of these pellets was 3 mm and 1.6 mm in major diameter and minor diameter, respectively, of the circle, and 3.1 mm in cylinder height on the average.

10 kg of these pellets were put into a vat and heat treated by a 140° C. hot-air dryer for 8 hours as in Example 10. Analysis of the pellets after the heat treatment showed: intrinsic viscosity [η]=0.58 dl/g, amount of carboxyl end groups=40 meq/kg, acetaldehyde content=14.3 ppm, crystallization degree=44.1%, and Mw/Mn=2.0.

Further, using these pellets after the heat treatment, the molding operations were conducted from preform molding to hollow body molding at a molding temperature of 280° C. in the same way as in Example 10.

Analyzing the produced preform, it was found that its acetaldehyde content was as high as 24.6 ppm. The evaluation results are shown in Table 10 along with the properties of the starting PET resin, etc.

Example 11

Polymerization, heat treatment and molding were carried out under the same conditions as used in Example 10 except that the heat treatment was conducted at 160° C. for 6 hours. Analysis of the pellets after the treatment gave the following results: intrinsic viscosity [η]=0.81 dl/g, amount of carboxyl end groups=28 meq/kg, acetaldehyde content=0.5 ppm, crystallization degree=42.9%, and Mw/Mn=1.9. Analyzing the produced preform, it was found that its acetaldehyde content was as low as 6.6 ppm and it also had a good hue. The evaluation results are shown in Table 10 along with the properties of the starting PET resin, etc.

Comparative Example 10

Polymerization, heat treatment and molding were carried out under the same conditions as used in Example 10 except that the heat treatment was conducted at 240° C. for 15 hours. Analysis of the pellets after the treatment gave: intrinsic viscosity [η]=0.88 dl/g, amount of carboxyl end groups=38 meq/kg, acetaldehyde content=1.3 ppm, crystallization degree=57.4%, and Mw/Mn=2.1. The produced preform was found on analysis to have a high acetaldehyde content of 15.3 ppm. This is considered attributable to high-degree crystallization of the pellets after the treatment. Also, reduction of polymerization degree after molding was large, and the hue was deteriorated in comparison with Examples 10 and 11. The evaluation results are shown in Table 10 along with the properties of the starting PET resin, etc.

Examples 12 and 13

Polymerization, heat treatment and molding were carried out under the same conditions as used in Example 10 except for a change of the polymerization conditions and a change of the properties of the PET resin before the heat treatment. The evaluation results are shown in Table 10 along with the properties of the starting PET resin, etc. The lower the crystallization degree or the lower the acetaldehyde content of the PET resin before the treatment, the less the acetaldehyde content after the treatment can be made.

Example 14

Using the apparatus shown in FIG. 1, a polymerization intermediate (of a polyethylene terephthalate-isophthalate copolymer) having an intrinsic viscosity [η] of 0.50 dl/g, a carboxyl end group amount of 32 meq/kg, a terephthalic acid moiety to isophthalic acid moiety ratio in the polymer skeleton of 98:2 and a crystalline melting point of 245° C., was polymerized and palletized under the same conditions as used in Example 10. There were obtained the transparent pellets having an intrinsic viscosity [η] of 0.82 dl/g, a carboxyl end group amount of 28 meq/kg, an acetaldehyde content of 4.6 ppm, a crystallization degree of 2.8% and Mw/Mn=2.0.

These pellets were subjected to a heat treatment and molding under the same conditions as used in Example 10 except that the heat treatment was conducted at 190° C. for 4 hours. Analysis of the resultant pellets showed: intrinsic viscosity [η]=0.82 dl/g, amount of carboxyl end group=28 meq/kg, acetaldehyde content=0.4 ppm, crystallization degree=45.0%, and Mw/Mn=2.0. Also, the produced perform was found on analysis to have a low acetaldehyde content of 6.3 ppm and a good hue. The evaluation results are shown in Table 10 along with the properties of the staring PET resin, etc.

Example 15

Polymerization, heat treatment and molding were carried out under the same conditions as used in Example 14 except that the heat treatment was conducted at 200° C. for 4 hours. Analysis of the obtained pellets after the treatment showed: intrinsic viscosity [η]=0.83 dl/g, carboxyl end group=28 meq/kg, acetaldehyde content=0.5 ppm, crystallization degree=49.3%, and Mw/Mn=2.0. Also, analysis of the produced preform confirmed a low acetaldehyde content of 7.6 ppm and a good hue of the product. The evaluation results are shown in Table 10 along with the properties of the starting PET resin, etc.

Example 16

Polymerization, heat treatment and molding were carried out under the same conditions as used in Example 10 except that the heat treatment was conducted in an inert oven in a stream of nitrogen. The evaluation results are shown in Table 10 along with the properties of the starting PET resin, etc. Working in a stream of nitrogen contributed to the reduction of acetaldehyde content and an improvement of hue of the molded product.

Example 17

Polymerization, heat treatment and molding were carried out under the same conditions as used in Example 10 except that the heat treatment was conducted using a vacuum heating dryer evacuated to 80 Pa. The evaluation results are shown in Table 10 along with the properties of the starting PET resin, etc. Operations under vacuum promoted the reduction of acetaldehyde content and also improved hue of the molded product.

Comparative Example 11

Polymerization, heat treatment and molding were carried out under the same conditions as used in Example 17 except for use of the solid-state polycondensed pellets employed in Comparative Example 8. The evaluation results are shown in Table 10 along with the properties of the starting PET resin, etc. No reduction of acetaldehyde content was observed although the operations were conducted under vacuum.

Example 18

Polymerization, acetaldehyde removal treatment and molding were carried out under the same conditions as used in Example 10 except that instead of conducting the heat treatment, there was conducted a carbon dioxide cleaning treatment in which 2 kg of the transparent pellets obtained by polymerization are supplied to a 5-liter stainless steel autoclave, then carbon dioxide of 5.0 MPa is injected into the autoclave and left at room temperature for one hour, causing the pellets to absorb carbon dioxide, and then the pellets are led into and left in a vacuum desiccator at room temperature under 80 Pa for one hour to thereby remove carbon dioxide and acetaldehyde from the pellets. The evaluation results are shown in Table 10 along with the properties of the starting PET resin, etc. Application of the carbon dioxide cleaning treatment realized a remarkable reduction of acetaldehyde content of the pellets as well as a lowering of crystallization degree, making it possible to produce the excellent moldings.

Comparative Example 12

Polymerization, acetaldehyde removal treatment and molding were carried out under the same conditions as used in Example 18 except for use of the solid-state polycondensed pellets used in Comparative Example 8. The evaluation results are shown in Table 10 along with the properties of the starting PET resin, etc.

No reduction of acetaldehyde was observed despise the exercise of the carbon dioxide cleaning treatment.

Comparative Example 13

The prepolymer (of a polyethylene terephthalate-isophthalate copolymer) used in Example 14—the one having an intrinsic viscosity [η] of 0.50 dl/g, a carboxyl end group amount of 36 meq/kg, an acetaldehyde content of 66.4 ppm, a terephthalic acid moiety to isophthalic acid moiety ratio in the polymer skeleton of 98:2 and a crystalline melting point of 245° C.—was palletized as it was to produce the cylindrical pellets having a grain size of 3.0 mm in circle diameter and 2.0 mm in cylinder height on the average. These pellets were subjected to polymerization, heat treatment and molding under the same conditions as used in Example 14 except that the heat treatment was conducted at 200° C. for 4 hours. Analysis of the obtained pellets after the treatment gave the following findings: intrinsic viscosity [η]=0.55 dl/g, carboxyl end group=35 meq/kg, acetaldehyde content=relatively high 11.2 ppm, crystallization degree=high 59.2%, and Mw/Mn=2.2. Also, analysis of the produced preform showed a high acetaldehyde content of 26.6 ppm. The evaluation results are shown in Table 10 along with the properties of the starting PET resin, etc.

Production Example 1

A titanium compound catalyst was prepared as described below.

One liter of an ethanol solution containing 100 g of titanium (IV) tetraisoproxide was mixed with 1 liter of an ethanol solution containing 120 g of distilled water, then the precipitated solids of titanium hydroxide were washed 5 times with deionized water and dried in vacuo at 50° C., and the obtained solid titanium compound was pulverized to the fine particles of about 50 μm.

Production Example 2

A polymerization intermediate was produced as described below.

A slurry-like 1:1.2 (by mole) mixture of high-purity terephthalic acid and EG was supplied continuously to an esterification reaction vessel to carry out an esterification reaction with stirring at a polymerization temperature of 250° C. in a nitrogen atmosphere. The average residence time in the esterification reaction vessel was 220 minutes, and a low-order condensate having an average molecular weight of 1,200 was obtained. Then this low-order condensate was supplied continuously to a stirring vessel type melt polycondensation reactor along with the solid titanium compound catalyst (equivalent to 50 ppm as titanium atoms based on the terephthalic acid unit in the low-order condensate) prepared in Production Example 1 to carry out a polycondensation reaction under the conditions of: polymerization temperature=280° C., degree of vacuum=300 Pa, average residence time=100 minutes, to produce a prepolymer having an intrinsic viscosity [η] of 0.46 dl/g, a carboxyl end group amount of 31 meq/kg and a crystalline melting point of 256° C. The titanium content in this intermediate product was 35 ppm.

Production Example 3

A polymerization intermediate was produced under the same conditions as in Production Example 2 except that at the stage of polycondensation reaction, magnesium carbonate (equivalent to 50 ppm as magnesium atoms based on the terephthalic acid unit in the low-order condensate) was supplied together with the solid titanium compound catalyst. The obtained polymerization intermediate had an intrinsic viscosity [η] of 0.49 dl/g, a carboxyl end group amount of 30 meq/kg and a crystalline melting point of 256° C., and the titanium content and the magnesium content in the intermediate were both 36 ppm.

Production Example 4

A polymerization intermediate was produced under the same conditions as in Production Example 2 except that at the stage of polycondensation reaction, tributyl phosphate (equivalent to 200 ppm based on the terephthalic acid unit in the low-order condensate) was supplied together with the solid titanium compound catalyst. The obtained polymerization intermediate had an intrinsic viscosity [η] of 0.50 dl/g, a carboxyl end group amount of 28 meq/kg and a crystalline melting point of 256° C., and the titanium content in the intermediate was 36 ppm.

Production Example 5

A polymerization intermediate was produced under the same conditions as in Production Example 2 except that at the stage of polycondensation reaction, an ethylene glycol solution of aluminum acetylacetonate (equivalent to 50 ppm as aluminum atoms based on the terephthalic acid unit in the low-order condensate), dimethyl phenylphosphonate (equivalent to 50 ppm based on the terephthalic acid unit in the low-order condensate) and lithium acetate dihydrate (equivalent to 50 ppm as lithium atoms based on the terephthalic acid unit in the low-order condensate) was supplied in place of the solid titanium compound catalyst. The obtained polymerization intermediate had an intrinsic viscosity [η] of 0.49 dl/g, a carboxyl end group amount of 30 meq/kg and a crystalline melting point of 256° C., and the aluminum content and the lithium content in this product were 37 ppm and 36 ppm, respectively.

Production Example 6

A polymerization intermediate was produced under the same conditions as in Production Example 2 except that at the stage of polycondensation reaction, an ethylene glycol solution of diantimony trioxide (equivalent to 180 ppm as antimony atoms based on the terephthalic acid unit in the low-order condensate), trimethyl phosphate (equivalent to 50 ppm based on the terephthalic acid unit in the low-order condensate) and cobalt acetate (equivalent to 50 ppm as cobalt atoms based on the terephthalic acid unit in the low-order condensate) was supplied in place of the solid titanium compound catalyst. The obtained polymerization intermediate had an intrinsic viscosity [η] of 0.52 dl/g, a carboxyl end group amount of 33 meq/kg and a crystalline melting point of 256° C., and the antimony content and the cobalt content in the product were 152 ppm and 35 ppm, respectively.

Example 19

Using the apparatus shown in FIG. 1, the polymerization intermediate obtained in Production Example 2 was supplied continuously to the polymerization reactor (10) from the feed opening (2) by the transfer pump (1), and the 255° C. melt thereof was discharged from the holes of the perforate plate (3) at a rate of 10 g/min per hole and polymerized in a vacuum of 50 Pa by letting it fall down along the supports at an ambient temperature same as the discharge temperature.

The perforated plate of the polymerization reactor was 50 mm thick and had seven 1-mm diameter holes arranged linearly at intervals of 10 mm. The supports comprised the 2 mm diameter and 8 m long wires, each being suspended vertically and positioned close to a hole, and the 2 mm diameter and 100 mm long wires provided at intervals of 100 mm to cross the above-said wires at right angles to constitute a latticework. Stainless steel was used as the support material.

The residence time in the polymerization reactor in the polymerization operation was 65 minutes. The residence time was determined by using the value given by dividing the amount of the polymer staying in the reactor by the feed of the resin. Vehement bubbling of the polymerization intermediate of PET resin let out from the perforated plate in the polymerization and fouling of the nozzle surface and wall surfaces caused thereby were minimized. On the other hand, the falling PET resin contained a large volume of bubbles and was observed rolling down along the supports in a form of bubble balls.

The polymerized PET resin was discharged continuously from the polymerization reactor by the drainage pump (8) and drawn out in a form of strand from the outlet port (9). This strand was cooled and solidified in a 20° C. running-water bath and palletized continuously by a pelletizer.

Analysis of the obtained cylindrical transparent pellets showed that the intrinsic viscosity [η] of these pellets was 0.84 dl/g, the amount of the carboxyl groups at the polymer terminal was 26 meq/kg, and the acetaldehyde content was 4.9 ppm. The L value and the b value of color difference determined by the solution method were 99.8 and 0.17, respectively.

Using these pellets, the molding operations were carried out continuously from preform molding to hollow body molding at a molding temperature of 280° C. by a biaxially oriented blow molding machine (SBIII-100H-15 manufactured by Aoki Technical Laboratory, Inc).

The obtained preform was found on analysis to have an acetaldehyde content of 9.9 ppm and a good hue.

Example 20

Pellets were produced in the same way as in Example 19 except that the polymerization intermediate obtained in Production Example 3 was used in place of the polymerization intermediate obtained in Production Example 2.

Analyzing the produced pellets, it was found that these pellets had an intrinsic viscosity [η] of 0.87 dl/g, a carboxyl end group amount of 30 meq/kg and an acetaldehyde content of 5.0 ppm. The color difference of the pellets determined by the solution method was 99.8 mL value and 0.12 in b value.

Example 21

Pellets were produced in the same way as in Example 19 except that the polymerization intermediate obtained in Production Example 4 was used in place of the polymerization intermediate obtained in Production Example 2.

Analyzing the produced pellets, it was found that these pellets had an intrinsic viscosity [η] of 0.85 dl/g, a carboxyl end group amount of 28 meq/kg and an acetaldehyde content of 5.0 ppm. The color difference of the pellets determined by the solution method was 99.7 mL value and 0.11 in b value.

Example 22

Pellets were produced in the same way as in Example 19 except that the polymerization intermediate obtained in Production Example 5 was used in place of the polymerization intermediate obtained in Production Example 2.

Analysis of the produced pellets confirmed that these pellets had an intrinsic viscosity [η] of 0.87 dl/g, a carboxyl end group amount of 29 meq/kg and an acetaldehyde content of 5.1 ppm, and their color difference determined by the solution method was 99.8 mL value and 0.13 in b value.

Example 23

Pellets were produced in the same way as in Example 19 except for use of the polymerization intermediate obtained in Production Example 6 in place of the one obtained in Production Example 2.

Analysis of the produced pellets showed that these pellets had an intrinsic viscosity [η] of 0.88 dl/g, a carboxyl end group amount of 33 meq/kg and an acetaldehyde content of 5.4 ppm. These pellets assumed a slightly bluish discoloration, and their color difference determined by the solution method was 99.3 mL value and −0.02 in b value.

Comparative Example 14

Using the polymerization intermediate product obtained in Production Example 2, a PET resin was polymerized by 120-minute batch polymerization by a conventional stirring vessel type melt polymerization apparatus under the conditions of 255° C. polymerization temperature and 50 Pa vacuum, and the pellets were made therefrom. Intrinsic viscosity [η] of these pellets reached the ceiling and never topped 0.60 dl/g, and it was impossible to obtain PET with a desired molecular weight. Also the pellets were light yellow in hue.

Comparative Example 15

Pellets were produced under the same conditions as used in Comparative Example 14 except that the polymerization temperature was raised to 275° C. Intrinsic viscosity [η] of these pellets reached the ceiling and never topped 0.70 dl/g, and it was impossible to obtain PET with a desired molecular weight. Also the pellets had a yellow hue.

Comparative Examples 16 to 19

Pellets were made from a PET resin polymerized under the same conditions as in Comparative Example 15 except for use of the polymerization intermediates obtained in Production Examples 3 to 6 in place of the polymerization intermediate obtained in Production Example 2. In each case, intrinsic viscosity [η] reached the ceiling and never topped 0.70 dl/g, and it was impossible to obtain PET with a desired molecular weight. Also, the pellets were yellowish in hue.

Example 24

Using the apparatus shown in FIG. 8 having a polymer filter (11) which is a tube type filter with a filter area of 0.0188 m² and a filter precision of 30 μm (mfd. by Nippon Seisen Co., Ltd.), and providing an extruder upstream of the transfer pump (1), the commercially available PET resin pellets having an intrinsic viscosity [η] of 0.58 dl/g, a carboxyl end group amount of 40 meq/kg, an acetaldehyde content of 41.3 ppm and Mw/Mn=2.0 were supplied as the polymerization intermediate at a rate of 2.0 kg per hour from the pellet hopper of the extruder, and they were polymerized at a polymerization temperature of 255° C. under a reduced pressure of 65 Pa by discharging the melt from the holes of the perforated plate (3) and letting it fall down along the supports (5) in the polymerization reactor (10). A heating medium was passed through the outside jacket of the line to keep the resin temperature in the polymer filter section at 265° C. The perforated plate (3) was 50 mm thick and had 4 holes, 1 mm in diameter, arranged linearly at intervals of 25 mm.

The supports (5) comprised the 2 mm diameter and 8 m long wires, each being suspended vertically and positioned close to a hole, and the 2 mm diameter and 100 mm long wires disposed at intervals of 15 mm to cross the above-said wires at right angles to constitute a wire gauze. Stainless steel was used as the support material.

The polymerization intermediate in the polymerization reactor (10) was foamed to a proper degree, and there took place no fouling of the reactor due to vehement bubbling. On the other hand, the resin falling down along the supports contained a volume of bubbles and was observed rolling down in a form of bubble balls.

The obtained polymer was a high-quality PET resin having the following properties: intrinsic viscosity [η]=0.77 dl/g, carboxyl end group=29 meq/kg, acetaldehyde content=6.3 ppm, Mw/Mn=2.0, and color difference determined by the solution method, L=99.6 and b=0.36.

The polymerization was conducted for 15 days continuously under the above conditions, but the polymer quality remained stable throughout the period. Also, the polymer was checked for extraneous matter every 5 days from the 5th day after start of polymerization, but there was seen no extraneous matter with a size exceeding 30 μm in the polymer.

Example 25

Polymerization was carried out for 15 days continuously under the same conditions as in Example 24 except that a mixture of 5% by weight of the cleaned flakes of recovered PET bottles and 95% by weight of PET resin pellets having an intrinsic viscosity [η] of 0.58 dl/g, a carboxyl end group amount of 40 meq/kg, an acetaldehyde content of 41.3 ppm and Mw/Mn=2.0 was used as the polymerization intermediate of PET resin.

The obtained polymer was a high-quality PET resin having an intrinsic viscosity [η] of 0.78 dl/g, a carboxyl end group amount of 30 meq/kg, an acetaldehyde content of 6.5 ppm, and Mw/Mn=2.0, with its color difference determined by the solution method being L=99.2 and b=0.38. The polymer remained stable throughout the period of polymerization. The polymer was also checked for extraneous matter periodically, or every 5 days from the 5th day after start of polymerization, but there was observed no extraneous matter with a size exceeding 30 μm in the polymer.

Comparative Examples 20 and 21

Polymerization and examination for the presence or absence of extraneous matter were conducted under the same conditions as in Example 24 and Example 25, respectively, except for nonuse of the polymer filter (11). The obtained polymer contained 5 to 18 pieces of black extraneous matter with a size of 100 to 200 μm per 300 g of the PET resin. The black extraneous matter is considered to have been produced as the polymerization intermediate was decomposed in the extruder by the action of oxygen contained in the pellets or recovered flakes of polymerization intermediate or the infiltration of air in the extruder used for melting the polymerization intermediate.

Example 26

Using the apparatus shown in FIG. 1, the polymerization intermediate of a PET resin having an intrinsic viscosity [η] of 0.43 dl/g, a carboxyl end group amount of 30 meq/kg and a crystalline melting point of 255° C. was supplied continuously to the polymerization reactor (10) from the feed opening (2) by the transfer pump (1), and the 255° C. melt thereof was discharged from the holes of the perforated plate (3) at a rate of 10 g/min and polymerized by letting it fall along the supports at an ambient temperature same as the discharge temperature.

The perforated plate (3) of the polymerization reactor (10) was 50 mm thick and had 7 holes, 1 mm in diameter, arranged linearly at intervals of 10 mm. The supports (5) comprised the 2 mm diameter and 8 mm long wires, each being suspended vertically and positioned close to a hole, and the 2 mm diameter and 100 mm long wires disposed at intervals of 100 mm to cross the above-said wires at right angles to constitute a latticework. Stainless steel was used as the support material.

The residence time in the polymerization reactor in the polymerization operation was 60 minutes. This resistance time was determined by using the value given by dividing the amount of the polymer staying in the polymerization reactor by the feed of the resin. Vehement bubbling of the polymerization intermediate of PET resin discharged from the perforated plate in polymerization and fouling of the nozzle surface and wall surfaces caused thereby were minimized. On the other hand, the falling PET resin contained a large volume of bubbles and was observed rolling down along the supports in a form of bubble balls.

The polymerized PET resin was discharged continuously from the polymerization reactor (10) by the drainage pump (8) and drawn out as a strand from the outlet (9). This strand was cooled and solidified in a 20° C. running-water bath and palletized continuously by a pelletizer. Intrinsic viscosity [η] of the pellets was 0.82 dl/g. The pellets were heat treated in a vacuum dryer at 130° C. for 10 hours and crystallized simultaneously with drying. The crystallized pellets were solid-state polycondensed by a tumbler type solid-state polycondensation reactor under a reduced pressure of 50 Pa at 210° C. for 12 hours to obtain a high quality PET resin having an intrinsic viscosity [η] of as high as 1.32 dl/g and a good hue and also, quite surprisingly, very low in acetaldehyde content. Further, the amount of fine powder generated by rubbing of the pellets during solid-state polycondensation was minimized to provide an economical advantage. The properties of the pellets obtained from the solid-phase polymerization are shown in Table 11.

Comparative Example 22

The pellets of a PET resin having an intrinsic viscosity [η] of 0.44 dl/g, a carboxyl end group amount of 32 meq/kg and a crystalline melting point of 255° C. were heat treated in a vacuum dryer at 130° C. for 12 hours and crystallized simultaneously with drying. The crystallized pellets were subjected to solid-state polycondensation by a tumbler type solid-state polycondensation reactor under a reduced pressure of 50 Pa at 210° C. for 10 hours. The obtained pellets had a low intrinsic viscosity [η] of 0.58 dl/g, and also there was produced fine powder in bulk to cause an economical loss. The properties of the pellets obtained from the above solid-state polycondensation are shown in Table 11.

Comparative Example 23

Polymerization was carried out under the same conditions as applied in Comparative Example 22 except that the solid-state polycondensation time was prolonged to 48 hours. The obtained pellets were still low in intrinsic viscosity [η], which was 0.85 dl/g. Further, the hue of the pellets was aggravated and there was formed a greater volume of fine powder than in Comparative Example 22 to suffer an economical loss. The properties of these pellets are shown in Table 11.

Example 27

Using the apparatus shown in FIG. 1, a pellet of a polymerization intermediate of a PET resin having an intrinsic viscosity [η] of 0.49 dl/g, a carboxyl end group amount of 32 meq/kg, a crystalline melting point of 250° C. and a cyclic trimer content of 0.40% by weight was melted using an extruder placed upsteam of the transfer pump (1) and was supplied continuously to the polymerization reactor (10) from the feed opening (2) by the transfer pump (1). And, the 255° C. melt thereof was discharged from the holes of the perforated plate (3) at a rate of 10 g/min per hole and then polymerized under a reduced pressure of 60 Pa by letting the melt fall down along the supports at an ambient temperature same as the discharge temperature.

Used as a polymerization intermediate here was one prepared by immersing a pellet of the polymerization intermediate in chloroform, removing a part of a cyclic trimer included in the pellet by extraction and drying the treated pellet. Thereto added was 100 ppm of trimethyl phosphate at the time of re-melting for the purpose of inhibiting the increase of cyclic trimer content in the melt. A part of the polymerization intermediate was sampled out, put into a sample tube and, after sealing the tube, left in a molten state at 275° C. for 30 minutes in a nitrogen atmosphere, and the increment of cyclic trimer content after this melt-holding period was measured. It was as low as 0.08% by weight.

The perforated plate of the polymerization reactor was 50 mm thick and had 7 holes, each being 1 mm in diameter, arranged linearly at intervals of 10 mm. The supports comprised the 2-mm diameter and 8 m long wires, each being suspended vertically and positioned close to a hole, and the 2 mm diameter and 100 mm long wires disposed at intervals of 100 mm to cross the above-said wires at right angles to constitute a latticework. Stainless steel was used as the support material.

The residence time in the polymerization reactor in the polymerization operation was 65 minutes. For the determination of residence time, there was used the value given by dividing the amount of the polymer staying in the polymerization reactor by the feed of the resin. Vehement bubbling of the PET resin polymerization intermediate discharged from the perforated plate during polymerization and fouling of the nozzle surface and wall surfaces caused thereby were minimized. On the other hand, the falling PET resin contained abundant bubbles and was observed rolling down along the supports in a form of bubble balls.

The polymerized PET resin was discharged continuously from the polymerization reactor by the drainage pump (8) and drawn out in a form of strand from the outlet (9). This strand was cooled and solidified in a 20° C. running-water bath and palletized continuously by a pelletizer.

The obtained cylindrical transparent pallets were analytically determined to have an intrinsic viscosity [η] of 0.82 dl/g, a carboxyl end group amount of 28 meq/kg, an acetaldehyde content of 5.2 ppm and a cyclic trimer content of as low as 0.48% by weight. It was found that the pellet was excellent one having L=99.4 and b=0.36 of color difference determined by the solution method.

Using these pellets, the molding operations were carried out continuously from preform molding to hollow body molding at a molding temperature of 280° C. by using a biaxially oriented blow molding machine (SBIII-100H-15 mfd. by Aoki Technical Laboratory, Inc.).

On analysis, the produced perform was found to have a low acetaldehyde content of 11.3 ppm, also a low cyclic trimer content of 0.50% by weight and a good hue.

Example 28

Pellets were produced by carrying out polymerization in the same way as in Example 27 except that trimethyl phosphate was not added when re-melting the intermediate. A part of the polymerization intermediate was sampled out, put into a sample tube, and after sealing the tube, left in a molten state at 275° C. for 30 minutes in a nitrogen atmosphere, and the increment of cyclic trimer content after the melt holding operation was measured. It was 0.22% by weight.

The obtained cylindrical transparent pellets were found on analysis to have an intrinsic viscosity [η] of 0.87 dl/g, a carboxyl end group amount of 28 meq/1 g. an acetaldehyde content of 5.1 ppm and a cyclic trimer content of as low as 0.63% by weight. It was found that the pellet was excellent one having L=99.4 and b=0.39 of color difference determined by the solution method.

Example 29

Pellets were produced by carrying out polymerization in the same way as in Example 27 except that a PET resin polymerization intermediate having an intrinsic viscosity [η] of 0.49 dl/g, a carboxyl end group amount of 30 meq/kg, a crystalline melting point of 250° C. and a cyclic trimer content of 1.2% by weight was used as starting material.

The polymerization intermediate used here was the one produced by a conventional melt polymerization method. A part of this polymerization intermediate was sampled out and kept in a sealed sample tube in a molten state at 275° C. for 30 minutes in a nitrogen atmosphere, and the increment of cyclic trimer content after the melt holding operation was measured. It was as high as 0.38% by weight.

The obtained cylindrical transparent pellets were analyzed to find: intrinsic viscosity [η]=0.86 dl/g; carboxyl end group=28 meq/kg; acetaldehyde content=5.4 ppm; color difference determined by the solution method, L=99.3 and b=0.37; and cyclic trimer content=0.82% by weight.

Example 30

When the pellets obtained in Example 29 were extracted with chloroform at normal temperature for 10 hours, the cyclic trimer content could be decreased to 0.16% by weight. Using these pellets, the molding operations were carried out continuously from preform molding to hollow body molding according to the procedure of Example 27. The produced preform was found on analysis to have an intrinsic viscosity [η] of 0.80 dl/g, an acetaldehyde content of 0.7 ppm, a carboxyl end group of 28 meq/kg and a cyclic trimer content of as low as 0.22% by weight. It was an excellent pellet having L=99.3 and b=0.38 of color difference determined by the solution method.

Comparative Example 24

The polymerization intermediate same as used in Example 27 was polymerized by a conventional stirring vessel type melt polymerization reactor at a polymerization temperature of 255° C. under a reduced pressure of 55 Pa by setting the polymerization time at 2 hours. There were obtained the pellets discolored to light yellow, with its intrinsic viscosity [η] never exceeding 0.50 dl/g. When the similar polymerization was conducted at a polymerization temperature of 275° C. under a reduced pressure of 55 Pa by setting the polymerization time at 2 hours, there were obtained the yellow-tinted pellets whose cyclic trimer content increased to 0.84% by weight, with their intrinsic viscosity [η] never exceeding 0.55 dl/g.

Comparative Example 25

The same polymerization intermediate as used in Example 29 was polymerized by a conventional stirring vessel type melt polymerization reactor at a polymerization temperature of 255° C. under a reduced pressure of 55 Pa by setting the polymerization time at 2 hours. There were obtained the yellow-discolored pellets with an intrinsic viscosity [η] not exceeding 0.52 dl/g. When the similar polymerization was carried out at a polymerization temperature of 275° C. under a reduced pressure of 55 Pa by setting the polymerization time at 2 hours, there were obtained the yellow-discolored pellets having an intrinsic viscosity [η] of 0.59 dl/g (never exceeding 0.60 dl/g).

Extraction of the obtained pellets with chloroform in the same manner as in Example 30 could decrease the cyclic trimer content to 0.23% by weight. Using these pellets, the molding operations were conducted continuously from preform molding to hollow body molding according to the procedure of Example 27, but the molding ruptured during hollow body molding succeeding preform molding because of the low polymerization degree of the polymer, and it was impossible to produce a desired hollow body.

The produced preform was found on analysis to have an intrinsic viscosity [η] of 0.52 dl/g and a cyclic trimer content of 0.37% by weight. The preform was also discolored to in yellow.

Production Example 7

Using the apparatus shown in FIG. 1, a polymerization intermediate of a PET resin having an intrinsic viscosity [η] of 0.50 dl/g, a carboxyl end group amount of 28 meq/kg and a crystalline melting point of 252° C. was supplied continuously to the polymerization reactor (10) from the feed opening (2) by the transfer pump (1), and the 265° C. melt thereof was discharged from the holes of the perforated plate (3) at a rate of 10 g/min per hole and let fall down along the supports at an ambient temperature same as the discharge temperature to exercise polymerization under a reduced pressure of 60 Pa.

The perforated plate of the polymerization reactor was 50 mm thick and had 7 holes, each being 1 mm in diameter, arranged linearly at intervals of 10 mm. The supports comprised the 2-mm diameter and 8 m long wires, each being suspended vertically and positioned close to a hole, and the 2-mm diameter and 100 mm long wires disposed at intervals of 100 mm to cross the above-said wires at right angles to constitute a latticework. Stainless steel was used as support material.

The residence time in the polymerization reactor in the polymerization operation was 70 minutes. The residence time was determined by using the value given by dividing the amount of the polymer staying in the polymerization reactor by the feed of the resin. Severe bubbling of the PET polymerization intermediate discharged from the perforated plate in the polymerization operation and fouling of the nozzle surface and wall surfaces caused thereby were minimized. On the other hand, the falling PET resin contained abundant bubbles and was observed rolling down along the supports in a form of bubble balls.

The polymerized PET resin was discharged continuously from the polymerization reactor by the drainage pump (8) and drawn out in a form of strand from the outlet (9). This strand was cooled and solidified in a 20° C. running-water bath and palletized continuously by a pelletizer.

The obtained cylindrical transparent pellets were found on analysis to have an intrinsic viscosity [η] of 0.80 dl/g, a carboxyl end group amount of 29 meq/kg and an acetaldehyde content of 4.8 ppm.

Example 31

Pellets were produced by carrying out polymerization in succession to Production Example 7 under the same conditions as used in Production Example 7 except that after producing the pellets under the conditions of Production Example 7, ethylene glycol was introduced continuously as a molecular weight reducing agent into the transfer line of the polymerization intermediate to adjust the intrinsic viscosity [η] of the prepolymer to 0.45 dl/g in the line, and supplying this prepolymer continuously to the polymerization reactor (10) from the feed opening (2) by the transfer pump (1).

The obtained cylindrical transparent pellets were analytically determined to have an intrinsic viscosity [η] of 0.69 dl/g, a great variation from that of the polymerization intermediate. It was also found that the amount of carboxyl end groups was 29 meq/kg and the acetaldehyde content 4.2 ppm. The properties of the produced pellet were shown in Table 12.

Example 32

Pellets were produced by carrying out polymerization in succession to Production Example 7 under the same conditions as used in Production Example 7 except that after producing the pellets under the conditions of Production Example 7, glycerin was introduced continuously as a molecular weight increasing agent into the transfer line of the polymerization intermediate to adjust intrinsic viscosity [η] of the polymerization intermediate to 0.55 dl/g in the line, and supplying this intermediate continuously to the polymerization reactor (10) from the feed opening (2) by the transfer pump (1).

The obtained cylindrical transparent pellets were analytically determined to have an intrinsic viscosity [η] of 0.92 dl/g, a great variation from that of the polymerization intermediate. It was also found that the amount of carboxyl end groups was 30 meq/kg and the acetaldehyde content 5.2 ppm. The properties of the produced pellet were shown in Table 12.

Production Example 8

The same polymerization intermediate as used in Production Example 7 was polymerized in a 270° C. molten state by a conventional stirring vessel type polymerization reactor under the conditions of reduced pressure of 60 Pa and polymerization time of 100 minutes to produce the pellets.

The obtained pellets were found on analysis to have an intrinsic viscosity [η] of 0.58 dl/g, a carboxyl end group amount of 36 meq/kg and an acetaldehyde content of 54.3 ppm. The pellets also had a light yellowish discoloration.

Comparative Example 26

Pellets were produced by carrying out polymerization in succession to Production Example 8 under the same conditions as used in Production Example 8 except that after producing the pellets under the conditions of Production Example 8, ethylene glycol was introduced continuously as a molecular weight reducing agent into the transfer line of the polymerization intermediate to adjust intrinsic viscosity [η] of the polymerization intermediate to 0.45 dl/g in the line, and this intermediate was supplied continuously to the polymerization reactor. The properties of the produced pellet were shown in Table 12.

Analysis of the obtained pellets showed that their intrinsic viscosity [η] was 0.53 dl/g, which indicated that the variation of intrinsic viscosity was of the same degree as that of the polymerization intermediate. Also, the amount of the carboxyl end groups was 36 meq/kg and the acetaldehyde content 55.3 ppm, and the pellets were discolored to yellow.

Comparative Example 27

Pellets were produced by carrying out polymerization in succession to Production Example 8 under the same conditions as used in Production Example 8 except that after producing the pellets under the conditions of Production Example 8, glycerin was introduced continuously as a molecular weight increasing agent into the transfer line of the polymerization intermediate to adjust intrinsic viscosity [η] of the polymerization intermediate to 0.55 dl/g in the line, and then this intermediate was supplied continuously to the polymerization reactor.

Analysis of the obtained pellets showed that intrinsic viscosity [η] thereof was 0.61 dl/g, which indicated that the variation of intrinsic viscosity was of the same degree as or smaller than that of the polymerization intermediate. Also, the amount of the carboxyl end groups was 37 meq/kg and the acetaldehyde content 56.2 ppm, and the pellets were discolored to yellow. The properties of the produced pellet were shown in Table 12.

TABLE 1

| | | POLYMERIZATION INTERMEDIATE | | | POLYMERIZATION CONDITIONS | | |
| --- | --- | --- | --- | --- | --- | --- | --- |
| | STARTING MATERIALS | INTRINSIC VISCOSITY | AMOUNT OF CARBOXYL GROUPS (meq/kg) | CRYSTALLINE MELTING POINT (° C.) | SUPPORT STRUCTURE* | POLYMER- IZATION RATE | TEMPERATURE |
| EXAMPLE 1 | TPA/EG | 0.30 | 52 | 255 | SUPPORT 1 | 2.4 | 260 |
| EXAMPLE 2 | TPA/EG | 0.49 | 24 | 255 | SUPPORT 2 | 5.5 | 260 |
| EXAMPLE 3 | TPA/EG | 0.50 | 23 | 255 | SUPPORT 3 | 40.0 | 255 |
| EXAMPLE 4 | TPA/EG | 0.45 | 30 | 255 | SUPPORT 4 | 2.4 | 260 |
| EXAMPLE 5 | TPA/EG | 0.45 | 30 | 255 | SUPPORT 5 | 2.4 | 260 |
| EXAMPLE 6 | TPA/EG | 0.45 | 30 | 255 | SUPPORT 6 | 2.4 | 260 |
| EXAMPLE 7 | DMT/EG | 0.60 | 40 | 260 | SUPPORT 1 | 2.4 | 265 |
| EXAMPLE 8 | DMT/EG | 0.60 | 40 | 260 | SUPPORT 1 | 2.4 | 265 |
| EXAMPLE 9 | TPA/EG | 0.45 | 30 | 255 | SUPPORT 6 | 2.4 | 260 |
| COMPARATIVE EXAMPLE 1 | TPA/EG | — | — | — | — | — | 290+ |
| COMPARATIVE EXAMPLE 2 | TPA/EG | 0.49 | 24 | 255 | — | — | 210++ |
| COMPARATIVE EXAMPLE 3 | TPA/EG | 0.45 | 30 | 255 | SUPPORT 1 | 2.4 | 340 |
| COMPARATIVE EXAMPLE 4 | TPA/EG | 0.45 | 30 | 255 | SUPPORT 1 | 2.4 | 243 |
| COMPARATIVE EXAMPLE 5 | TPA/EG | 0.45 | 30 | 255 | SUPPORT 1 | 2.4 | 260 |
| COMPARATIVE EXAMPLE 6 | TPA/EG | 0.45 | 30 | 255 | SUPPORT 1 | 2.4 | 295 |
| COMPARATIVE EXAMPLE 7 | DMT/EG | 0.60 | 40 | 260 | — | — | 285 |

| | POLYMERIZATION CONDITIONS | | | | RESIN PROPERTIES | |
| --- | --- | --- | --- | --- | --- | --- |
| | PRESSURE (Pa) | NITROGEN | BUBBLING STATE | FOULING STATE | ACETALDEHYDE CONTENT | INTRINSIC VISCOSITY |
| EXAMPLE 1 | 65 | 0 | ○ | ○ | 5.0 | 0.49 |
| EXAMPLE 2 | 65 | 0 | ○ | ○ | 5.4 | 0.80 |

TABLE 1-continued

|  |  |  |  |  |  |  |
|---|---|---|---|---|---|---|
| EXAMPLE 3 | 50 | 0 | ○ | ○ | 5.1 | 0.80 |
| EXAMPLE 4 | 65 | 0 | ○ | ○ | 7.1 | 0.88 |
| EXAMPLE 5 | 65 | 0 | ○ | ○ | 6.8 | 0.89 |
| EXAMPLE 6 | 65 | 0 | ○ | ○ | 7.2 | 0.75 |
| EXAMPLE 7 | 65 | 0 | ○ | ○ | 6.8 | 0.98 |
| EXAMPLE 8 | 100 | 5 | ○ | ○ | 6.9 | 1.08 |
| EXAMPLE 9 | 65 | 0.5 | ○ | ○ | 8.2 | 0.88 |
| COMPARATIVE EXAMPLE 1 | 67 | — | — | — | 40 | 0.57 |
| COMPARATIVE EXAMPLE 2 | — | — | — | — | 3.6 | 0.78 |
| COMPARATIVE EXAMPLE 3 | 65 | 0 | X | X | 120 | 0.50 |
| COMPARATIVE EXAMPLE 4 | 65 | 0 | — | — | — | — |
| COMPARATIVE EXAMPLE 5 | NORMAL PRESSURE | 0 | NONE | ○ | 125 | 0.41 |
| COMPARATIVE EXAMPLE 6 | 65 | 0 | ○ | ○ | 40 | 0.85 |
| COMPARATIVE EXAMPLE 7 | — | — | — | — | 92 | 0.64 |

*See Table 9 for the structure of the support
+MELT POLYMERIZATION TEMPERATURE
++SOLID-STATE POLYCONDENSATION TEMPERATURE

TABLE 2

|  |  | EXAMPLE 1 MEDIUM VISCOSITY | EXAMPLE 2 HIGH VISCOSITY | EXAMPLE 3 HIGH VISCOSITY | COMPARATIVE EXAMPLE 1 MEDIUM VISCOSITY | COMPARATIVE EXAMPLE 2 HIGH VISCOSITY |
|---|---|---|---|---|---|---|
| PET RESIN | INTRINSIC VISCOSITY | 0.49 | 0.80 | 0.80 | 0.57 | 0.78 |
|  | AMOUNT OF CARBOXYL GROUP (meq/kg) | 27 | 16 | 16 | 37 | 30 |
|  | ACETALDEHYDE CONTENT (ppm) | 5.0 | 5.4 | 5.1 | 40.0 | 3.6 |
|  | COLOR DIFFERENCE L VALUE | 100 | 99.6 | 99.6 | 98.9 | 99.8 |
|  | COLOR DIFFERENCE b VALUE | 0.00 | 0.35 | 0.33 | 0.81 | 0.25 |
|  | Mw/Mn | 2.1 | 2.1 | 2.0 | 2.2 | 2.4 |
|  | AMOUNT OF CYCLIC TRIMMER (Wt %) | 0.9 | 0.8 | 0.8 | 1.0 | 0.6 |
| PELLETS (UNTREATED) | CRYSTALLIZATION DEGREE | 2.7 | 2.7 | 2.7 | 2.7 | 58.8 |
|  | AMOUNT OF FINE POWDER (mg/kg) | 0.0 | 0.0 | 0.0 | 0.0 | 15.4 |
| PELLETS (AFTER AA REDUCING TREATMETN) | ACETALDEHYDE CONTENT (ppm) | — | 2.8 | 2.3 | — | 3.6 |
|  | CRYSTALLIZATION DEGREE | — | 25.0 | 24.4 | — | 58.8 |
|  | AMOUNT OF FINE POWDER (mg/kg) | — | 0.0 | 0.0 | — | 15.5 |
| PERFORM (MOLDED FROM PELLETS) | AMOUNT OF CARBOXYL GROUP (meq/kg) | — | 17 | 16 | — | 30 |
|  | ACETALDEHYDE CONTENT (ppm) | — | 9.0 | 7.8 | — | 19.7 |
|  | COLOR DIFFERENCE L VALUE | — | 98.4 | 98.7 | — | 99.8 |
|  | COLOR DIFFERENCE b VALUE | — | 0.62 | 0.60 | — | 0.52 |
| HOLLOW BODY (MOLDED FROM PELLETS) | AMOUNT OF CARBOXYL GROUP (meq/kg) | — | 17 | 16 | — | 28 |
|  | ACETALDEHYDE CONTENT (ppm) | — | 7.2 | 5.5 | — | 13.1 |
|  | COLOR DIFFERENCE L VALUE | — | 98.4 | 98.6 | — | 98.4 |
|  | COLOR DIFFERENCE b VALUE | — | 0.70 | 0.64 | — | 0.71 |
| PREFORM (TRANSFERRED IN MOLTEN STATE AND INJECTION MOLDED) | AMOUNT OF CARBOXYL GROUP (meq/kg) | — | — | 17 | — | — |
|  | ACETALDEHYDE CONTENT (ppm) | — | — | 6.7 | — | — |
|  | COLOR DIFFERENCE L VALUE | — | — | 98.0 | — | — |
|  | COLOR DIFFERENCE b VALUE | — | — | 0.63 | — | — |
| HOLLOW BODY (TRANSFERRED IN MOLTEN STATE AND INJECTION MOLDED) | AMOUNT OF CARBOXYL GROUP (meq/kg) | — | — | 19 | — | — |
|  | ACETALDEHYDE CONTENT (ppm) | — | — | 4.5 | — | — |
|  | COLOR DIFFERENCE L VALUE | — | — | 98.0 | — | — |
|  | COLOR DIFFERENCE b VALUE | — | — | 0.75 | — | — |
| PREFORM (TRANSFERRED IN MOLTEN STATE AND COMPRESSION MOLDED) | AMOUNT OF CARBOXYL GROUP (meq/kg) | — | — | 18 | — | 31 |
|  | ACETALDEHYDE CONTENT (ppm) | — | — | 8.6 | — | 25.3 |
|  | COLOR DIFFERENCE L VALUE | — | — | 98.2 | — | 97.8 |
|  | COLOR DIFFERENCE b VALUE | — | — | 0.66 | — | 0.85 |

TABLE 2-continued

|  |  | EXAMPLE 1 MEDIUM VISCOSITY | EXAMPLE 2 HIGH VISCOSITY | EXAMPLE 3 HIGH VISCOSITY | COMPARATIVE EXAMPLE 1 MEDIUM VISCOSITY | COMPARATIVE EXAMPLE 2 HIGH VISCOSITY |
|---|---|---|---|---|---|---|
| HOLLOW BODY (TRANSFERRED IN MOLTEN STATE AND COMPRESSION MOLDED) | AMOUNT OF CARBOXYL GROUP (meq/kg) | — | — | 19 | — | 31 |
| | ACETALDEHYDE CONTENT (ppm) | — | — | 7.6 | — | 21.2 |
| | COLOR DIFFERENCE L VALUE | — | — | 98.1 | — | 97.5 |
| | COLOR DIFFERENCE b VALUE | — | — | 0.69 | — | 0.89 |

TABLE 3

|  | TEMPERATURE (° C.) | RESIDENCE TIME (MIN) | DEGREE OF VACUUM (Pa) | INTRINSIC VISCOSITY (dl/g) |
|---|---|---|---|---|
| ESTERIFICATION REACTOR | 260 | 180 | NORMAL PRESSURE | — |
| FIRST STIRRING VESSEL TYPE POLYMERIZATION REACTOR | 280 | 60 | 20000 | 0.15 |
| SECOND STIRRING VESSEL TYPE POLYMERIZATION REACTOR | 285 | 60 | 450 | 0.30 |

TABLE 4

|  | TEMPERATURE (° C.) | RESIDENCE TIME (MIN) | DEGREE OF VACUUM (Pa) | INTRINSIC VISCOSITY (dl/g) |
|---|---|---|---|---|
| ESTERIFICATION REACTOR | 260 | 180 | NORMAL PRESSURE | — |
| FIRST STIRRING VESSEL TYPE POLYMERIZATION REACTOR | 280 | 80 | 20000 | 0.20 |
| SECOND STIRRING VESSEL TYPE POLYMERIZATION REACTOR | 285 | 60 | 250 | 0.49 |

TABLE 5

|  | TEMPERATURE (° C.) | RESIDENCE TIME (MIN) | DEGREE OF VACUUM (Pa) | INTRINSIC VISCOSITY (dl/g) |
|---|---|---|---|---|
| ESTERIFICATION REACTOR | 260 | 180 | NORMAL PRESSURE | — |
| FIRST STIRRING VESSEL TYPE POLYMERIZATION REACTOR | 280 | 80 | 20000 | 0.20 |
| SECOND STIRRING VESSEL TYPE POLYMERIZATION REACTOR | 280 | 80 | 230 | 0.50 |

TABLE 6

|  | TEMPERATURE (° C.) | RESIDENCE TIME (MIN) | DEGREE OF VACUUM (Pa) | INTRINSIC VISCOSITY (dl/g) |
|---|---|---|---|---|
| ESTERIFICATION REACTOR | 260 | 180 | NORMAL PRESSURE | — |
| FIRST STIRRING VESSEL TYPE POLYMERIZATION REACTOR | 280 | 80 | 20000 | 0.20 |
| SECOND STIRRING VESSEL TYPE POLYMERIZATION REACTOR | 285 | 60 | 80 | 0.57 |

TABLE 7

|  | TEMPERATURE (° C.) | RESIDENCE TIME (MIN) | DEGREE OF VACUUM (Pa) | INTRINSIC VISCOSITY (dl/g) |
|---|---|---|---|---|
| FIRST ESTER EXCHANGE REACTION VESSEL | 190 | 120 | NORMAL PRESSURE | — |

TABLE 7-continued

|  | TEMPERATURE (° C.) | RESIDENCE TIME (MIN) | DEGREE OF VACUUM (Pa) | INTRINSIC VISCOSITY (dl/g) |
|---|---|---|---|---|
| SECOND ESTER EXCHANGE REACTION VESSEL | 230 | 120 | NORMAL PRESSURE | — |
| FIRST STIRRING VESSEL TYPE POLYMERIZATION REACTOR | 280 | 60 | 10000 | 0.15 |
| HORIZONTAL STIRRING POLYMERIZATION REACTOR | 285 | 60 | 100 | 0.60 |

TABLE 8

|  | TEMPERATURE (° C.) | RESIDENCE TIME (MIN) | DEGREE OF VACUUM (Pa) | INTRINSIC VISCOSITY (dl/g) |
|---|---|---|---|---|
| FIRST ESTER EXCHANGE REACTION VESSEL | 190 | 120 | NORMAL PRESSURE | — |
| SECOND ESTER EXCHANGE REACTION VESSEL | 230 | 120 | NORMAL PRESSURE | — |
| FIRST STIRRING VESSEL TYPE POLYMERIZATION REACTOR | 280 | 120 | 10000 | 0.25 |
| HORIZONTAL STIRRING POLYMERIZATION REACTOR | 285 | 120 | 50 | 0.64 |

TABLE 9

|  | SUPPORT CONFIGURATION | VERTICAL | | | | HORIZONTAL | | |
|---|---|---|---|---|---|---|---|---|
|  |  | DIAMETER (mm) | LENGTH (m) | NUMBER OF SUPPORTS | INTERVAL (mm) | DIAMETER (mm) | LENGTH (mm) | INTERVAL (mm) |
| SUPPORT 1 | LATTICE | 2 | 8.0 | 4 | 25 | 2 | 100 | 15 |
| SUPPORT 2 | LATTICE | 2 | 8.0 | 14 | 10 × 70 | 2 | 100 | 100 |
| SUPPORT 3 | LATTICE | 2 | 8.0 | 45 | 10 × 70 | 2 | 150 | 100 |
| SUPPORT 4 | LATTICE | 3 | 8.0 | 4 | 30 × 50 | 3 | 30 | 30 |
| SUPPORT 5 | CHAIN | 3 | 8.0* | 4 | 50 × 50 | — | — | — |
| SUPPORT 6 | WIRE | 5 | 8.0 | 4 | 50 × 50 | — | — | — |

(*Length of one ellipsoid is 50 mm.)

TABLE 10

|  | PROPERTIES OF STARTING PET RESIN | | | | | PROPERTIES OF PET RESIN AFTER TREATMENT | |
|---|---|---|---|---|---|---|---|
| UNIT | INTRINSIC VISCOSITY (dl/g) | CARBOXYL END GROUP CONCENTRATION (meq/kg) | ACETALDEHYDE CONTENT (ppm) | CRYSTALLIZATION DEGREE (%) | Mw/Mn | INTRINSIC VISCOSITY (dl/g) | CARBOXYL END GROUP CONCENTRATION (meq/kg) |
| EXAMPLE 10 | 0.81 | 28 | 4.8 | 2.7 | 1.9 | 0.81 | 28 |
| EXAMPLE 11 | 0.81 | 28 | 4.8 | 2.7 | 1.9 | 0.81 | 28 |
| EXAMPLE 12 | 0.80 | 33 | 9.8 | 2.7 | 2.0 | 0.80 | 33 |
| EXAMPLE 13 | 0.81 | 33 | 10.0 | 25.0 | 2.0 | 0.81 | 33 |
| EXAMPLE 14 | 0.82 | 28 | 4.6 | 2.8 | 2.0 | 0.82 | 28 |
| EXAMPLE 15 | 0.82 | 28 | 4.6 | 2.8 | 2.0 | 0.83 | 28 |
| EXAMPLE 16 | 0.81 | 28 | 4.8 | 2.7 | 1.9 | 0.81 | 28 |
| EXAMPLE 17 | 0.81 | 28 | 4.8 | 2.7 | 1.9 | 0.81 | 28 |
| EXAMPLE 18 | 0.81 | 28 | 4.8 | 2.7 | 1.9 | 0.81 | 28 |
| COMPARATIVE EXAMPLE 8 | 0.80 | 30 | 3.6 | 59.6 | 2.4 | 0.80 | 30 |
| COMPARATIVE EXAMPLE 9 | 0.58 | 40 | 41.3 | 2.7 | 2.0 | 0.58 | 40 |
| COMPARATIVE EXAMPLE 10 | 0.81 | 28 | 4.8 | 2.7 | 1.9 | 0.88 | 28 |
| COMPARATIVE EXAMPLE 11 | 0.80 | 30 | 3.6 | 59.6 | 2.4 | 0.80 | 30 |
| COMPARATIVE EXAMPLE 12 | 0.80 | 30 | 3.6 | 59.6 | 2.4 | 0.80 | 30 |
| COMPARATIVE EXAMPLE 13 | 0.50 | 36 | 66.4 | 2.6 | 2.0 | 0.55 | 35 |

TABLE 10-continued

| UNIT | PROPERTIES OF PET RESIN AFTER TREATMENT | | | PROPERTIES OF THE MOLDING (PREFORM) | | | |
|---|---|---|---|---|---|---|---|
| | ACETALDEHYDE CONTENT (ppm) | CRYSTALLIZATION DEGREE (%) | Mw/Mn | INTRINSIC VISCOSITY (dl/g) | ACETALDEHYDE CONTENT (ppm) | COLOR DIFFERENCE (L) | COLOR DIFFERENCE (b) |
| EXAMPLE 10 | 1.2 | 39.5 | 1.9 | 0.79 | 7.1 | 99.23 | 0.27 |
| EXAMPLE 11 | 0.5 | 42.9 | 1.9 | 0.79 | 6.6 | 99.22 | 0.26 |
| EXAMPLE 12 | 2.1 | 39.5 | 2.0 | 0.78 | 8.2 | 99.18 | 0.28 |
| EXAMPLE 13 | 2.4 | 41.4 | 2.0 | 0.78 | 8.8 | 99.15 | 0.28 |
| EXAMPLE 14 | 0.4 | 45.0 | 2.0 | 0.79 | 6.3 | 98.24 | 0.38 |
| EXAMPLE 15 | 0.5 | 49.3 | 2.0 | 0.80 | 7.6 | 98.21 | 0.39 |
| EXAMPLE 16 | 0.9 | 39.3 | 1.9 | 0.79 | 6.8 | 99.32 | 0.22 |
| EXAMPLE 17 | 0.6 | 39.2 | 1.9 | 0.79 | 6.1 | 99.34 | 0.20 |
| EXAMPLE 18 | 0.2 | 3.4 | 1.9 | 0.80 | 4.5 | 99.43 | 0.18 |
| COMPARATIVE EXAMPLE 8 | 3.6 | 59.6 | 2.4 | 0.75 | 17.6 | 99.28 | 0.21 |
| COMPARATIVE EXAMPLE 9 | 14.3 | 44.1 | 2.0 | 0.55 | 24.6 | 99.43 | 0.18 |
| COMPARATIVE EXAMPLE 10 | 1.3 | 57.4 | 2.1 | 0.80 | 15.3 | 98.80 | 0.33 |
| COMPARATIVE EXAMPLE 11 | 3.6 | 59.6 | 2.4 | 0.75 | 17.7 | 99.27 | 0.21 |
| COMPARATIVE EXAMPLE 12 | 3.6 | 60.1 | 2.4 | 0.74 | 17.8 | 99.25 | 0.22 |
| COMPARATIVE EXAMPLE 13 | 11.2 | 59.2 | 2.2 | 0.51 | 26.6 | 99.18 | 0.45 |

TABLE 11

| | POLYMERIZATION INTERMEDIATE SUPPLIED TO MELT POLYMERIZATION REACTOR | | | PELLETS BEFORE SOLID-STATE POLYCONDENSATION | | | SOLID-STATE POLYCONDENSATION CONDITIONS | |
|---|---|---|---|---|---|---|---|---|
| | INTRINSIC VISCOSITY (dl/g) | CARBOXYL GROUP (meq/kg) | CRYSTAL-LINE MELTING POINT (° C.) | INTRINSIC VISCOSITY (dl/g) | CARBOXYL GROUP (meq/kg) | CRYSTAL-LINE MELTING POINT (° C.) | POLYMER-IZATION TEMPERATURE (° C.) | POLYMER-IZATION TIME (TIME) |
| EXAMPLE 26 | 0.43 | 30 | 255 | 0.82 | 32 | 255 | 210 | 10 |
| COMPARATIVE EXAMPLE 22 | — | — | — | 0.44 | 32 | 255 | 210 | 10 |
| COMPARATIVE EXAMPLE 23 | — | — | — | 0.44 | 32 | 255 | 210 | 48 |

| | PELLETS OBTAINED FROM SOLID-STATE POLYCONDENSATION | | | | | | | |
|---|---|---|---|---|---|---|---|---|
| | INTRINSIC VISCOSITY (dl/g) | CARBOXYL GROUP (meq/kg) | ACETALDEHYDE CONTENT (ppm) | CRYSTALLIZATION DEGREE (%) | Mw/Mn | AMOUNT OF FINE PARTICLES (mg/kg) | COLOR DIFFERENCE (L) | COLOR DIFFERENCE (b) |
| EXAMPLE 26 | 1.32 | 29 | 0.9 | 53.0 | 2.3 | 3.1 | 99.21 | 0.26 |
| COMPARATIVE EXAMPLE 22 | 0.63 | 29 | 4.5 | 59.6 | 2.4 | 18.4 | 99.73 | 0.18 |
| COMPARATIVE EXAMPLE 23 | 0.85 | 30 | 4.3 | 60.2 | 2.5 | 70.7 | 98.97 | 0.34 |

TABLE 12

| | PROPERTIES OF PRODUCED PELLET | | | | | | |
|---|---|---|---|---|---|---|---|
| | INTRINSIC VISCOSITY | CARBOXYL GROUP | ACETALDEHYDE CONTENT | CRYSTALLIZATION DEGREE | | COLOR DIFFERENCE | |
| | (dl/g) | (meq/kg) | (ppm) | (%) | Mw/Mn | L VALUE | b VALUE |
| EXAMPLE 31 | 0.69 | 29 | 4.2 | 2.7 | 2.0 | 99.6 | 0.34 |
| EXAMPLE 32 | 0.92 | 30 | 5.2 | 2.7 | 2.0 | 99.5 | 0.36 |
| COMPARATIVE EXAMPLE 26 | 0.53 | 36 | 55.3 | 2.7 | 2.0 | 98.4 | 0.86 |
| COMPARATIVE EXAMPLE 27 | 0.61 | 37 | 56.2 | 2.7 | 2.0 | 98.4 | 0.88 |

INDUSTRIAL APPLICABILITY

The polyester resin according to the present invention contains a small amount of the carboxyl group at the end of the polymer and a small amount of impurity such as acetaldehyde, involves a reduced amount of acetaldehyde produced in the processing, and has excellent hues with narrow molecular weight distribution and high quality and moldability from a low polymerization degree to a high polymerization degree. More specifically, the polyester resin according to the present invention is characterized by low crystallinity and a small reduction in quality in the processing or a small rate of content of cyclic trimer and excellent workability in addition to the abovementioned favorable characteristics. Furthermore, the present invention provides the polyethylene terephthalate resin pellet with a small amount of fine powder, high handleability, and high quality of the molded article formed therefrom, and the preform and the hollow body formed by molding the high-quality polyethylene terephthalate resin as described above. They are suited for a material of a container of drinking water or the like.

EXPLANATION OF REFERENCES

Figure 1:
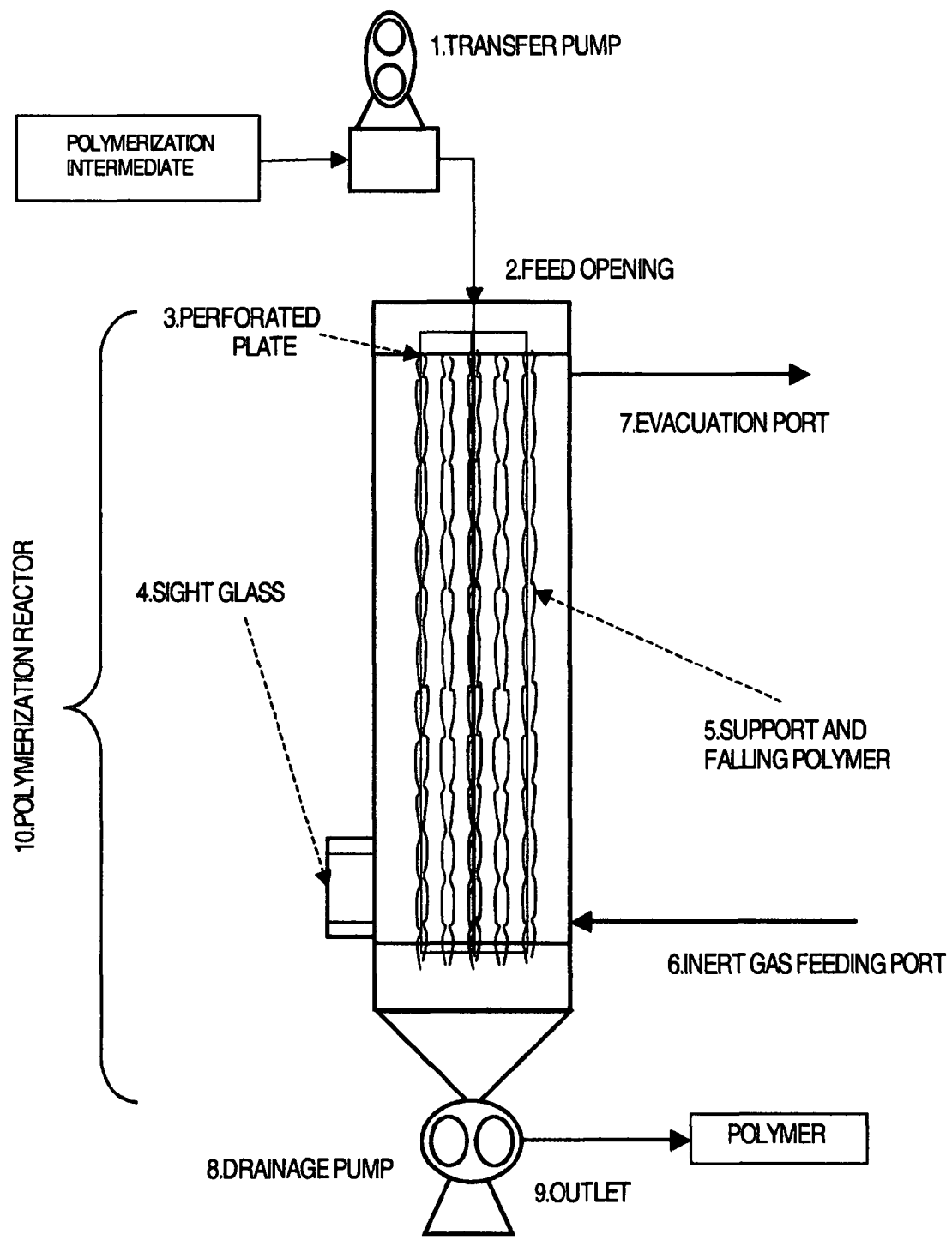
FIG. 1 is a schematic diagram showing an example of a polymerization reactor for producing polyester resin according to the present invention.
Figure 2:
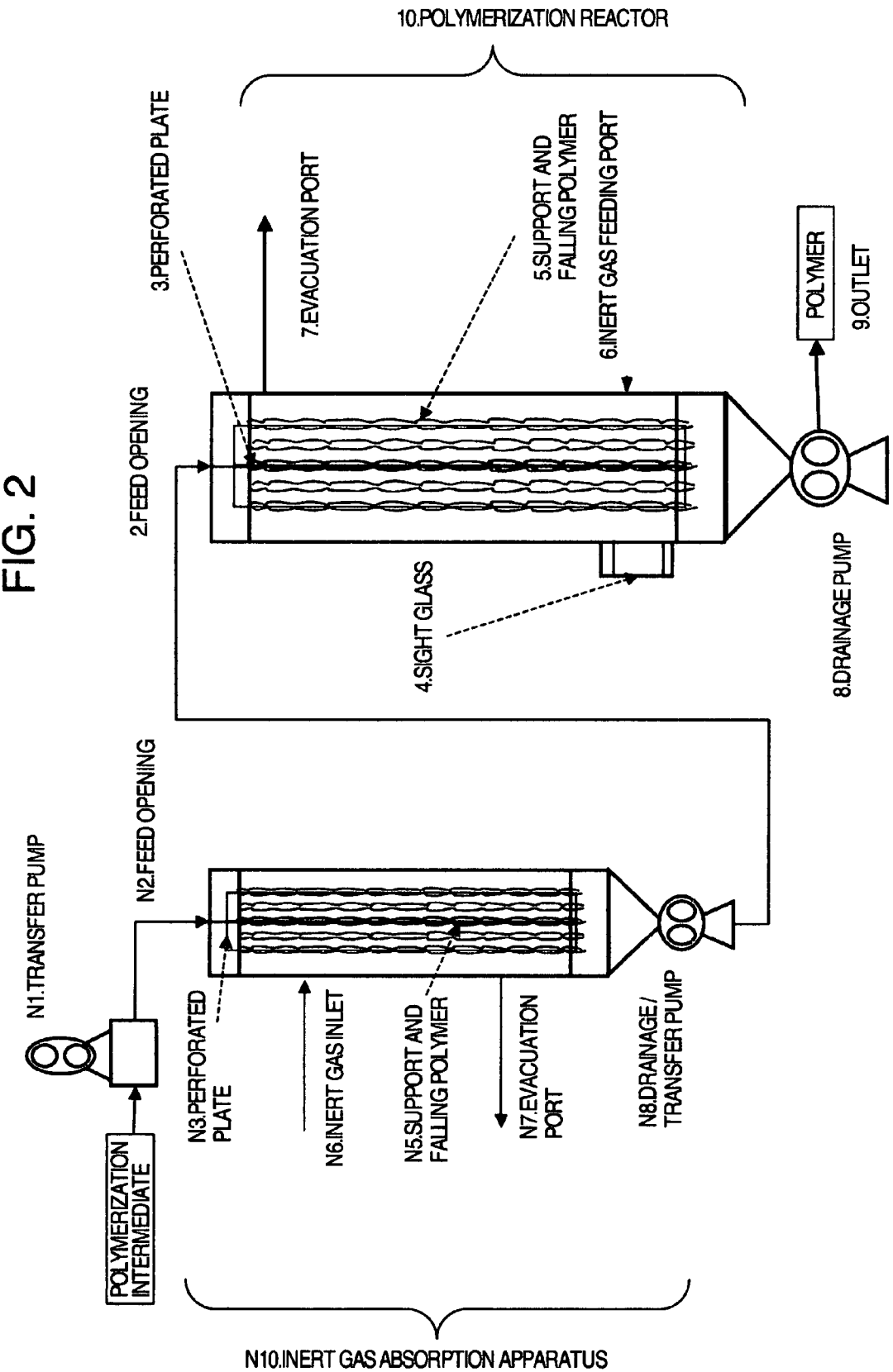
FIG. 2 is a schematic diagram showing an inert gas absorption apparatus and a polymerization reactor for producing the polyester resin according to the present invention.
Figure 3:
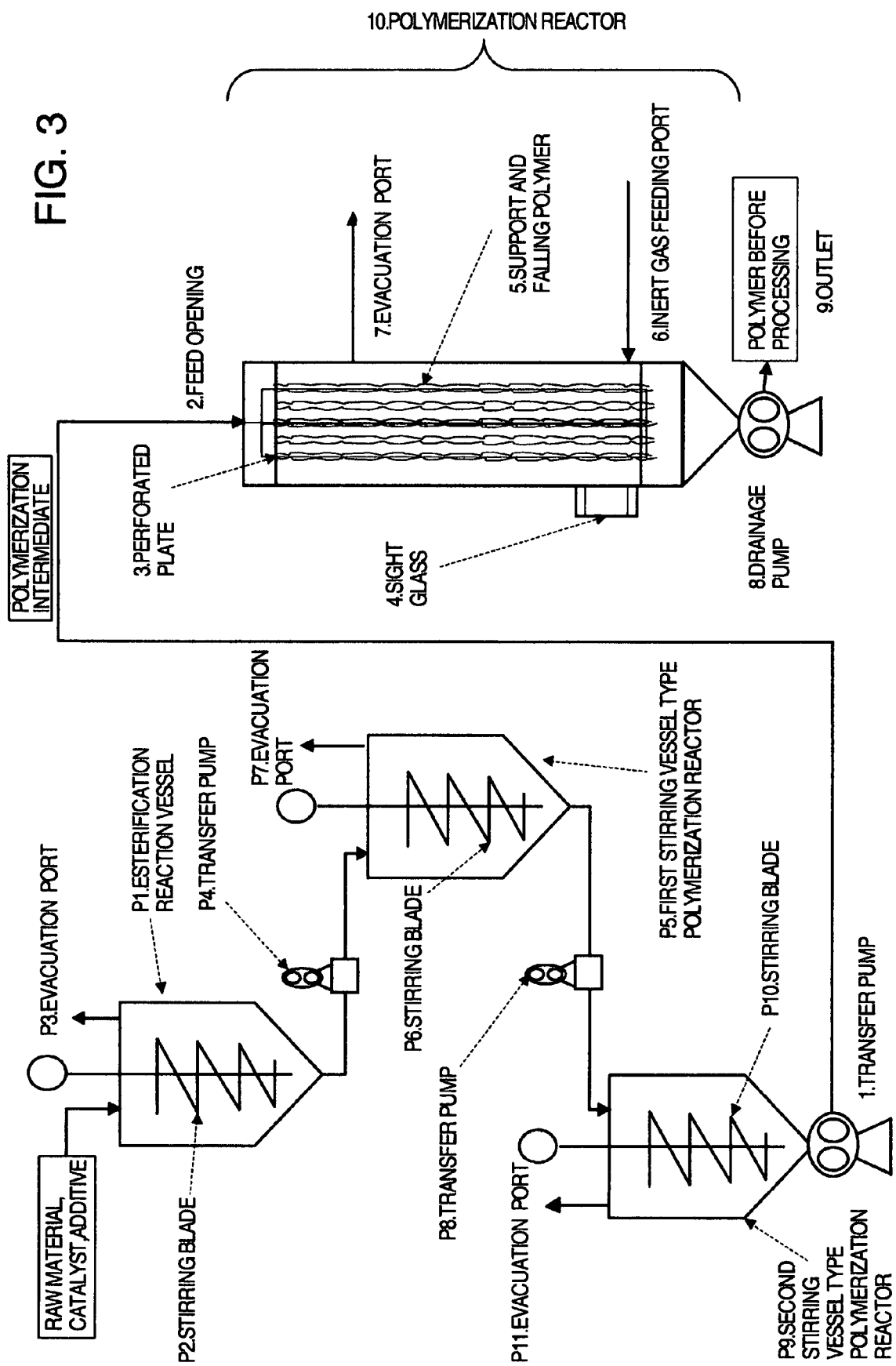
FIG. 3 is a schematic diagram showing an example of an apparatus for producing the polyester resin according to the present invention.
Figure 4:
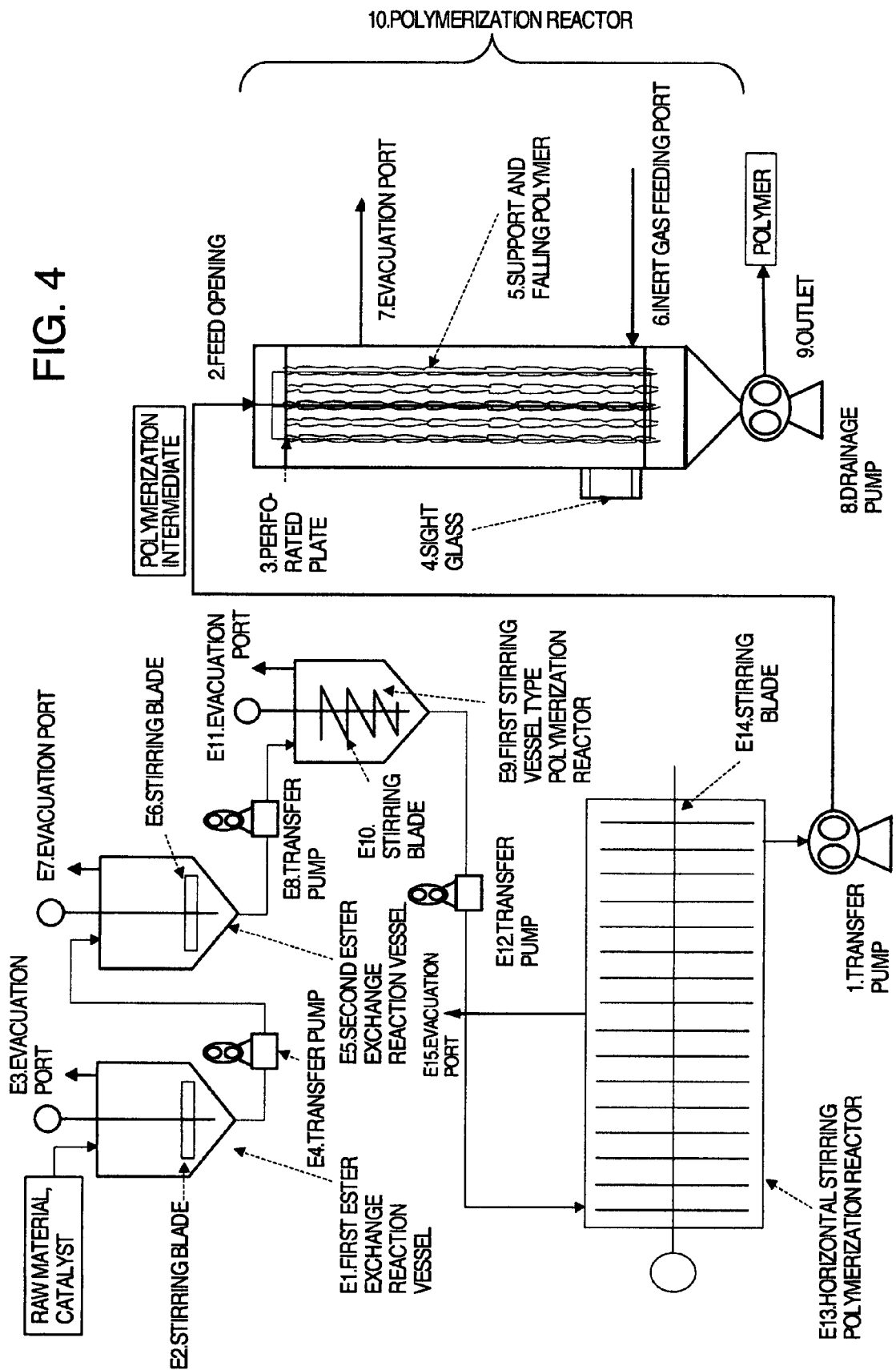
FIG. 4 is a schematic diagram showing an example of an apparatus for producing the polyester resin according to the present invention.
Figure 5:
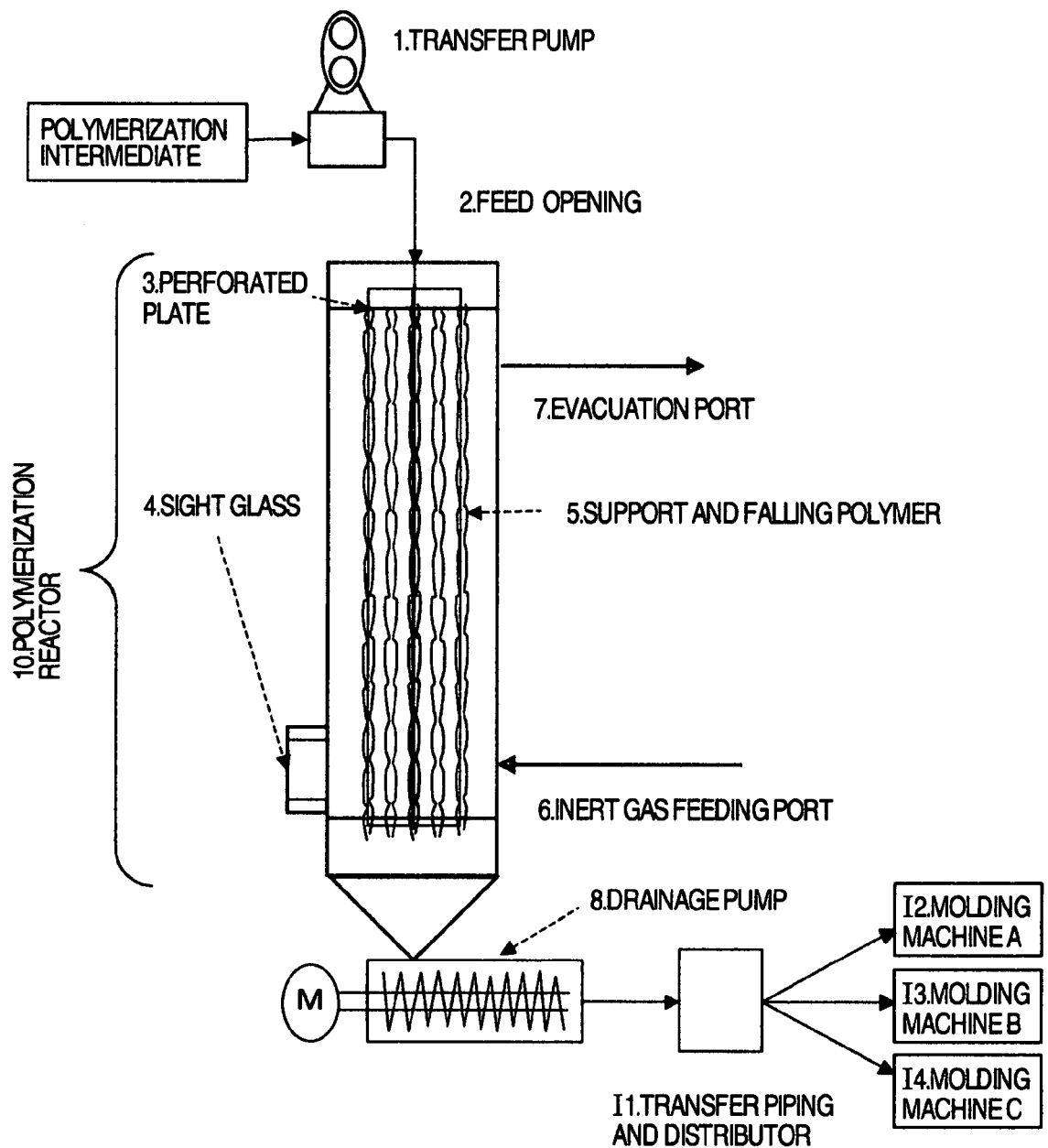
FIG. 5 is a schematic diagram showing an example of a polymerization reactor and a molding machine for producing the polyester resin according to the present invention.
Figure 6:
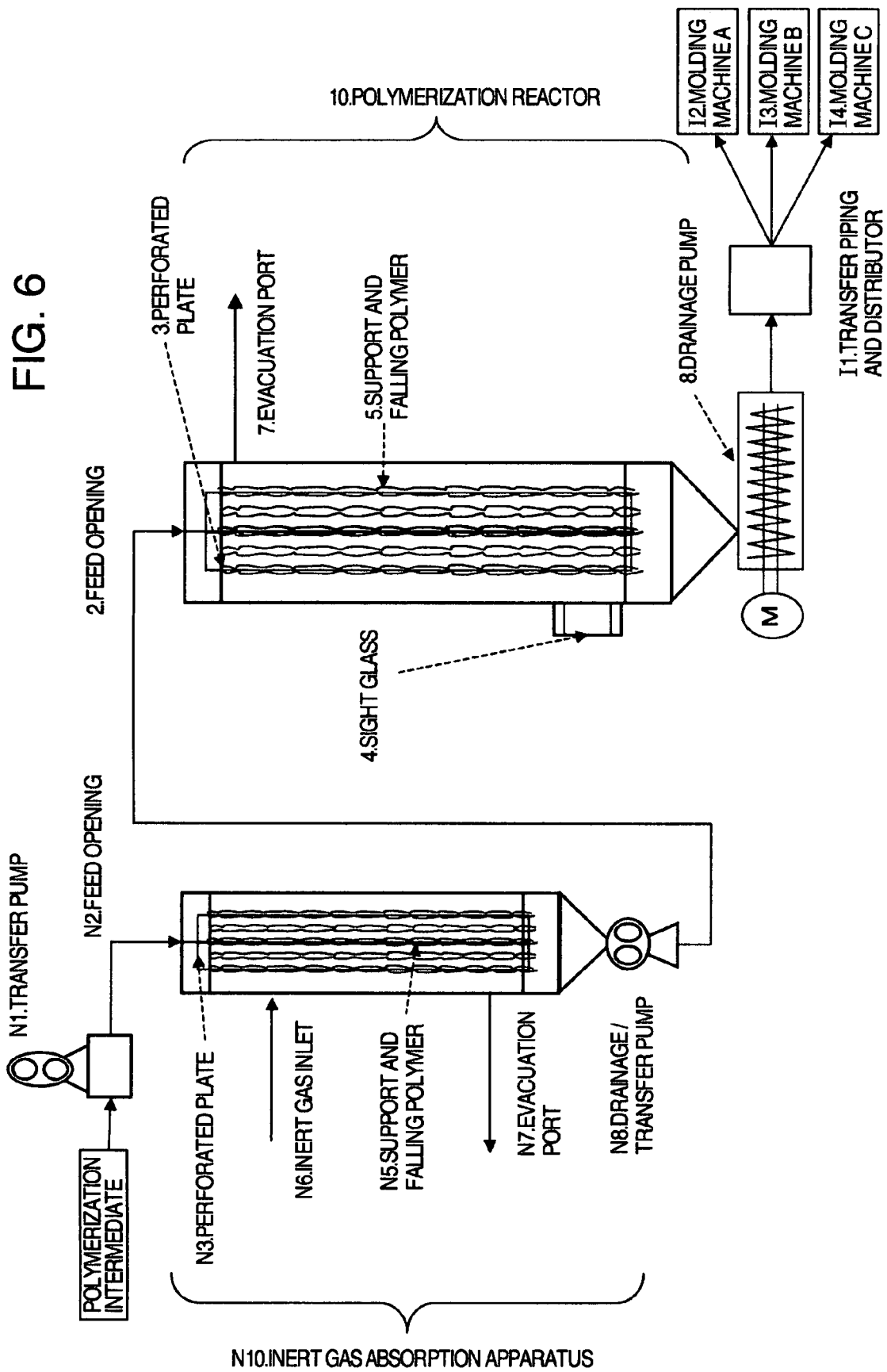
FIG. 6 is a schematic diagram showing an example of an inert gas absorbing apparatus, a polymerization reactor, and a molding machine for producing the polyester resin according to the present invention.
Figure 7:
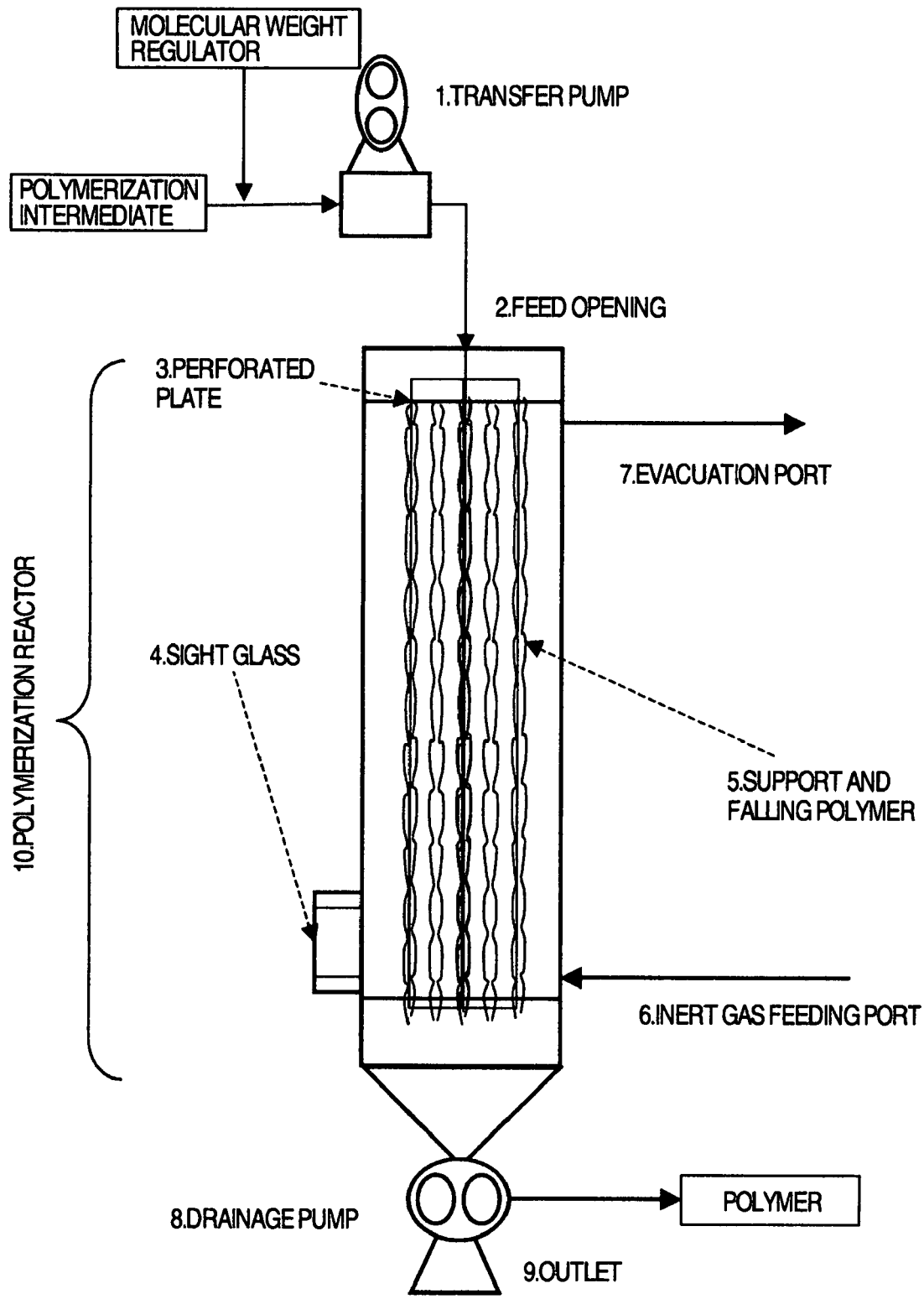
FIG. 7 is a schematic diagram showing an example of a polymerization reactor for producing the polyester resin according to the present invention.
Figure 8:
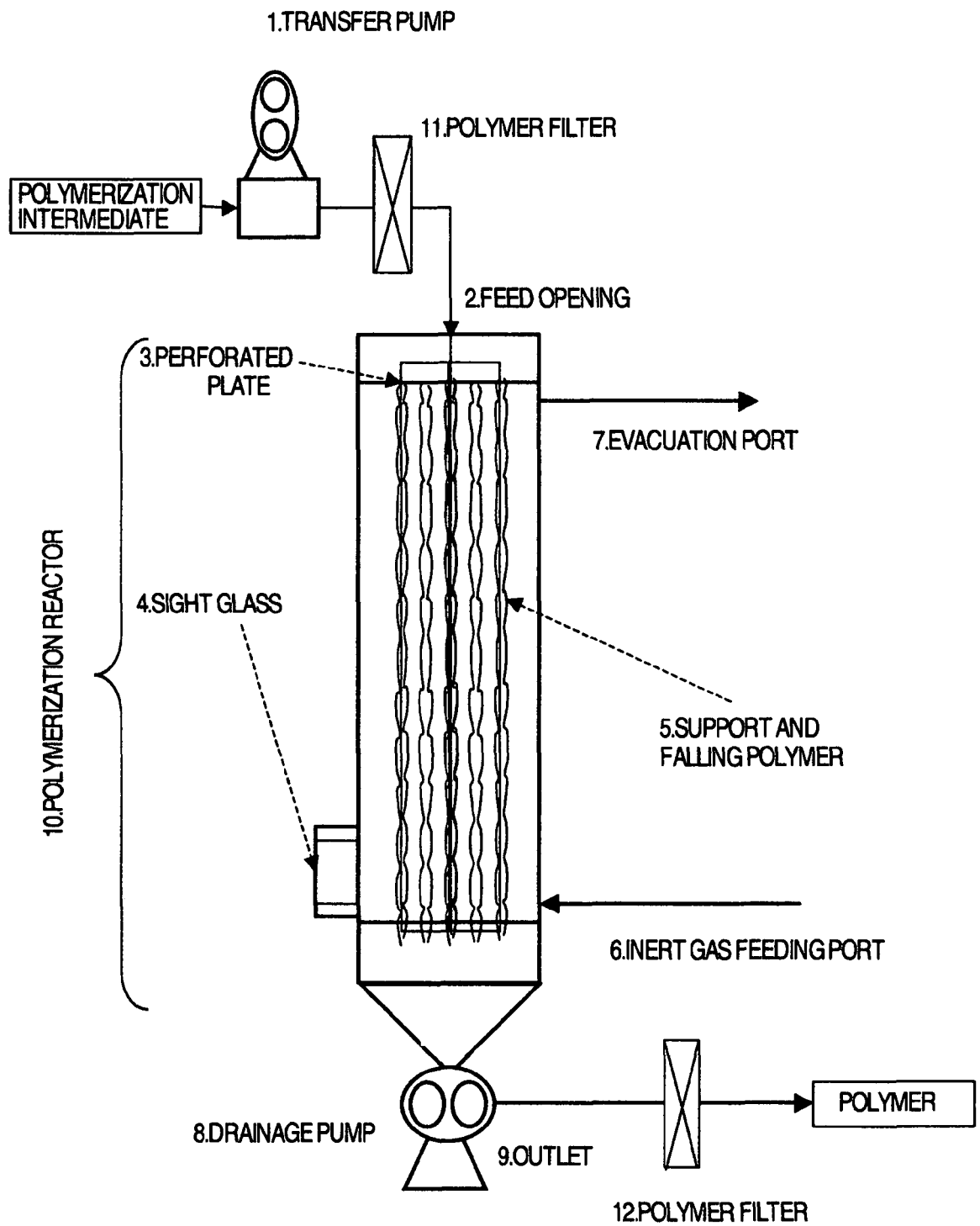
FIG. 8 is a schematic diagram showing an example of a polymerization reactor for producing the polyester resin according to the present invention.

| | |
|---|---|
| 1 | Transfer pump |
| 2 | Feed opening |
| 3 | Perforated plate |
| 4 | Sight glass |
| 5 | Support and Falling polymer |
| 6 | Inert gas feeding port |
| 7 | Evacuation port |
| 8 | Drainage pump |
| 9 | Outlet |
| 10 | Polymerization reactor |
| 11 | Polymer filter |
| 12 | Polymer filter |
| N1 | Transfer pump |
| N2 | Feed opening |
| N3 | Perforated plate |
| N5 | Support and Falling polymer |
| N6 | Inert gas inlet |
| N7 | Evacuation port |
| N8 | Drainage/transfer pump |
| N10 | Inert gas absorption apparatus |
| P1 | Esterification reaction vessel |
| P2 | Stirring blade |
| P3 | Evacuation port |
| P4 | Transfer pump |
| P5 | First stirring vessel type polymerization reactor |
| P6 | Stirring blade |
| P7 | Evaluation port |
| P8 | Transfer pump |
| P9 | Second stirring vessel type polymerization reactor |
| P10 | Stirring blade |
| P11 | Evaluation port |
| E1 | First ester exchange reaction vessel |
| E2 | Stirring blade |
| E3 | Evaluation port |
| E4 | Transfer pump |
| E5 | Second ester exchange reaction veseel |
| E6 | Stirring blade |
| E7 | Evaluation port |
| E8 | Transfer pump |
| E9 | First stirring vessel type polymerization reactor |
| E10 | Stirring blade |
| E11 | Evaluation port |
| E12 | Transfer pump |
| E13 | Horizontal stirring polymerization reactor |
| E14 | Stirring blade |
| E15 | Evaluation port |
| I1 | Transfer piping and distributor |
| I2 | Molding machine A |
| I3 | Molding machine B |
| I4 | Molding machine C |

The invention claimed is:

1. A polyethylene terephthalate resin obtained by melt polymerization under a reduced pressure or under an inert gas atmosphere and having the properties comprising:
   (A) an intrinsic viscosity [η] of 0.4 to 2.5 dl/g;
   (B) a content of carboxyl end groups of 30 meq/kg or less;
   (C) a content of acetaldehyde of 10 ppm or less;
   (D) a hue represented by the L value of 99 or greater and the b value of 0.4 or less, said hue being measured by transmission of hexafluoroisopropanol solution;
   (E) Mw/Mn of 1.8 to 2.3; and
   (F) a content of cyclic trimer of 5 wt % or less.

2. The polyethylene terephthalate resin according to claim 1, wherein the crystallinity is 55% or less.

3. The polyethylene terephthalate resin according to claim 1, wherein the content of cyclic trimer is 0.8 wt % or less.

4. A polyethylene terephthalate hollow body obtained from the polyethylene terephthalate resin according to claim 1 and having the properties comprising:
   (J) a content of carboxyl end groups of 30 meq/kg or less,
   (K) a content of acetaldehyde of 10 ppm or less, and
   (L) a hue represented by the L value of 98 or greater and the b value of 0.8 or less, said hue being measured by transmission of hexafluoroisopropanol solution.

5. The polyethylene terephthalate hollow body according to claim 4, wherein the polyethylene terephthalate hollow body is obtained through a preform, which has the properties comprising:
   (G) a content of carboxyl end groups of 30 meq/kg or less,
   (H) a content of acetaldehyde of 10 ppm or less, and
   (I) a hue represented by the L value of 98 or greater and the b value of 0.7 or less, said hue being measured by transmission of hexafluoroisopropanol solution.

6. The polyethylene terephthalate hollow body according to claim 5, wherein the preform is obtained from the polyethylene terephthalate resin with a molten state being maintained without solidification.

7. The polyethylene terephthalate hollow body according to claim 5, wherein the preform is obtained by once forming a pellet of the polyethylene terephthalate resin, and then remelting the pellet.

8. The polyethylene terephthalate hollow body according to claim 5, wherein the preform is obtained by feeding the polyethylene terephthalate resin having the properties (A) through (F) in a molten state in a polymerization reactor, into an injection molding machine via a feed pipe at a temperature lower by 10° C. or less, and higher by 60° C. or less than the crystalline melting point and then injection-molding the polyethylene terephthalate resin.

9. The polyethylene terephthalate hollow body according to claim 5, wherein the preform is obtained by extruding the polyethylene terephthalate resin having the properties (A) through (F) in a molten state in a polymerization reactor, to feed the polyethylene terephthalate resin into a compression molding machine via a feed pipe at a temperature lower by 10° C. or less, and higher by 60° C. or less than the crystalline melting point and then compression-molding the polyethylene terephthalate resin.

* * * * *